United States Patent
Tanaka et al.

(10) Patent No.: US 11,833,468 B2
(45) Date of Patent: *Dec. 5, 2023

(54) AMMONIA SEPARATION METHOD AND ZEOLITE

(71) Applicant: Mitsubishi Chemical Corporation, Tokyo (JP)

(72) Inventors: Manabu Tanaka, Tokyo (JP); Takeshi Matsuo, Tokyo (JP); Takayuki Aoshima, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,375

(22) Filed: Jun. 2, 2022

(65) Prior Publication Data

US 2022/0288529 A1  Sep. 15, 2022

Related U.S. Application Data

(63) Continuation of application No. 17/153,961, filed on Jan. 21, 2021, now Pat. No. 11,628,395, which is a continuation of application No. 16/713,360, filed on Dec. 13, 2019, now Pat. No. 10,946,333, which is a continuation of application No. PCT/JP2018/023042, filed on Jun. 15, 2018.

(30) Foreign Application Priority Data

| Jun. 15, 2017 | (JP) | ................. 2017-117862 |
| Dec. 14, 2017 | (JP) | ................. 2017-239295 |
| Jan. 19, 2018 | (JP) | ................. 2018-007414 |
| Jan. 19, 2018 | (JP) | ................. 2018-007415 |
| Jan. 19, 2018 | (JP) | ................. 2018-007416 |

(51) Int. Cl.
| *B01D 53/22* | (2006.01) |
| *B01D 69/02* | (2006.01) |
| *B01D 69/10* | (2006.01) |
| *B01D 71/02* | (2006.01) |

(52) U.S. Cl.
CPC ........... *B01D 53/228* (2013.01); *B01D 69/02* (2013.01); *B01D 69/10* (2013.01); *B01D 71/028* (2013.01); *B01D 2257/406* (2013.01); *B01D 2325/22* (2013.01)

(58) Field of Classification Search
CPC .. B01D 53/228; B01D 53/58; B01D 2258/02; B01D 69/02; B01D 69/10; B01D 71/028; B01D 2257/406; B01D 2325/22; C01C 1/0405; C01C 1/0458; C01C 1/0476
See application file for complete search history.

(56) References Cited

U.S. PATENT DOCUMENTS

| 4,762,535 | A | 8/1988 | Pez |
| 5,763,347 | A | 6/1998 | Lai |
| 5,824,617 | A | 10/1998 | Lai |
| 5,849,980 | A | 12/1998 | Lai |
| 5,895,769 | A | 4/1999 | Lai |
| 6,177,373 | B1 | 1/2001 | Sterte et al. |
| 6,190,638 | B1 | 2/2001 | Anthonis |
| 6,667,265 | B1 | 12/2003 | Tomita et al. |
| 7,744,850 | B2 | 6/2010 | Miller et al. |
| 10,946,333 | B2 * | 3/2021 | Tanaka ................. C01C 1/12 |
| 2006/0144239 | A1 | 7/2006 | Suzuki et al. |
| 2008/0031810 | A1 | 2/2008 | Miller et al. |
| 2009/0291046 | A1 | 11/2009 | Yoon et al. |
| 2010/0071559 | A1 | 3/2010 | Miachon et al. |
| 2010/0260666 | A1 | 10/2010 | Miller et al. |
| 2012/0024777 | A1 | 2/2012 | Sugita et al. |
| 2016/0361712 | A1 | 12/2016 | Hosono et al. |
| 2017/0157593 | A1 | 6/2017 | Chorkendorff et al. |
| 2019/0366276 | A1 | 12/2019 | Ishikawa |
| 2020/0188835 | A1 | 6/2020 | England |

FOREIGN PATENT DOCUMENTS

| CN | 102947224 A | 2/2013 |
| EP | 3 388 135 A1 | 10/2018 |
| EP | 3 640 209 A1 | 4/2020 |
| JP | 10-506363 A | 6/1998 |
| JP | 11-137981 A | 5/1999 |
| JP | 2000-507909 A | 6/2000 |

(Continued)

OTHER PUBLICATIONS

Combined Chinese Office Action and Search Report dated Jun. 21, 2022, in corresponding Chinese Patent Application No. 201880039137.4 (with English Translation), 18 pages.
Office Action dated Aug. 15, 2022 in co-pending U.S. Appl. No. 17/153,961, 5 pages.
Notification of Transmittal of Translation of the International Preliminary Report on Patentability dated Dec. 26, 2019, in PCT/JP2018/023042, 11 pages.
International Search Report dated Sep. 4, 2018, in PCT/JP2018/023042, 3 pages.
The Chemical Society of Japan, 6th edition, Chemical Handbook, Applied Chemistry I, Maruzen Co., Ltd. (2003), p. 581 (with partial English translation).

(Continued)

*Primary Examiner* — Timothy C Vanoy
(74) *Attorney, Agent, or Firm* — Oblon, McClelland, Maier & Neustadt, L.L.P.

(57) ABSTRACT

Provided is a method for separating ammonia gas using zeolite membrane having excellent separation stability at a high temperature capable of separating ammonia gas from a mixed gas composed of multiple components including ammonia gas, hydrogen gas, and nitrogen gas to the permeation side with high selectivity and high permeability. Also provided is a method for separating ammonia by selectively permeating ammonia gas from a mixed gas containing at least ammonia gas, hydrogen gas, and nitrogen gas using a zeolite membrane, wherein the ammonia gas concentration in the mixed gas is 1.0% by volume or more.

11 Claims, 2 Drawing Sheets

(56) References Cited

FOREIGN PATENT DOCUMENTS

| | | | |
|---|---|---|---|
| JP | 2008-247654 A | | 10/2008 |
| JP | 2009-545511 A | | 12/2009 |
| JP | 2011-121040 A | | 6/2011 |
| JP | 2011-121045 A | | 6/2011 |
| JP | 2011-121854 A | | 6/2011 |
| JP | 2012-66242 A | | 4/2012 |
| JP | 2013-534896 A | | 9/2013 |
| JP | 2013-226533 A | | 11/2013 |
| JP | 2013-226534 A | | 11/2013 |
| JP | 2014 058 433 A | * | 4/2014 |
| JP | 2014-58433 A | | 4/2014 |
| JP | 2015-44162 A | | 3/2015 |
| JP | 2017-522171 A | | 8/2017 |
| WO | WO 2005/021141 A1 | | 3/2005 |
| WO | WO 2008/016974 A2 | | 2/2008 |
| WO | WO 2011/162741 A1 | | 12/2011 |
| WO | WO 2015/129471 A1 | | 9/2015 |
| WO | WO 2017/099143 A1 | | 6/2017 |

OTHER PUBLICATIONS

The Society of Chemical Engineers, Japan, Compilation of Chemical Processes 1st Edition, Tokyo Kagaku Dozin, p. 153 (with partial English translation).
Naonobu Katada, Miki Niwa, Zeolite vol. 21 No. 2, Japan Zeolite Association (2004), p. 45-52 (with partial English translation).
Camus, Oliver, et al., AIChE Journal, 2006, vol. 52, No. 6, pp. 2055-2065.
Extended European Search Report dated Jul. 13, 2020 in Patent Application No. 18818324.8, 7 pages.
Olivier Camus, et al., "Microporous Ceramic Membranes in Industrial Ammonia Separation" Retrieved from the Internet: URL:https://www.researchgate.net/profile/Olivier_Camus/publication/236270914_Microporous_ceramic_membranes_in_industrial_ammonia_separation/links/02e7e5177e6463e291000000.pdf, Jul. 2005, pp. 1-10 and cover page.
Japanese Office Action dated Dec. 7, 2021 in Japanese Patent Application No. 2019-525591 (with English translation), 7, pages.
Office Action dated May 19, 2021 in corresponding European Patent Application No. 18818324.8, 4 pages.
Indian Office Action dated Jul. 1, 2021 in Indian Patent Application No. 202017001520, 4 pages.
Office Action dated Sep. 16, 2021 in Indonesian Patent Application No. P00202000358 (with English language translation), 9 pages.
Office Action as received in the corresponding SA patent application No. 519410807 dated Mar. 8, 2022 w/English Translation, 11 pages.
Office Action dated Jun. 30, 2023, in corresponding Indian Patent Application No. 202017001520 (with English Translation), 3 pages.
Japanese Office Action dated Mar. 7, 2023 in Japanese Patent Application No. 2022-052996 (with unedited computer-generated English Translation), 8 pages.
Office Action dated Jun. 5, 2023, in AU patent application No. 2018286313—5 pages.
Office Action dated Jun. 26, 2023, in AU patent application No. 2022203499—5 pages.
Office Action dated Jul. 4, 2023 issued in corresponding Indian Patent Application No. P00202204336 with its English translation.
Office Action dated Jul. 4, 2023 issued in corresponding Idonesian Patent Application No. P00202204336 with its English translation.

* cited by examiner

AMMONIA SEPARATION METHOD AND ZEOLITE

CROSS-REFERENCE TO RELATED APPLICATION

This is a continuation of U.S. application Ser. No. 17/153,961 filed Jan. 21, 2021, allowed, which is a continuation of U.S. application Ser. No. 16/713,360 filed Dec. 13, 2019, now U.S. Pat. No. 10,946,333, which is a continuation of International Application PCT/JP2018/023042, filed on Jun. 15, 2018, and designated the U.S., and claims priority from Japanese Patent Application 2017-117862 which was filed on Jun. 15, 2017, Japanese Patent Application 2017-239295 which was filed on Dec. 14, 2017, Japanese Patent Application 2018-007414 which was filed on Jan. 19, 2018, Japanese Patent Application 2018-007415 which was filed on Jan. 19, 2018, and Japanese Patent Application 2018-007416 which was filed on Jan. 19, 2018, the entire contents of which are incorporated herein by reference.

TECHNICAL FIELD

The present invention relates to a method for separating ammonia by using a zeolite membrane to selectively allow ammonia gas to permeate, from a mixed gas composed of a plurality of components including ammonia gas, and hydrogen gas, and/or nitrogen gas. The present invention relates to a zeolite membrane that effectively separates ammonia from a mixed gas composed of a plurality of components including ammonia gas, and hydrogen gas, and/or nitrogen gas even under high temperature conditions.

BACKGROUND OF THE INVENTION

In recent years, membrane separation methods and membrane concentration methods using membranes such as polymer membranes and zeolite membranes have been proposed as methods for separating gas mixtures.

While a polymer membrane has a feature that it is excellent in processability into, for example, a flat membrane or a hollow fiber membrane, there remains a technical problem that a polymer membrane is easily swelled and has low heat resistance. A polymer membrane has low resistance to reactive chemicals, and there remains a technical problem that a polymer membrane easily deteriorates due to adsorptive components such as sulfides. Furthermore, since a polymer membrane is easily deformed by pressure and the separation performance is thereby lowered, a polymer membrane is not practical in separation of ammonia under high temperature conditions, which is one of the problems of the present invention.

In response to this, various inorganic films having favorable chemical resistance, oxidation resistance, heat stability, and pressure resistance have been proposed in recent years. Among them, a zeolite membrane is expected to be a highly durable separation membrane that not only selectively allows specific molecules to permeate, but also enables separation and concentration over a wider temperature range than polymer membranes since a zeolite membrane has ordered sub-nanometer pores and functions as a molecular sieve. Such a zeolite membrane is usually used as a zeolite membrane composite in which zeolite is formed into a membrane on a support made of an inorganic material. For example, it has been found that when a reaction mixture having a specific composition is used when forming a zeolite membrane on a porous support by hydrothermal synthesis, the crystal orientation of zeolite crystallized on the support is improved, and a dense zeolite membrane that combines practically sufficient throughput capacity and separation performance in separation of a mixture of an organic compound and water can be formed (Patent Documents 1 to 3).

In general, a zeolite membrane such as an A-type membrane, a FAU membrane, an MFI membrane, an SAPO-34 membrane, or a DDR membrane is known as a zeolite membrane for gas separation, and a zeolite membrane composite for gas separation exhibiting high throughput capacity and separation performance has been proposed for separation of gas discharged from thermal power plants or petrochemical industries such as separation of carbon dioxide and nitrogen, carbon dioxide and methane, hydrogen and hydrocarbon, hydrogen and oxygen, hydrogen and carbon dioxide, nitrogen and oxygen, paraffin and olefin, or the like (For example, Patent Document 4).

On the other hand, regarding the separation of ammonia gas from hydrogen gas and nitrogen gas of the present invention, application of membrane separation, for example, to an ammonia production process by the Haber-Bosch process, one of industrially important processes is expected in recent years. One of the characteristics of the Haber-Bosch process is that although such an ammonia generation reaction is an equilibrium reaction, and thermodynamically, a reaction under high pressure and low temperature conditions is preferable, high pressure and high temperature production conditions are generally required in order to ensure a catalytic reaction rate. Since unreacted hydrogen gas and nitrogen gas coexist with ammonia gas in a mixed gas to be generated, in a step of recovering the ammonia gas as a product from the generated mixed gas, it is necessary to cool the mixed gas to about from −20° C. to −5° C. to condense and separate the ammonia (Non-Patent Documents 1 and 2). In particular, in the latter case, the concentration of ammonia gas contained in the generated mixed gas is inevitably low due to the reaction equilibrium limitation described above, and therefore, in a step of cooling and separating ammonia from the generated mixed gas, the cooling efficiency is poor and a great amount of energy is consumed. In the process, it is necessary to separate a large amount of mixed gas of hydrogen gas and nitrogen gas from the generated mixed gas and recycle the separated gas to a reactor as raw material gas, and it is necessary to increase the pressure of the cooled, unreacted mixed gas to a predetermined pressure and the temperature of the gas to a reaction temperature, and therefore, the actual situation is that the energy consumption at the time of production is further increased.

To avoid such an energy intensive process, a process that efficiently recovers high-concentration ammonia gas by replacing a cold condensation separation method in a purification step with a separation method using an inorganic membrane has been proposed (Patent Documents 7 and 8).

Examples of the method for separating mixed gas containing high concentration ammonia gas from mixed gas of hydrogen gas, nitrogen gas, and ammonia gas include: 1) a method of using a separation membrane to selectively allow hydrogen gas and/or nitrogen gas in the mixed gas to permeate; and 2) a method of using a separation membrane to selectively allow ammonia gas in the mixed gas to permeate.

As the former method for selectively allowing hydrogen gas and/or nitrogen gas to permeate, a method of using a polycrystalline layer of various zeolites (Patent Document 5) and a method of using a molecular sieve film (Patent Document 6) have been proposed. In Patent Document 7, a method for selectively allowing hydrogen gas and/or nitrogen gas to permeate and a method for selectively allowing ammonia gas to permeate are described, and a separation method for separating at least one component of hydrogen gas, nitrogen gas, and ammonia gas from a generated gas that is a mixture of hydrogen gas, nitrogen gas, and ammonia gas, using a separation membrane in which a silica-containing layer is layered on a ceramic substrate is proposed. Specifically, Patent Document 7 describes, in a schematic flowchart in which a separation membrane is applied to ammonia production, that since hydrogen gas selectively permeates a silica membrane under high temperature conditions, two separation membranes are installed, the hydrogen gas is separated to the permeation side by the first separation membrane, and from nitrogen gas and ammonia gas that have not permeated through the first separation membrane, the ammonia gas is separated to the permeation side by the second separation membrane. Patent Document 7 also describes that in order to separate ammonia gas from a mixed gas of hydrogen gas and ammonia gas, it is necessary to use a low temperature condition such as 50° C., and the ammonia gas concentration in the mixed gas needs to be higher than 60% by mole.

On the other hand, in addition to Patent Document 7, as the latter method for selectively allowing ammonia gas to permeate, an efficient ammonia separation method for separating ammonia gas from a mixed gas of ammonia gas, and hydrogen gas, and/or nitrogen gas by using a specific zeolite having an oxygen eight-membered ring is proposed (Patent Document 8). Here, a method for separating ammonia gas by designing a specific zeolite membrane composite, and by using a molecular sieve action utilizing the pore diameter of the zeolite is proposed. Although, in general, ammonia is used as a probe molecule that is adsorbed at an acid site in a temperature-programmed desorption method that measures the acid amount of zeolite, and the peak top temperature reaches as high as about 480° C., the adsorbed ammonia has a property of desorbing due to temperature rise (Non-patent Document 3), while Patent Document 8 discloses that the permeation performance of ammonia gas can be controlled by controlling the adsorption ability of ammonia to zeolite by ion exchange of zeolite. Patent Document 8 deals with a problem of clogging of zeolite pores by ammonia when ammonia gas permeates, and a technique that avoids this problem is disclosed in Examples thereof. In the separation technique of Patent Document 8, it is proposed that a technique of permeating ammonia gas by using a molecular sieve action utilizing the pore diameter of zeolite while using zeolite that suppresses adsorption of ammonia and suppressing clogging of ammonia in the pores is effective.

On the other hand, as an ammonia synthesis method, an innovative production process has been developed in recent years, and specifically, a production process that uses an electrode catalyst supporting ruthenium metal and exhibits extremely high catalytic activity even under low temperature conditions (from 340 to 400° C.) has been reported (Patent Document 9).

CITATION LIST

Patent Documents

Patent Document 1: JP 2011-121040 A
Patent Document 2: JP 2011-121045 A
Patent Document 3: JP 2011-121854 A
Patent Document 4: JP 2012-066242 A
Patent Document 5: JP H10-506363 T
Patent Document 6: JP 2000-507909 T
Patent Document 7: JP 2008-247654 A
Patent Document 8: JP 2014-058433 A
Patent Document 9: WO2015/129471

Non Patent Documents

Non Patent Document 1: The Chemical Society of Japan, 6th edition, Chemical Handbook, Applied Chemistry I, Maruzen Co., Ltd. (2003), p 581
Non Patent Document 2: The Society of Chemical Engineers, Japan, Compilation of Chemical Processes 1st Edition, Tokyo Kagaku Dozin, p 153
Non Patent Document 3: Naonobu Katada, Miki Niwa, Zeolite Vol. 21 No 2, Japan Zeolite Association (2004), p 45-52

SUMMARY OF INVENTION

Technical Problem

However, in a method for selectively allowing hydrogen gas and/or nitrogen gas in a mixed gas containing hydrogen gas, nitrogen gas, and ammonia gas to permeate, what is recovered through a separation membrane is hydrogen gas and/or nitrogen gas, and an essential problem of this method is that a process for first separating hydrogen gas and/or nitrogen gas from a mixed gas containing relatively high concentration ammonia gas is employed. In other words, in the step of separating hydrogen gas and/or nitrogen gas, a considerable amount of ammonia gas permeates along with the permeating hydrogen gas and/or nitrogen gas, and therefore, there is a problem that an economical process cannot be realized unless the considerable amount of permeated ammonia is recovered. For example, when the technique of Patent Document 7 is adopted, for completing an economical process, a step of separating ammonia gas from a high-concentration hydrogen-mixed gas containing ammonia gas permeated through a first-stage separation membrane and a mixed gas of nitrogen gas and ammonia gas not permeated is essential. Specifically, this method is not only a complicated process for separating ammonia gas from a mixed gas of hydrogen gas, nitrogen gas, and ammonia gas in at least two stages, but also a process requiring a step of recovering ammonia from both the mixed gas permeated in the first stage and the non-permeated mixed gas to be completed as an economical process, which is even more complicated. In order to essentially solve these problems, it is necessary to separate hydrogen gas and nitrogen gas from relatively high concentration hydrogen gas and a mixed gas containing nitrogen gas and/or a mixed gas containing relatively low concentration ammonia gas, but such a process cannot be a productive ammonia production process and is not practical.

Furthermore, in the process of recycling the hydrogen gas separated to the permeation side by the first-stage membrane under high temperature conditions proposed in Patent Document 7, there is a problem that requires energy for boosting the hydrogen gas, and further, in the separation of nitrogen gas and ammonia gas from the second-stage membrane, the permeability of ammonia gas is not sufficient, and the membrane area may be increased. Further, in the method of patent document 7 which separates hydrogen gas used as a raw material gas from a mixed gas of hydrogen gas, nitrogen gas, and ammonia gas under high temperature conditions, for example, when the separation membrane according to one embodiment of the present invention is directly deposited to the ammonia synthesis reactor to synthesize ammonia, since the raw material gas permeates, the reaction becomes disadvantageous due to the restriction of the reaction equilibrium described above, and high concentration ammonia gas cannot be generated. From the above point of view, with a method of using such a separation membrane to selectively allow hydrogen gas and/or nitrogen gas in a mixed gas of hydrogen gas, nitrogen gas, and ammonia gas to permeate, the energy cost at the time of production rises and the process becomes complicated, and therefore, it is difficult to find an advantage of introducing a separation membrane into an ammonia production process.

On the other hand, a technique of using a separation membrane to selectively allow ammonia gas in a mixed gas of hydrogen gas, nitrogen gas, and ammonia gas to permeate is effective as a technique for solving various problems described above. However, in the ammonia gas separation method using a separation membrane in which a silica-containing layer is layered proposed in the known document 7, it is shown that a mixed gas having an ammonia gas concentration higher than 60% by mole needs to be used, and that the mixed gas needs to be cooled to 50° C. in order to develop a blocking effect by ammonia, and the ammonia gas separation ability is such that ammonia gas is slightly more permeable than hydrogen gas. In such a process, there is, in the first place, a problem of how to prepare a mixed gas having an ammonia gas concentration higher than 60% by mole, and even if such a mixed gas is prepared, the gas needs a great deal of energy for cooling, and therefore, it is difficult to complete an economical process.

On the other hand, the method of separating ammonia gas from a mixed gas of ammonia gas, and hydrogen gas, and/or nitrogen gas by using a specific zeolite having an oxygen eight-membered ring proposed in Patent Document 8 can be an effective technique applicable to industrial processes without the above-described restrictions in order to permeate ammonia gas. However, in the method for separating ammonia by using a molecular sieve action utilizing the pore diameter of zeolite proposed in Patent Document 8, the permeance ratio (ideal separation factor) between ammonia gas and nitrogen gas is only about 14 at most, and the permeation performance is not sufficient. Further, Patent Document 8 proposes that the permeance ratios of hydrogen gas and ammonia gas to nitrogen gas are obtained individually, and by comparing these ratio values, basically, ammonia gas in a mixed gas of hydrogen gas, nitrogen gas, and ammonia gas selectively permeates, but especially in view of the permeance ratio of ammonia gas to that of hydrogen gas, the permeation performance is not sufficient, and the effectiveness of the above-described ammonia gas separation by using a molecular sieve action utilizing the pore diameter is limited. Furthermore, in Patent Document 8, ammonia gas is separated from a mixed gas of nitrogen and ammonia gas at 140° C., and when comparing the permeance of various gases before and after ammonia gas permeation, the permeance value of any gas increased after permeation, and therefore, there remains a problem that the durability of a zeolite membrane is impaired even under relatively low temperature conditions such as 140° C. Regarding these problems, in order to efficiently allow ammonia gas to permeate using a zeolite membrane, since ammonia essentially has the adsorption ability to zeolite, it is also necessary to appropriately combine the composition of a supply gas mixture and the temperature at which the gas is separated. However, in Patent Document 8, there is no description or proposal for appropriate separation conditions, and a method for separating ammonia from a mixed gas of hydrogen gas, nitrogen gas, and ammonia gas, or a mixed gas of hydrogen gas and ammonia gas is not demonstrated.

On the other hand, regarding an ammonia production process, as in Patent Document 9, in recent years, a highly active catalytic process of ammonia production has been reported even under low temperature and low pressure conditions, and is expected as a process for reducing energy consumption during production. However, with this innovative production process alone, because of the reason that the ammonia generation reaction is an equilibrium reaction as described above, a mixed gas containing high concentration ammonia gas higher than the equilibrium composition cannot be generated due to the limitation of reaction equilibrium, and essentially, the above-described problems such as reduction of energy consumption during production including a recovery process of generated ammonia and a recycling step of raw material gas cannot be solved.

The present invention has been made in view of the above-described conventional situation, and an object thereof is to provide a method for separating ammonia, in which ammonia gas can be separated from a mixed gas composed of a plurality of components including ammonia gas, and hydrogen gas, and/or nitrogen gas by allowing the mixed gas to permeate through a zeolite membrane with high selectivity and high permeability, and which is excellent in high-temperature separation stability and long-term operation stability.

Solution to Problem

The present inventors have further studied separation of ammonia using a zeolite membrane to solve the above-described problems, and found that the ammonia permeation selectivity gas permeating through a zeolite membrane is considerably improved when the concentration of ammonia gas in a mixed gas of hydrogen gas, nitrogen gas, and ammonia gas is higher than a specific amount. The present inventors have also found that when one aspect of the present invention is used, ammonia gas separation performance can be stably maintained even under temperature conditions exceeding 200° C. Surprisingly, the present inventors have also found that a similar effect is exhibited in a zeolite such as MFI having a large pore diameter relative to the molecular sizes of hydrogen molecules, nitrogen molecules, and ammonia molecules. In other words, since permeating ammonia gas clogs pores of zeolite, Patent Document 8 proposes a method for separating ammonia by designing an ammonia gas separation/permeation membrane that avoids the clogging, and in the present invention, it has been found that, on the contrary, when a method of actively adsorbing ammonia on zeolite is used, the ammonia gas separation performance is considerably improved and the separation stability is improved, whereby the present invention has been completed. It has been also found that when a zeolite membrane different from the silica membrane proposed in Patent Document 7 is used, ammonia separation performance can be stably maintained even under high temperature conditions exceeding 50° C. and even 200° C., thereby completing the present invention.

The first embodiment (Invention A) of the present invention has been achieved based on such findings, and provides the following.

[A1] A method for separating ammonia by using a zeolite membrane to selectively allow ammonia gas to permeate, from a mixed gas containing at least ammonia gas, hydrogen gas, and nitrogen gas, wherein the ammonia gas concentration in the mixed gas is 1.0% by volume or more.

[A2] The method for separating ammonia according to [A1], wherein the volume ratio of hydrogen gas/nitrogen gas in the mixed gas is from 0.2 to 3.

[A3] The method for separating ammonia according to [A1] or [A2], wherein the temperature at which ammonia is separated is from higher than 50° C. to 500° C.

[A4] The method for separating ammonia according to any one of [A1] to [A3], wherein the zeolite constituting the zeolite membrane is RHO zeolite or MFI zeolite.

[A5] A method for separating ammonia, including a step of producing ammonia from hydrogen gas and nitrogen gas, wherein ammonia is separated from a mixed gas containing ammonia gas obtained in the production step by the separation method according to any one of [A1] to [A4].

In order to solve the above-described problems, the present inventors have further studied separation of ammonia gas by using a zeolite membrane, and found that although, regarding the separation performance of existing zeolite membranes for ammonia gas separation that can separate ammonia gas more selectively and efficiently than existing silica membranes, the permeance ratio (ideal separation factor) of ammonia gas and nitrogen gas was only about 14 at most, when a zeolite membrane having a surface in which the molar ratio of nitrogen atoms to Al atoms determined by X-ray photoelectron spectroscopy (XPS) is in a specific range is used, ammonia gas separation performance is considerably improved. The present inventors have also found that the ammonia gas separation performance can be stably maintained even under high temperature conditions by using the present invention. Specifically, the present inventors have found that in order to separate ammonia gas with high selectivity and high permeability from a mixed gas composed of a plurality of components including ammonia gas, and hydrogen gas, and/or nitrogen gas even under high temperature conditions, among various zeolite membranes, a zeolite membrane having a surface containing a specific molar ratio of nitrogen atoms to Al atoms needs to be used, thereby completing the present invention. The second embodiment (Invention B) of the present invention has been achieved based on such findings, and provides the following.

[B1] A zeolite membrane, wherein a molar ratio of nitrogen atoms to Al atoms determined by X-ray photoelectron spectroscopy under the following measurement conditions is from 0.01 to 4.

(Measurement Conditions)

X-ray source for measurement: Monochromatic Al-Kα ray, output 16 kV-34 W

Background determination method for quantitative calculation: Shirley method

[B2] The zeolite membrane according to [B1], wherein the zeolite membrane is a zeolite membrane treated with an ammonium salt.

[B3] The zeolite membrane according to [B2], wherein the zeolite membrane is a zeolite membrane further treated with aluminum nitrate.

[B4] The zeolite membrane according to any one of [B1] to [B3], wherein the zeolite is RHO zeolite.

[B5] The zeolite membrane according to any one of [B1] to [B4], wherein the zeolite membrane is for ammonia gas separation.

[B6] A method for separating ammonia, wherein ammonia gas is allowed to permeate and separated from a mixed gas containing at least ammonia gas, and hydrogen gas, and/or nitrogen gas by using the zeolite membrane according to any one of [B1] to [B5].

[B7] The method for separating ammonia, wherein ammonia obtained in a step of producing ammonia from hydrogen gas and nitrogen gas is separated by the separation method according to [B6].

In order to solve the above-described problems, the present inventors have further studied separation of ammonia gas by using a zeolite membrane, and found that although, regarding the separation performance of existing zeolite membranes for ammonia gas separation that can separate ammonia gas more selectively and efficiently than existing silica membranes, the permeance ratio (ideal separation factor) of ammonia gas and nitrogen gas was only about 14 at most, and there is a problem that the durability of such a zeolite membranes is impaired even under a relatively low temperature condition of 140° C., when a zeolite membrane having a surface in which the molar ratio of Si atoms to Al atoms determined by X-ray photoelectron spectroscopy (XPS) is in a specific range is used, significant ammonia separation performance is exhibited and the separation stability under high temperature conditions is improved. Specifically, the present inventors have found that in order to separate ammonia gas with high selectivity and high permeability from a mixed gas composed of a plurality of components including ammonia gas and hydrogen gas and/ or nitrogen gas even under high temperature conditions, among various zeolite membranes, a zeolite membrane having a surface containing a specific molar ratio of Si atoms to Al atoms needs to be used, thereby completing the present invention. The third embodiment (Invention C) of the present invention has been achieved based on such findings, and provides the following.

[C1] A zeolite membrane, wherein a molar ratio of Si atoms to Al atoms determined by using X-ray photoelectron spectroscopy under the following measurement conditions is from 2.0 to 10.

(Measurement Conditions)

X-ray source for measurement: Monochromatic Al-Kα ray, output 16 kV-34 W

Background determination method for quantitative calculation: Shirley method

[C2] The zeolite membrane according to [C1], wherein the molar ratio of nitrogen atoms to Al atoms determined by using X-ray photoelectron spectroscopy under the following measurement conditions is from 0.01 to 4.

(Measurement Conditions)

X-ray source for measurement: Monochromatic Al-Kα ray, output 16 kV-34 W

Background determination method for quantitative calculation: Shirley method

[C3] The zeolite membrane according to [C1] or [C2], wherein the zeolite membrane is a zeolite membrane treated with an aluminum salt.

[C4] The zeolite membrane according to any one of [C1] to [C3], wherein the zeolite membrane is a zeolite membrane treated with an ammonium salt.

[C5] The zeolite membrane according to any one of [C1] to [C4], wherein the zeolite membrane is a zeolite membrane treated with an aluminum salt after being treated with an ammonium salt.

[C6] The zeolite membrane according to any one of [C1] to [C5], wherein the zeolite is RHO zeolite.

[C7] The zeolite membrane according to any one of [C1] to [C6], wherein the zeolite membrane is for ammonia separation.

[C8] A method for separating ammonia, wherein ammonia gas is allowed to permeate and separated from a mixed gas containing at least ammonia gas and hydrogen gas and/or nitrogen gas by using the zeolite membrane according to any one of [C1] to [C7].

[C9] A method for separating ammonia, wherein ammonia obtained in a step of producing ammonia from hydrogen gas and nitrogen gas is separated by the separation method according to [C8].

In order to solve the above-described problems, the present inventors have further studied separation of ammonia gas by using a zeolite membrane, and found that when a zeolite membrane having a surface in which the molar ratio of alkali metal atoms to Al atoms determined by X-ray photoelectron spectroscopy (XPS) is in a specific range is used, the permeation performance can be improved while maintaining high ammonia gas separation selectivity. The present inventors have also found that the ammonia gas separation performance can be stably maintained even under high temperature conditions by using the present invention. Specifically, the present inventors have found that in order to separate ammonia gas with high selectivity and high permeability from a mixed gas composed of a plurality of components including ammonia gas and hydrogen gas and/or nitrogen gas even under high temperature conditions, among various zeolite membranes, a zeolite membrane having a surface containing a specific molar ratio of alkali metal atoms to Al atoms needs to be used, thereby completing the present invention. The fourth embodiment (Invention D) of the present invention has been achieved based on such findings, and provides the following.

[D1] A zeolite membrane, wherein a molar ratio of alkali metal atoms to Al atoms determined by X-ray photoelectron spectroscopy under the following measurement conditions is from 0.01 to 0.070.
(Measurement Conditions)
X-ray source for measurement: Monochromatic Al-Kα ray, output 16 kV-34 W
Background determination method for quantitative calculation: Shirley method

[D2] The zeolite membrane according to [D1], wherein the molar ratio of nitrogen atoms to Al atoms determined by X-ray photoelectron spectroscopy under the following measurement conditions is from 0.01 to 4.
(Measurement Conditions)
X-ray source for measurement: Monochromatic Al-Kα ray, output 16 kV-34 W
Background determination method for quantitative calculation: Shirley method

[D3] The zeolite membrane according to [D1] or [D2], wherein the zeolite membrane is a zeolite membrane treated with an alkali metal salt.

[D4] The zeolite membrane according to any one of [D1] to [D3], wherein the zeolite membrane is a zeolite membrane treated with an ammonium salt.

[D5] The zeolite membrane according to any one of [D1] to [D4], wherein the zeolite membrane is a zeolite membrane treated with an alkali metal salt after being treated with an ammonium salt.

[D6] The zeolite membrane according to any one of [D1] to [D5], wherein the zeolite is RHO zeolite.

[D7] The zeolite membrane according to any one of [D1] to [D6], wherein the zeolite membrane is for ammonia gas separation.

[D8] A method for separating ammonia, wherein ammonia gas is allowed to permeate and separated from a mixed gas containing at least ammonia gas and hydrogen gas and/or nitrogen gas by using the zeolite membrane according to any one of [D1] to [D7].

[D9] A method for separating ammonia, wherein ammonia obtained in a step of producing ammonia from hydrogen gas and nitrogen gas is separated by the separation method according to [D8].

In order to solve the above-described problems, the present inventors have further studied separation of ammonia gas by using a zeolite membrane composite, and found that although zeolite membranes can separate ammonia gas more selectively and efficiently than existing silica membranes, as described in Reference Example E1 of the present invention, when a zeolite membrane composite obtained by membrane formation of CHA zeolite as proposed in Patent Document 8 in which the change rate of thermal contraction coefficient changes monotonously such that change rates of thermal contraction coefficient at 200° C. and 300° C. with respect to 30° C. are 0.13% and 0.30% (c-axis direction), respectively is used, there is room for improvement because the ammonia gas separation performance decreases particularly in the temperature range higher than 200° C. This is presumably because a crack occurs in the grain boundary of zeolite due to thermal contraction, and gas permeates through the crack. In contrast, the present inventors have found that as in RHO zeolite described in Example E of the present invention, even in the case of zeolite with a change rate of thermal contraction coefficient of 200° C. with respect to 30° C. of 1.55%, which considerably contracts compared with CHA zeolite, and exhibits non-linear thermal expansion/contraction behavior with respect to temperature, when the change rate of thermal expansion coefficient at 300° C. is about 0.02%, ammonia can be efficiently and selectively separated under high temperature conditions exceeding 200° C.

In other words, in order to solve one of the problems of the present invention which is to separate ammonia gas from a gas mixture composed of a plurality of components including ammonia gas, and hydrogen gas, and/or nitrogen gas with high selectivity and high permeability under high temperature conditions, the present inventors have found that among various zeolite membrane composites, a zeolite membrane composite in which a zeolite exhibiting the change rate of a thermal expansion coefficient in a specific temperature region is formed into a membrane needs to be applied, thereby completing the present invention. Herein, the change rate of the thermal expansion coefficient is the change rate of the thermal expansion coefficient in the axial direction where the change rate of the thermal expansion coefficient is maximized. For example, CHA zeolite has different thermal expansion/contraction rates in the a-axis and c-axis directions, and the change rate is larger in the c-axis. Therefore, the change rate of thermal expansion coefficient of CHA is the change rate of thermal expansion coefficient in the c-axis direction. Similarly, MFI zeolite has different thermal expansion/contraction rates in the a-axis, b-axis, and c-axis directions, and the change rate is larger in the c-axis. Therefore, the change rate of thermal expansion coefficient of MFI herein is the change rate of thermal expansion coefficient in the c-axis direction. On the other hand, RHO zeolite is cubic and all crystal axes are equivalent, and therefore the change rate of thermal expansion coefficient is constant regardless of the axial direction. The fifth embodiment (Invention E) of the present invention has been achieved based on such findings, and provides the following.

[E1] A zeolite membrane composite for ammonia separation containing zeolite, wherein a change rate of a thermal expansion coefficient at 300° C. with respect to a thermal expansion coefficient at 30° C. of the zeolite is equal to or within ±0.25% and a change rate of a thermal expansion coefficient at 400° C. with respect to the thermal expansion coefficient at 30° C. of the zeolite is equal to or within ±0.35%.

[E2] The zeolite membrane composite for ammonia separation according to [E1], wherein the change rate of the thermal expansion coefficient at 400° C. with respect to the thermal expansion coefficient at 30° C. of the zeolite with respect to the change rate of the thermal expansion coefficient at 300° C. with respect to the thermal expansion coefficient at 30° C. of the zeolite is equal to or within ±120%.

[E3] The zeolite membrane composite for ammonia separation according to [E1] or [E2], wherein the zeolite is RHO zeolite or MFI zeolite.

[E4] The zeolite membrane composite for ammonia separation according to any one of [E1] to [E3], wherein the zeolite has an $SiO_2/Al_2O_3$ molar ratio of from 6 to 500.

[E5] A method for separating ammonia, wherein ammonia is separated from a gas mixture containing at least ammonia gas, and hydrogen gas, and/or nitrogen gas by using the zeolite membrane composite for separating ammonia gas according to any one of [E1] to [E4].

[E6] A method for separating ammonia, wherein ammonia obtained in a step of producing ammonia from hydrogen gas and nitrogen gas is separated by the separation method according to [E5].

The second to fifth embodiments are techniques related to an ammonia gas separation membrane that contributes to completion of an energy-saving production process of ammonia, and are techniques that can be expected to be applied to a reaction-separation-type ammonia production process which is one embodiment of the present invention.

Advantageous Effects of Invention

According to the first embodiment of the present invention, ammonia gas can be separated from a mixed gas composed of a plurality of components including ammonia gas, hydrogen gas, and nitrogen gas to the permeation side continuously and efficiency with high selectivity. Since the method of the present invention can be used stably even under high temperature conditions exceeding 50° C. and even 200° C., the ammonia gas permeability is high. As a result, the membrane area required for separation can be reduced, and ammonia separation can be performed at a low cost with a small-scale facility.

Specific examples of application of the zeolite membrane of the present invention include an ammonia production process as typified by the Haber-Bosch process, and in this process, when recovering ammonia from a mixed gas composed of a plurality of components including ammonia gas and hydrogen gas and nitrogen gas recovered from a reactor, ammonia can be separated more efficiently than conventional cold condensation separation method, and therefore, the cooling energy for ammonia condensation can be reduced.

In another aspect, the zeolite membrane of the present invention can stably separate ammonia gas from a mixed gas composed of a plurality of components including ammonia gas, hydrogen gas, and nitrogen gas to the permeation side with high permeability, even under high temperature conditions, a reaction-separation-type ammonia production process in which the zeolite membrane of the present invention is installed in a reactor, and ammonia gas generated is recovered at the same time while ammonia gas is generated can be designed.

According to the second to fifth embodiments of the present invention, even under high temperature conditions, ammonia gas can be separated continuously from a mixed gas composed of a plurality of components including ammonia gas, and hydrogen gas, and/or nitrogen gas to the permeation side stably and efficiently with high selectivity. Since the zeolite membrane of the present invention can be used stably even under higher temperature conditions, the ammonia gas permeability is high. As a result, the membrane area required for separation can be reduced, and ammonia gas separation can be performed at a low cost with a small-scale facility.

Specific examples of application of the zeolite membrane of the present invention include an ammonia production process represented by the Haber-Bosch process, and in this process, when recovering ammonia from a mixed gas composed of a plurality of components including ammonia gas and hydrogen gas and/or nitrogen gas recovered from a reactor, ammonia can be separated more efficiently than conventional cold condensation separation method, and therefore, the cooling energy for ammonia condensation can be reduced.

In another aspect, the zeolite membrane of the present invention can stably separate ammonia gas from a mixed gas composed of a plurality of components including ammonia gas, and hydrogen gas, and/or nitrogen gas to the permeation side with high permeability, even under high temperature conditions, a reaction-separation-type ammonia production process in which the zeolite membrane of the present invention is installed in a reactor, and ammonia gas generated at the same time is recovered while ammonia gas is generated can be designed.

In particular, when the first to fifth embodiments are applied to a reaction-separation-type ammonia production process, not only reduction of reaction pressure during ammonia production is expected but also considerable improvement in conversion rate of raw material gas to ammonia gas and reduction of the amount of recovered gas recycled to a reactor during production can be expected. In other words, a reaction-separation-type ammonia production process employing the zeolite membrane of the present invention enables suppression of energy consumption during production, and energy-saving ammonia production also excellent in economical efficiency.

DESCRIPTION OF EMBODIMENTS

Figure 1:
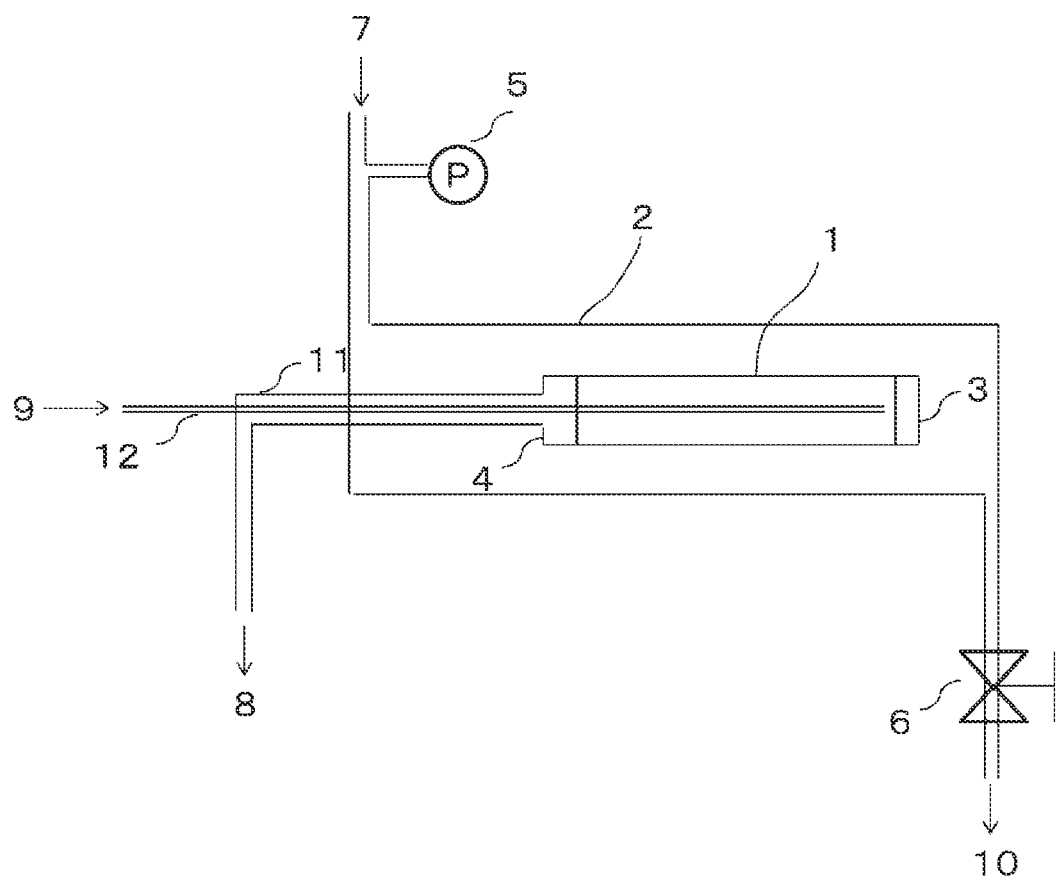
FIG. 1 is a schematic diagram showing a configuration of an apparatus used in an ammonia gas separation test in Examples.

Hereinafter, although the embodiment of the present invention will be described in more detail, the description of the constituent elements described below is an example of the embodiment of the present invention, and the present invention is not limited thereto. Various modifications can be made within the scope of the present invention. The zeolite herein is a zeolite defined by the International Zeolite Association (IZA). The structure is characterized by X-ray diffraction data. Herein, "porous support-zeolite membrane composite in which a zeolite membrane is formed on a porous support" may be referred to as "zeolite membrane composite" or "membrane composite". "Porous support" may be simply abbreviated as "support", and "aluminosilicate zeolite" is sometimes simply referred to as "zeolite". Furthermore, herein, "hydrogen gas", "nitrogen gas", and "ammonia gas" may be simply referred to as "hydrogen", "nitrogen", and "ammonia", respectively. On the other hand, ammonia separation in the present invention means obtaining a mixed gas containing a higher concentration of ammonia gas from a mixed gas containing ammonia gas.

The first embodiment of the ammonia separation method of the present invention (Invention A) is a method for stable and continuous separation of ammonia from a mixed gas composed of a plurality of components including at least ammonia, hydrogen, and nitrogen to the permeation side with high permeability and high selectivity using a zeolite membrane, and is characterized in that ammonia is selectively allowed to permeate and separated from a mixed gas of hydrogen and nitrogen containing a specific amount of ammonia.

Another embodiment of the method for separating ammonia of the present invention is characterized in that a mixed gas composed of a plurality of components including ammonia and hydrogen and/or nitrogen is brought into contact with a specific zeolite membrane, and ammonia is selectively allowed to permeate and separated from the mixed gas.

Details will be described below.

<Method for Producing Ammonia>

Since the ammonia separation method according to the present embodiment can be used effectively when efficiently separating ammonia from a mixed gas containing at least ammonia, hydrogen, and nitrogen, it is effective to use the method in combination with a method for producing ammonia from which such a mixed gas can be obtained. Specifically, in addition to a method for producing ammonia, including a first step of producing ammonia from hydrogen and nitrogen and a second step of separating ammonia obtained in the first step by the ammonia separation method described below, wherein ammonia obtained in the first step is separated in the second step, a method for producing ammonia, wherein the first step and the second step proceed in one reactor is also a preferred embodiment of the present invention. That the first step and the second step proceed in one reactor means that the first step and the second step proceed simultaneously. In other words, in one embodiment of the present invention, ammonia gas can be produced from hydrogen gas and nitrogen gas in a container, and ammonia can be efficiently produced while separating ammonia from a mixed gas containing ammonia gas produced in the container.

There is no particular limitation on the industrial production method of ammonia, and examples thereof include the Haber-Bosch process. In this method, a process in which iron oxide is basically used as a catalyst, and ammonia is produced by reacting nitrogen gas and hydrogen gas on the catalyst at a high temperature and high pressure of from 300 to 500° C. and from 10 to 40 MPa, and while produced ammonia contained in gas at an outlet of a reactor is cooled and condensed and recovered as a product, and unreacted nitrogen and hydrogen gas is separated and recycled as raw material gas is adopted. As an improved method of the Haber-Bosch process, a Ru-based supported catalyst capable of producing ammonia under a lower pressure condition was developed in the 1980s, and while a process combined with the Haber-Bosch process has been industrialized, the basic production process has not changed for 100 years. As described above, industrial catalysts for ammonia production are generally roughly classified into iron-based catalysts and Ru-based catalysts. Although the molar ratio of raw material gas used in production of ammonia is preferably a theoretical ratio of hydrogen/nitrogen=3, since Ru-based catalysts are likely to be poisoned by hydrogen, production conditions with a reduced molar ratio of hydrogen/nitrogen are preferably used. In view of this, a catalytic process of ammonia production combined with the ammonia separation technique of the present invention is not particularly limited, and since a value close to a preferable volume ratio of hydrogen gas/nitrogen gas contained in a supply gas in the ammonia separation described below can be obtained, a process using a Ru-based catalyst is preferable, and this combination can reduce the hydrogen permeation amount in separation of ammonia to be produced.

<Method for Separating Ammonia>

The first embodiment of the method for separating ammonia of the present invention is characterized in that, using a zeolite membrane, a mixed gas composed of a plurality of components including ammonia, hydrogen, and nitrogen is brought into contact with the zeolite membrane, and ammonia is selectively permeated and separated from the mixed gas.

The method for separating ammonia of the present invention is characterized in that, using a specific zeolite membrane, a mixed gas composed of a plurality of components including ammonia, hydrogen, and/or nitrogen is brought into contact with the zeolite membrane, and ammonia is selectively permeated and separated from the mixed gas.

As described above, according to the present invention, ammonia gas can be produced from hydrogen gas and nitrogen gas in a reactor, and ammonia can be efficiently produced and recovered in the reactor while allowing produced ammonia gas to permeate using a zeolite membrane.

Ammonia separation by the zeolite membrane in the present invention is mainly based on the hopping mechanism of ammonia in zeolite pores, and also utilizes a molecular sieve by controlling the pore diameter of the zeolite membrane by adsorbed ammonia, ammonium ions, or the like. By the former action, ammonia having high affinity with the zeolite membrane can permeate the zeolite membrane with high selectivity, and since the latter action efficiently separates gas molecules having the size of the effective pore diameter of an ammonia-adsorbed zeolite membrane or more and gas molecules having the size of less than that, ammonia can be more effectively separated.

Although factors of considerable improvement in the ammonia permeation selectivity by a hopping mechanism of ammonia in zeolite pores are not yet known in detail, such an improvement is due to the fact that the pore diameter in the zeolite membrane is narrowed by adsorbed ammonia and ammonium ions contained in zeolite, and therefore the permeation amount of hydrogen gas having a particularly small molecular size can be reduced. Since this action narrows pores of the zeolite membrane in the same manner even when zeolite having a pore diameter larger than the molecular size of hydrogen gas, nitrogen gas, or ammonia gas is used, inhibition of permeation of nitrogen gas or hydrogen gas appears. On the other hand, adsorbed ammonia and ammonium ions contained in the zeolite pores can cause hopping movement by adsorption/desorption of ammonia in the pores, and this behavior causes selective separation of ammonia gas.

The first embodiment of the present invention (Invention A) is characterized by separating ammonia based on the hopping mechanism of ammonia in the zeolite pores by utilizing adsorption of ammonia to zeolite as described above, and therefore, the ammonia gas concentration in a supply gas containing hydrogen gas, nitrogen gas, and ammonia gas needs to be controlled to a specific amount or more. The concentration is important to be 1.0% by volume or more as the concentration of ammonia gas in a supply gas. This is because ammonia adsorbed on zeolite and ammonia gas is in an adsorption equilibrium relationship with ammonia gas in a gas phase, and the adsorption ability of ammonia to the zeolite greatly depends on the ammonia gas concentration in the supply gas. As shown in Comparative Examples of the present invention, even when the ammonia gas concentration is less than 1.0% by volume, some ammonia permeation selectivity is exhibited, but the effect is not considerable. Therefore, in the present invention, it is important to use a supply gas having an ammonia gas concentration of 1.0% by volume or more, and when such a gas is brought into contact with a zeolite membrane under a pressurized condition, adsorption of ammonia to zeolite can be effectively caused, and the ammonia separation selectivity from the supply gas can be improved. In addition, when a supply gas having an ammonia gas concentration of 1.0% by volume or more is used, the ammonia gas concentration in the supply gas is improved, and therefore, the permeation amount is also improved. When the ammonia gas concentration in the mixed gas is 1.0% by volume or more, ammonia may be produced under conditions such that the ammonia gas concentration in the mixed gas obtained when producing ammonia is 1.0% by volume or more. Among the above, the ammonia gas concentration in the supply gas is preferably 2.0% by volume or more, more preferably 3.0% by volume or more, and particularly preferably 5.0% by volume or more. On the other hand, the upper limit of the ammonia gas concentration in the supply gas is not particularly limited, and is usually less than 100% by volume since the separation performance is improved as the concentration is higher, and because of the need to separate ammonia, the ammonia gas concentration is generally 80% by volume or less, preferably 60% by volume or less, and more preferably 40% by volume or less. The ammonia concentration in terms of % by volume in the supply gas is considered to correspond to the molar fraction of ammonia obtained by collecting the supply gas and analyzing the components. Similarly, the concentration of another gas in terms of % by volume is also considered to correspond to the molar fraction of the gas. On the other hand, when ammonia is separated in combination with an ammonia production process, the ammonia concentration is equal to or less than the equilibrium concentration of ammonia produced under production process conditions of the production process. In contrast to a known method for selectively allowing hydrogen gas and/or nitrogen gas in a mixed gas of hydrogen, nitrogen, and ammonia to permeate, the ammonia separation technique using the present invention is a process for separating ammonia from a supply gas, and therefore, ammonia separation from a mixed gas containing a high concentration of ammonia is advantageous. Even when, if necessary, adopting a step of recovering hydrogen gas from a mixed gas on the non-permeation side that did not permeate the membrane after the separation, the above-described problems in a known process of concentrating ammonia by separating hydrogen and/or nitrogen from a supply gas are less likely to occur due to the design of recovering hydrogen from the mixed gas whose ammonia gas concentration is sufficiently lowered. For example, the separation technique of the present invention is characterized by considerably improving ammonia separation performance and high separation stability during high-temperature operation or long-term operation as compared with Patent Document 7.

As described above, although factors of considerable improvement in the ammonia permeation selectivity that permeates the zeolite membrane when the ammonia gas concentration in the mixed gas of hydrogen, nitrogen, and ammonia is a specific amount or more are not yet known in detail, when the ammonia gas concentration in the mixed gas is increased, adsorption to zeolite is likely to occur due to the adsorption equilibrium between ammonia gas and zeolite, and a zeolite membrane in which ammonia is adsorbed in pores is first generated. Since an ammonia-adsorbed zeolite membrane produced in this way narrows the pore diameter in the zeolite membrane, the permeation amount of hydrogen with a small molecular size can be reduced. Since this action narrows the pores of the zeolite membrane in the same manner even when zeolite having a pore diameter larger than the molecular sizes of hydrogen, nitrogen, and ammonia is used, hydrogen permeation inhibition is considerably exhibited. On the other hand, ammonia adsorbed in the zeolite pores can cause hopping movement by adsorption/desorption of ammonia in pores due to the pressure difference between the inside and outside of the membrane, and this behavior causes selective separation of ammonia.

In other words, the present invention is a technique that first aggressively adsorbs ammonia on zeolite to control the pore diameter of a zeolite membrane to increase the ammonia separation selectivity while selectively allowing ammonia to permeate using hopping movement by adsorption/desorption of ammonia in pores. In contrast, Patent Document 8 is greatly different from the present invention in that a technique to design zeolite that does not cause such adsorption and to separate ammonia by molecular sieve using the pore diameter of zeolite is proposed since such an ammonia-adsorbed zeolite membrane causes clogging in ammonia permeation. On the other hand, the silica film as proposed in Patent Document 7 hardly adsorbs ammonia, and even when ammonia is adsorbed, the heat stability is low, and therefore, an effect of the present invention is not exhibited.

On the other hand, in the present invention in which ammonia is separated mainly by utilizing a hopping mechanism in pores accompanied by adsorption/desorption of ammonia to zeolite, the ammonia separation temperature is one of important design factors since the temperature greatly affects the long-term durability of a zeolite membrane used, the ammonia separation performance of a zeolite membrane, and the production energy balance of the entire process when combined with ammonia production facilities. From these viewpoints, in the present invention, when separating a product gas in ammonia synthesis, the temperature during ammonia separation is usually the same as or lower than the synthesis temperature of ammonia, and the temperature during ammonia separation is the temperature in a separator that performs ammonia separation, or the temperature of a mixed gas used for the separation or the temperature of the separated ammonia gas. The temperature of a separation membrane can be regarded as almost the same as the temperature in a separator. From the design of an ammonia production process, it is preferable to perform separation at the same temperature as the synthesis temperature since it is not necessary to raise the temperature of hydrogen and nitrogen to be recycled to a reactor. For this reason, although a preferable temperature in the case of ammonia separation depends on the reaction temperature in an ammonia synthesis reaction, the temperature is usually 500° C. or lower, preferably 450° C. or lower, and more preferably 400° C. or lower. When ammonia is separated under these temperature conditions using the zeolite membrane of the present invention, not only continuous operation over a long period of time is possible, but also high ammonia permeation selectivity is exhibited since the zeolite membrane has high stability. On the other hand, the lower limit is usually a temperature higher than 50° C., preferably 100° C. or higher, more preferably 150° C. or higher, further preferably 200° C. or higher, especially preferably 250° C. or higher, and particularly preferably 300° C. or higher. When ammonia is separated under these temperature conditions, the desorption rate of ammonia adsorbed in zeolite pores is improved, and as a result, the ammonia permeation amount of a zeolite membrane is improved. When a raw material gas is recycled in an ammonia production process, ammonia separation under a higher temperature condition is preferable since energy required to raise the temperature of hydrogen and nitrogen is reduced, and from this viewpoint, the lower limit of the temperature is preferably 250° C. or higher, and more preferably 300° C. or higher.

In the method for separating ammonia by hopping movement in pores as in the present invention, the rate can be controlled by controlling the molar ratio of alkali metal atoms to Al atoms in zeolite pores to be less than the saturation amount ratio, and as a result, control of the molar ratio is important and may be preferred in combination with a method for controlling the molar ratio to from 0.01 to 0.070 as in the fourth embodiment of the present invention.

The composition of another gas in a supply gas (mixed gas) is not particularly limited, and the volume ratio of hydrogen gas/nitrogen gas contained in the supply gas is usually 3 or less, and more preferably 2 or less. By adjusting to this volume ratio, the permeation amount of hydrogen during ammonia separation is reduced, and the ammonia separation selectivity is improved. For this reason, when a supply gas of the ammonia separation process of the present invention is obtained from an ammonia production process, although not particularly limited thereto, it is preferable to combine with a Ru-based catalytic process of ammonia production with a low volume ratio of hydrogen gas/nitrogen gas in raw material gas. On the other hand, since the smaller the lower limit, the better the ammonia separation selectivity, the lower limit is not particularly limited, and is usually 0.2 or more, preferably 0.3 or more, and more preferably 0.5 or more. Here, the upper limit and lower limit values are valid within the range of significant figures, and specifically, the upper limit of 3 or less means from 2.5 to less than 3.5, while 0.2 or more means from 0.15 to less than 0.25, and 1.0 or more means from 0.95 to less than 1.05.

In a preferred aspect of the present invention, the higher the pressure of a supply gas (mixed gas), the more the separation performance of a zeolite membrane is improved, and the area of the zeolite membrane to be used can be reduced. The pressure is not particularly limited as long as the pressure is equal to or higher than atmospheric pressure, and a membrane may be used at a desired pressure by appropriately adjusting the pressure. When the pressure of gas to be separated is lower than the pressure used for separation, the gas can be used by increasing the pressure with a compressor or the like.

The pressure of a supply gas is usually atmospheric pressure or higher than atmospheric pressure, and preferably 0.1 MPa or more, and more preferably 0.2 MPa or more. The upper limit value is usually 20 MPa or less, and preferably 10 MPa or less, and more preferably 5 MPa or less, and may be 3 MPa or less.

The pressure on the permeation side is not particularly limited as long as the pressure is lower than the pressure of gas on the supply side, and is usually 10 MPa or less, preferably 5 MPa or less, more preferably 1 MPa or less, and further preferably 0.5 MPa or less, and in some cases, the pressure may be lowered to a pressure of atmospheric pressure or less. When separating until the ammonia concentration in a supply gas is low, the permeation side is preferably at a low pressure, and when the pressure is reduced to a pressure below atmospheric pressure, ammonia can be separated until the ammonia gas concentration in the supply gas becomes lower.

The differential pressure between gas on the supply side and gas on the permeation side is not particularly limited, and is usually 20 MPa or less, preferably 10 MPa or less, more preferably 5 MPa or less, and still more preferably 1 MPa or less. The differential pressure is usually 0.001 MPa or more, and preferably 0.01 MPa or more, and more preferably 0.02 MPa or more.

Here, the differential pressure refers to the difference between the partial pressure on the gas supply side and the partial pressure on the permeation side. The pressure [Pa] indicates an absolute pressure unless otherwise specified.

The flow rate of a supply gas is such that can compensate for the decrease due to permeating gas, and the flow rate may be such that the supply gas can be mixed in such a manner that the concentration of gas in the vicinity of gas with a low permeability in the supply gas matches the concentration in the entire gas, and, depending on the tube diameter of the zeolite membrane composite and the separation performance of the membrane, the flow rate as the linear velocity is usually 0.001 mm/sec or more, and preferably 0.01 mm/sec or more, more preferably 0.1 mm/sec or more, still more preferably 0.5 mm/sec or more, and especially preferably 1 mm/sec or more, and the upper limit is not particularly limited, and is usually 1 m/sec or less, and preferably 0.5 m/sec or less.

In the method for separating ammonia from a mixed gas of the present invention, a sweep gas may be used. The sweep gas means gas supplied to efficiently recover ammonia permeated through a separation membrane, and is gas supplied to the permeation side of the separation membrane, not gas introduced to the supply gas side before separation permeation. Specifically, the sweep gas is gas supplied separately from the supply gas before separation and permeation, and gas of a different kind from the supply gas is allowed to flow on the permeation side to recover the gas that has permeated through the membrane. The sweep gas used in the present invention refers to, for example, gas 9 supplied from a line 12 shown in FIG. 1. The pressure of the sweep gas is usually atmospheric pressure, and is not particularly limited to atmospheric pressure, and preferably 20 MPa or less, more preferably 10 MPa or less, and still more preferably 1 MPa or less, and the lower limit is preferably 0.09 MPa or more, and more preferably 0.1 MPa or more. In some cases, the pressure may be reduced.

The flow rate of the sweep gas is not particularly limited, and the flow rate as the linear velocity is usually 0.5 mm/sec or more, and preferably 1 mm/sec or more, and the upper limit is not particularly limited, and is usually 1 m/sec or less, and preferably 0.5 m/sec or less.

An apparatus used for gas separation is not particularly limited, and usually a zeolite membrane composite made into a membrane module is used (hereinafter, "zeolite membrane composite and/or separation apparatus using zeolite membrane composite" may be simply referred to as "membrane module"). The membrane module may be, for example, an apparatus as schematically shown in FIG. 1, and for example, a membrane module exemplified in "Gas Separation/Purification Technology", TORAY Research Center, Inc, 2007, page 22, and the like may be used.

A separation operation of a mixed gas in the apparatus of FIG. 1 will be described in a section of Examples.

When performing membrane separation of ammonia from a mixed gas, membrane modules may be used in multiple stages. In this case, gas for separation may be supplied to the first-stage membrane module, and the non-permeation side gas that has not permeated the membrane may be supplied to the second-stage membrane module, or the permeated gas may be supplied to the second-stage membrane module. In the former method, the concentration of a low permeable component on the non-permeation side can be further increased, and in the latter method, the concentration of a highly permeable component in the permeated gas can be further increased. A method combining these methods can also be suitably used.

When separation is performed by membrane modules provided in multiple stages, the pressure of a supply gas may be adjusted with a booster or the like as necessary when supplying gas to a subsequent membrane module.

When membrane modules are used in multiple stages, membranes having different performance may be installed in each stage. In general, regarding membrane performance, a membrane having high permeation performance has low separation performance, while a membrane having high separation performance tends to have low permeation performance. For this reason, when processing until a gas component to be separated or concentrated reaches a predetermined concentration, while a membrane having high permeability reduces a required membrane area, a low permeable component is likely to be permeated to the permeation side, and therefore, the concentration of a highly permeable component in the permeation side gas tends to be low. Conversely, in a membrane with high separation performance, permeation of a low permeable component to the permeation side is unlikely to occur, and for this reason, although the concentration of a highly permeable component in the permeation side gas is high, a required membrane area tends to become large. While it is difficult to control the relationship between the required membrane area and the permeation or non-permeation amount of gas for concentration or separation by separation with one kind of membrane, it is easy to control the relationship when membranes with different performances are used. Depending on the membrane cost and the price of gas to be separated or recovered, a membrane can be installed in such a manner that an optimum relationship between the membrane area and the permeation or non-permeation amount of gas for concentration or separation can be obtained, and the overall merit can be maximized.

For example, when ammonia cannot be sufficiently separated by one-stage membrane separation, the non-permeation side gas can be further separated by several stages of membranes. In the case of one-stage membrane separation, the separation of ammonia/hydrogen in the membrane is not sufficient, and when a lot of hydrogen is contained on the permeation side together with ammonia, it is also possible to separate the permeated gas with a membrane having high separation performance of ammonia and hydrogen.

The zeolite membrane used in the present invention has excellent chemical resistance, oxidation resistance, heat stability, and pressure resistance, and exhibits high ammonia permeation performance and separation performance, and excellent durability.

The high permeation performance herein indicates a sufficient throughput, and for example, when ammonia is permeated at a temperature of 200° C. and a differential pressure of 0.3 MPa, for example, the permeance of a gas component that permeates a membrane [mol/(m²·s·Pa)] is usually $1\times10^{-9}$ or more, and preferably $5\times10^{-9}$ or more, more preferably $1\times10^{-8}$ or more, still more preferably $2\times10^{-8}$ or more, especially preferably $5\times10^{-8}$ or more, particularly preferably $1\times10^{-7}$ or more, and most preferably $2\times10^{-7}$ or more. The upper limit is not particularly limited, and is usually $3\times10^{-4}$ or less.

The permeance [mol/(m²·s·Pa)] of the zeolite membrane composite used in the present invention is, for example, when nitrogen is permeated under the same conditions, usually $5\times10^{-8}$ or less, preferably $3\times10^{-8}$ or less, more preferably $1\times10^{-8}$ or less, particularly preferably $5\times10^{-9}$ or less, and most preferably $1\times10^{-9}$ or less, and ideally, the permeance is 0, and may be on the order of from $1\times10^{-10}$ to $1\times10^{-14}$ in practice.

Herein, the permeance (also referred to as "permeability") is obtained by dividing the amount of permeated substance by the product of the membrane area, time, and the partial pressure difference between the supply side and the permeation side of the permeated substance, the unit thereof is [mol/(m²·s·Pa)], and the value thereof is a value calculated by the method described in a section of Examples.

The selectivity of a zeolite membrane is expressed by an ideal separation factor and a separation factor. The ideal separation factor and the separation factor are indicators that represent the selectivity generally used in membrane separation, and the ideal separation factor is a value calculated by the method described in a section of Examples, and the separation factor is a value calculated as follows.

When obtaining the separation coefficient α, the following formula is used.

$$\alpha = (Q'1/Q'2)/(P'1/P'2)$$

[In the above formula, Q'1 and Q'2 indicate the permeation amount of a highly permeable gas and the permeation amount of a low permeable gas [mol/(m²·s·Pa)], respectively, and P'1 and P'2 indicate partial pressures [Pa] of the highly permeable gas and the low permeable gas in a supply gas, respectively.]

The separation factor α can also be obtained as follows.

$$\alpha = (C'1/C'2)/(C1/C2)$$

[In the above formula, C'1 and C'2 indicate the concentration of a highly permeable gas and the concentration of a low permeable gas [% by volume] in the permeated gas, and C1 and C2 indicate the concentration of the highly permeable gas and the concentration of the low permeable gas [% by volume] in a supply gas, respectively.]

The ideal separation factor is, for example, when ammonia and nitrogen are permeated at a temperature of 200° C. and a differential pressure of 0.3 MPa, usually 15 or more, and preferably 20 or more, more preferably 25 or more, and most preferably 30 or more. The ideal separation factor is, when ammonia and hydrogen are permeated at a temperature of 200° C. and a differential pressure of 0.3 MPa, usually 2 or more, and preferably 3 or more, more preferably 5 or more, still more preferably 7 or more, especially preferably 8 or more, particularly preferably 10 or more, and most preferably 15 or more. The upper limit of the ideal separation factor is in a case where only ammonia is completely permeated, and in this case, the upper limit is infinite, and in practice, the separation factor may be about 100,000 or less.

The separation factor of the zeolite membrane used in the present invention is for example, when a mixed gas of 1:1 volume ratio of ammonia and nitrogen is permeated at a temperature of 50° C. and a differential pressure of 0.1 MPa, usually 2 or more, and preferably 3 or more, more preferably 4 or more, and further preferably 5 or more. The upper limit of the separation factor is in a case where only ammonia is completely permeated, and in this case, the separation factor is infinite, and in practice, the separation factor may be about 100,000 or less.

The zeolite membrane used in the present invention, as described above, is excellent in chemical resistance, oxidation resistance, heat stability, pressure resistance, and exhibits high permeation performance, separation performance, and is excellent in durability, and the ammonia separation method of the present invention using such a zeolite membrane can be applied to separation of ammonia from a product of ammonia synthesis. The method for separating ammonia of the present invention can also be utilized as a membrane reactor in which a zeolite membrane is installed in an ammonia synthesis reactor and ammonia is selectively permeated and separated in the reactor to shift the equilibrium of hydrogen gas, nitrogen gas, and ammonia gas in a reaction system and efficiently synthesize ammonia at a high conversion rate.

(Zeolite)

In the present invention, zeolite constituting a zeolite membrane is an aluminosilicate. An aluminosilicate is composed mainly of Si and Al oxides, and may contain another element as long as an effect of the present invention is not impaired. A cationic species contained in the zeolite of the present invention is preferably a cationic species that easily coordinates to an ion exchange site of the zeolite, such as a cationic species selected from the group of elements of group 1, group 2, group 8, group 9, group 10, group 11, and group 12 of the periodic table, $NH_4^+$, and two or more cationic species thereof, and more preferably a cationic species selected from the group 1 and group 2 elements of the periodic table, $NH_4^+$, and two or more cationic species thereof.

The zeolite used in the present invention is an aluminosilicate. The $SiO_2/Al_2O_3$ molar ratio of the aluminosilicate is not particularly limited, and is usually 6 or more, preferably 7 or more, and more preferably 8 or more, and the molar ratio is usually 500 or less, and preferably 100 or less, more preferably 80 or less, still more preferably, 50 or less, especially preferably 45 or less, particularly preferably 30 or less, and most preferably 25 or less. Use of zeolite having such a specific region $SiO_2/Al_2O_3$ molar ratio is preferable because the denseness of a zeolite membrane and durability such as chemical reaction resistance and heat resistance can be improved. From the viewpoint of the separation performance that allows ammonia in a mixed gas composed of a plurality of components including ammonia, hydrogen, and nitrogen to permeate, from a reason that an acid site of Al element becomes an adsorption site of ammonia as described above, it is preferable to use a zeolite containing more Al, and by using zeolite having the above-described $SiO_2/Al_2O_3$ molar ratio, ammonia can be separated with high permeability and high selectivity.

The $SiO_2/Al_2O_3$ molar ratio of zeolite can be adjusted by the reaction conditions of hydrothermal synthesis described below.

Herein, the $SiO_2/Al_2O_3$ molar ratio is a numerical value determined by scanning electron microscope-energy dispersive X-ray spectroscopy (SEM-EDX). In this case, in order to obtain information only on a membrane having a thickness of several microns, measurement is usually performed with an X-ray acceleration voltage of 10 kV.

Examples of the structure of the zeolite used in the present invention each represented by a code defined by the International Zeolite Association (IZA) include ABW, ACO, AEI, AEN, AFI, AFT, AFX, ANA, ATN, ATT, ATV, AWO, AWW, BIK, CHA, DDR, DFT, EAB, EPI, ERI, ESV, GIS, GOO, ITE, JBW, KFI, LEV, LTA, MER, MON, MTF, OWE, PAU, PHI, RHO, RTE, RWR, SAS, SAT, SAV, SIV, TSC, UFI, VNI, YUG, AEL, AFO, AHT, DAC, FER, HEU, IMF, ITH, MEL, MFS, MWW, OBW, RRO, SFG, STI, SZR, TER, TON, TUN, WEI, MFI, MON, PAU, PHI, MOR, and FAU.

Among them, preferred is zeolite having a framework density of 18.0 $T/nm^3$ or less, more preferred is AEI, AFX, CHA, DDR, ERI, LEV, RHO, MOR, MFI, or FAU, still preferred is AEI, CHA, DDR, RHO, MOR, MFI, or FAU, particularly preferred is CHA, RHO, or MFI, and most preferred is RHO or MFI. When there are permeation components other than ammonia in a mixed gas containing ammonia by using zeolite with a low framework density, the resistance at the time of permeation of those permeation components can be reduced, and the permeation amount of ammonia can be easily increased.

In the fifth embodiment of the present invention (zeolite membrane composite E), preferred is a zeolite having a framework density of 18.0 $T/nm^3$ or less, more preferred is AFX, DDR, ERI, LEV, RHO, MOR, MFI, or FAU, still more preferred is DDR, RHO, MOR, MFI, or FAU, and most preferred is RHO or MFI.

Here, the framework density (unit: $T/nm^3$) means the number of T atoms (atoms other than oxygen among the atoms constituting the skeleton of zeolite) present per unit volume (1 $nm^3$) of zeolite, and this value is determined by the structure of zeolite. The relationship between the framework density and the structure of zeolite is shown in ATLAS OF ZEOLITE FRAMEWORK TYPES Sixth Revised Edition 2007 ELSEVIER.

The membrane separation of ammonia and hydrogen and nitrogen of the present invention is characterized by ammonia separation based on a hopping mechanism of ammonia in a zeolite pore, utilizing adsorption of ammonia to zeolite, and although there is no particular limitation, zeolite having a pore diameter close to the molecular diameter of ammonia may be preferable because ammonia separation selectivity is improved. From this point of view, the zeolite structure preferably has an oxygen 8-membered ring pore. On the other hand, although a pore having a size larger than that of oxygen 8-membered ring is preferable in that the ammonia permeability is high, the separation performance from hydrogen and/or nitrogen may be lowered. However, in the case of using a zeolite having a pore having a size larger than that of an oxygen 8-membered ring, when zeolite having a reduced $SiO_2/Al_2O_3$ molar ratio is used, ammonia can be separated with high permeability and high selectivity since the pore diameter of the zeolite membrane is controlled by ammonia adsorbed on the Al site.

Accordingly, the effective pore diameter of zeolite used for membrane separation greatly affects the pore diameter of a zeolite membrane to which ammonia has been adsorbed, and thus is an important design factor. The effective pore diameter of zeolite can also be controlled by a metal species introduced into the zeolite, ion exchange, an acid treatment, a silylation treatment, and the like. It is also possible to improve the separation performance by controlling the effective pore diameter by another method.

For example, the pore diameter of zeolite is slightly affected by the atomic diameter of a metal species introduced into the zeolite framework. When a metal having an atomic diameter smaller than that of silicon, specifically, such as boron (B) is introduced, the pore diameter is reduced, and when a metal having an atomic diameter larger than that of silicon, specifically, such as tin (Sn) is introduced, the pore diameter is increased. The pore diameter may be affected by desorbing a metal introduced into the zeolite skeleton by an acid treatment.

When an ion in zeolite is exchanged with a monovalent ion having a large ionic radius by ion exchange, the effective pore diameter becomes small, and on the other hand, when ion exchange is performed with a monovalent ion having a small ion radius, the effective pore diameter is close to the pore diameter of the zeolite structure.

The effective pore diameter of zeolite can be reduced also by a silylation treatment. For example, by silylating a terminal silanol on the outer surface of a zeolite membrane and further layering a silylated layer, the effective pore diameter of a pore facing the outer surface of zeolite is reduced.

The separation function of the zeolite membrane composite used in the present invention is not particularly limited, and is exhibited by controlling the affinity and adsorption performance of gas molecules to the zeolite membrane by controlling the surface physical properties of the zeolite. In other words, by controlling the polarity of zeolite, the adsorption performance of ammonia to the zeolite can be controlled to facilitate permeation.

For example, as in the second embodiment of the present invention, by controlling the polarity of zeolite by the presence of nitrogen atoms, the affinity of ammonia for zeolite can be controlled to facilitate permeation.

The polarity can be increased by substituting a Si atom of the zeolite skeleton with an Al atom, whereby gas molecules having a high polarity such as ammonia can be actively adsorbed and permeated into the zeolite pores. It is also possible to control the polarity of resulting zeolite by adding an atomic source other than an Al atomic source such as Ga, Fe, B, Ti, Zr, Sn, or Zn to an aqueous reaction mixture of hydrothermal synthesis.

In addition, the permeation amount can be controlled by controlling not only the pore diameter of zeolite but also the adsorption performance of molecules by ion exchange.

(Zeolite Membrane)

The zeolite membrane in the present invention is a membrane-like material composed of zeolite, and is preferably formed by crystallizing zeolite on the surface of a porous support. As a component constituting the membrane, an inorganic binder such as silica or alumina, an organic substance such as a polymer, a silylating agent for modifying the zeolite surface, or the like may be included as necessary in addition to zeolite.

A preferred zeolite contained in the zeolite membrane used in the present invention is as described above, and the zeolite contained in the zeolite membrane may be one kind or a plurality of kinds thereof. Zeolite that is easily generated in a mixed phase such as ANA, GIS, or MER, or an amorphous component other than crystals may be contained.

One of the other embodiments of the present invention (zeolite membrane B) is a zeolite membrane containing zeolite, wherein the molar ratio of nitrogen element to Al element determined by X-ray photoelectron spectroscopy is from 0.01 to 4. The zeolite membrane B is particularly preferably used in the ammonia separation method of the first embodiment.

The zeolite membrane B is preferably a zeolite membrane having a surface in which the molar ratio of nitrogen atoms to Al atoms determined by X-ray photoelectron spectroscopy (XPS) is in a specific range. Here, the surface of the zeolite membrane herein means a surface of the zeolite membrane on the side of supplying a mixed gas composed of a plurality of components including ammonia and hydrogen and/or nitrogen for separating ammonia, and means a surface with which a porous support is not in contact when the zeolite membrane composite is used in the form of a film formed on the porous support. Herein, the molar ratio of nitrogen atoms to Al atoms contained in the zeolite membrane is a numerical value determined by X-ray photoelectron spectroscopy (XPS) under the following measurement conditions.

(Measurement Conditions)

X-ray source for measurement: Monochromatic Al-Kα ray, output 16 kV-34 W

Background determination method for quantitative calculation: Shirley method

In the second embodiment of the present invention, the content of nitrogen atoms contained in the zeolite membrane surface determined by the XPS measurement is, in terms of molar ratio with respect to Al atoms on the zeolite membrane surface, usually 0.01 or more, and preferably 0.05 or more, more preferably 0.10 or more, still more preferably 0.20 or more, especially preferably 0.30 or more, and particularly preferably 0.50 or more, and the upper limit is not particularly limited since the limit depends on the structure of a cationic species including a nitrogen atom in zeolite contained in the zeolite membrane and the amount of nitrate ion remaining when a nitrate treatment of the zeolite membrane is performed if necessary, and the limit is usually 4 or less, preferably 3 or less, and more preferably 1 or less. By using zeolite having such a specific nitrogen atom/Al atom ratio surface composition, the denseness and durability such as chemical reaction resistance or heat resistance of the zeolite membrane can be improved, and ammonia can be separated from a mixed gas composed of a plurality of components including ammonia and hydrogen and/or nitrogen with high permeability and high selectivity. Here, the upper limit and lower limit values are valid within the range of significant figures. Specifically, the upper limit of 4 or less means less than 4.5, while 0.01 or more means 0.005 or more.

In the second embodiment of the present invention, the nitrogen atom contained in the zeolite membrane is a nitrogen atom derived from an ammonium ion ($NH_4^+$) or a cationic species obtained by protonating an organic amine having from 1 to 20 carbon atoms such as methylamine, dimethylamine, trimethylamine, ethylamine, diethylamine, triethylamine, ethylenediamine, dimethylethylenediamine, tetramethylethylenediamine, diethylenetriamine, triethylenetetraamine, aniline, methylaniline, benzylamine, methylbenzylamine, hexamethylenediamine, N,N-diisopropylethylamine, N,N,N-trimethyl-1-adamantanamine, pyridine, or piperidine contained in the zeolite described later, a nitrogen atom derived from an organic template (structure-directing agent) containing a nitrogen atom, when used when manufacturing zeolite membranes, a nitrogen atom derived from a nitrate ion remaining during a nitrate treatment of the zeolite membrane performed if necessary, or the like.

The present embodiment is not yet known in detail and is not particularly limited, and is characterized in that the effective pore diameter of zeolite used for membrane separation is controlled by using adsorption of ammonia on zeolite, and that ammonia is separated based on the hopping mechanism of ammonia in zeolite pores as described below. In the present invention in which ammonia is separated by mainly utilizing the hopping mechanism in pores accompanying adsorption/desorption of ammonia to zeolite as described above, the first important design factor is how to increase the adsorption affinity between ammonia in a supply gas mixture containing ammonia and the surface of the zeolite membrane over other gases such as hydrogen and nitrogen contained in the gas mixture. From this point of view, when a nitrogen atom in a form as described above is present on the surface of the zeolite membrane, the adsorption affinity of ammonia to the zeolite membrane is increased by an interaction such as hydrogen bonding with ammonia in a supply gas, and as a result, the ammonia separation performance tends to be improved.

One of the other embodiments of the present invention (zeolite membrane C) is a zeolite membrane containing zeolite, wherein the molar ratio of Si element to Al element determined by X-ray photoelectron spectroscopy is from 2.0 to 10. The zeolite membrane C is preferably used in the ammonia separation method of the first embodiment.

The zeolite membrane C used in the present invention is a zeolite membrane having a surface in which the molar ratio of Si atoms to Al atoms determined by X-ray photoelectron spectroscopy (XPS) is in a specific range. Herein, the molar ratio of Si atoms to Al atoms contained in the zeolite membrane is a numerical value determined by X-ray photoelectron spectroscopy (XPS) under the following measurement conditions.

(Measurement Conditions)

X-ray source for measurement: Monochromatic Al-Kα ray, output 16 kV-34 W

Background determination method for quantitative calculation: Shirley method

In the present embodiment, the content of Si atoms contained in the zeolite membrane surface determined by the XPS measurement is, in terms of molar ratio with respect to Al atoms on the zeolite membrane surface, 2.0 or more, and preferably 2.5 or more, and more preferably 3.0 or more, and the upper limit thereof is usually 10 or less, preferably 8.0 or less, more preferably 7.0 or less, and particularly preferably 6.7 or less. In the present invention, as described below, the molar ratio of Si atoms to Al atoms in the zeolite membrane can be controlled by a method of controlling the $SiO_2/Al_2O_3$ ratio of zeolite in the zeolite membrane, a method of treating the zeolite membrane with an aluminum salt, or the like. As is apparent from the Example, by using a zeolite membrane having such a specific Si atom/Al atom molar ratio, when ammonia is separated from a mixed gas composed of a plurality of components including ammonia and hydrogen and/or nitrogen, the denseness and durability such as chemical reaction resistance and heat resistance of the zeolite membrane can be improved, high permeation selectivity and high permeability can be exhibited, and the separation heat stability at high temperatures can be improved.

In the present embodiment, when controlling the content of Si atoms on the surface of the zeolite membrane and, if necessary, controlling the content of nitrogen atoms contained in the zeolite membrane surface determined by XPS measurement to a specific region, there is a tendency for the separation selectivity when separating ammonia from a mixed gas composed of a plurality of components contained on the zeolite membrane surface to be remarkably improved, and therefore, it is preferable to allow nitrogen atoms to coexist on the zeolite membrane surface and to control the content thereof appropriately. The content of nitrogen atoms that, if necessary, coexist as described above on the surface of the zeolite membrane is, in terms of molar ratio with respect to Al atoms on the zeolite membrane surface, usually 0.01 or more, and preferably 0.05 or more, more preferably 0.10 or more, still more preferably 0.20 or more, especially preferably 0.30 or more, and particularly preferably 0.50 or more, and the upper limit is not particularly limited since the limit depends on the structure of a cationic species including a nitrogen atom in zeolite contained in the zeolite membrane and the amount of nitrate ion remaining when a nitrate treatment of the zeolite membrane is performed if necessary, and the limit is usually 4 or less, preferably 3 or less, and more preferably 1 or less. By using zeolite having such a specific nitrogen atom/Al atom ratio surface composition, the denseness and durability such as chemical reaction resistance or heat resistance of the zeolite membrane can be improved, and ammonia can be separated from a mixed gas composed of a plurality of components including ammonia and hydrogen and/or nitrogen with high selectivity, which is preferable. The above-described upper limit and lower limit values are valid within the range of significant figures. Specifically, the upper limit of 4 or less means less than 4.5, while 0.01 or more means 0.005 or more.

In the present embodiment, the nitrogen atom, when contained in the zeolite membrane, is a nitrogen atom derived from an ammonium ion ($NH_4^+$) or a cationic species obtained by protonating an organic amine having from 1 to 20 carbon atoms such as methylamine, dimethylamine, trimethylamine, ethylamine, diethylamine, triethylamine, ethylenediamine, dimethylethylenediamine, tetramethylethylenediamine, diethylenetriamine, triethylenetetraamine, aniline, methylaniline, benzylamine, methylbenzylamine, hexamethylenediamine, N,N-diisopropylethylamine, N,N,N-trimethyl-1-adamantanamine, pyridine, or piperidine contained in the zeolite described later, a nitrogen atom derived from an organic template (structure-directing agent) containing a nitrogen atom used when manufacturing zeolite membranes, a nitrogen atom derived from a nitrate ion remaining during a nitrate treatment of the zeolite membrane performed if necessary, or the like.

In this embodiment, when the content of alkali metal atoms contained in the zeolite membrane surface determined by XPS measurement is further controlled within a specific range, the ammonia permeability when separating ammonia from a mixed gas composed of a plurality of components including ammonia and hydrogen and/or nitrogen tends to be improved. Therefore, it is one of preferable embodiments to control the contents thereof as necessary. As described above, examples of alkali metal atoms that are present on the zeolite membrane surface if necessary include Li, Na, K, Rb, Cs, and two or more kinds thereof, and among these, Li, Na, and Cs are preferable, and Na is more preferable because Na is excellent in ammonia separation performance and is a general-purpose alkali metal. These alkali metal atoms exist in the form of a cation as an ion pair of an Al site in zeolite constituting the zeolite membrane, and are usually introduced into the zeolite by an ion exchange treatment of synthesized zeolite membrane as described below. The content of alkali metal atoms to be present on the zeolite membrane surface as necessary, in molar ratio with respect to Al atoms on the zeolite membrane surface, is 0.01 or more, and preferably 0.02 or more, more preferably 0.03 or more, still more preferably 0.04 or more, and particularly preferably 0.05 or more, and the upper limit is usually 0.10 molar equivalent or less, and preferably 0.070 molar equivalent or less, more preferably 0.065 molar equivalent or less, more preferably 0.060 molar equivalent or less, and particularly preferably 055 molar equivalent or less. Controlling the content of alkali metal atoms within the above range is preferable because the ammonia permeability tends to be improved while the ammonia separation selectivity is increased. The molar ratio of alkali metal atoms to Al atoms in the zeolite membrane can be controlled by adjusting the ion exchange amount during the ion exchange treatment of zeolite, as will be described below.

The present embodiment is not yet known in detail and is not particularly limited, and is characterized in that the effective pore diameter of zeolite used for membrane separation is controlled by using adsorption of ammonia on zeolite, and that ammonia is separated based on the hopping mechanism of ammonia in zeolite pores as described below. In the present invention in which ammonia is separated by mainly utilizing the hopping mechanism in pores accompanying adsorption/desorption of ammonia to zeolite as described above, the first important design factor is how to increase the adsorption affinity between ammonia in a supply gas mixture containing ammonia and the surface of the zeolite membrane over other gases such as hydrogen and nitrogen contained in the gas mixture. From this point of view, when more Al atoms are present on the surface of the zeolite membrane, the polarity of the surface of the zeolite membrane is changed and the adsorption affinity with ammonia in a supply gas is increased, and therefore, the ammonia separation performance is improved. In the present embodiment, the content of Al atoms on the surface of the zeolite membrane is controlled by the $SiO_2/Al_2O_3$ ratio of zeolite constituting the zeolite membrane, an aluminum salt treatment after formation of the zeolite membrane, or the like. In particular, since the latter aluminum salt treatment also has an effect of sealing fine defects present on the zeolite membrane surface, the treatment can improve the denseness of the zeolite membrane and durability such as chemical reaction resistance and heat resistance, and greatly contributes to the improvement of the separation heat stability at high temperatures of the zeolite membrane, which is one of the problems of the present invention.

Another embodiment of the present invention (zeolite membrane D) is a zeolite membrane containing zeolite and having a molar ratio of alkali metal element to Al element determined by X-ray photoelectron spectroscopy of from 0.01 to 0.070. The zeolite membrane D is particularly preferably used in the ammonia separation method of the first embodiment.

The zeolite membrane D used in the fourth embodiment of the present invention is preferably a zeolite membrane including a surface in which the molar ratio of alkali metal atoms to Al atoms determined by X-ray photoelectron spectroscopy (XPS) is in a specific range. Herein, the molar ratio of alkali metal atoms to Al atoms contained in the zeolite membrane is a numerical value determined by X-ray photoelectron spectroscopy (XPS) under the following measurement conditions.

(Measurement Conditions)

X-ray source for measurement: Monochromatic Al-Kα ray, output 16 kV-34 W

Background determination method for quantitative calculation: Shirley method

In the present embodiment, examples of alkali metal atoms contained in the zeolite membrane surface determined by the XPS measurement include Li, Na, K, Rb, Cs, and two or more kinds thereof, and among these, Li, Na, and Cs are preferable, and Na is more preferable because Na is excellent in ammonia separation performance and is a general-purpose alkali metal. These alkali metal atoms exist in the form of a cation as an ion pair of an Al site in zeolite constituting the zeolite membrane, and are usually introduced into the zeolite by an ion exchange treatment of synthesized zeolite membrane as described below.

In this embodiment, it is important to control the content of alkali metal atoms contained in the zeolite membrane surface determined by the XPS measurement, and the content, in molar ratio with respect to Al atoms on the zeolite membrane surface, is 0.01 or more, and preferably 0.02 or more, more preferably 0.03 or more, still more preferably 0.04 or more, and particularly preferably 0.05 or more, and the upper limit is usually 0.10 molar equivalent or less, and preferably 0.070 molar equivalent or less, more preferably 0.065 molar equivalent or less, more preferably 0.060 molar equivalent or less, and particularly preferably 055 molar equivalent or less. By controlling the content of the alkali metal element within the above range, the ammonia permeability can be improved while improving the ammonia separation selectivity, as is apparent from the Example and Reference Example.

In the present embodiment, the molar ratio of alkali metal atoms to Al atoms in the zeolite membrane can be controlled by adjusting the ion exchange amount during the ion exchange treatment of zeolite, as will be described below. By using a zeolite membrane having such a specific alkali metal atom/Al atom molar ratio, when ammonia is separated from a mixed gas composed of a plurality of components including ammonia and hydrogen and/or nitrogen, while exhibiting high permeation selectivity, the ammonia permeability can be improved as compared with the zeolite membrane not containing the alkali metal atom.

In the present embodiment, when controlling the content of alkali metal atoms on the surface of the zeolite membrane and, if necessary, controlling the content of nitrogen atoms contained in the zeolite membrane surface determined by XPS measurement to a specific region, there is a tendency for the separation selectivity when separating ammonia from a mixed gas composed of a plurality of components including ammonia and hydrogen and/or nitrogen to be remarkably improved, and therefore, it is preferable to allow alkali metal atoms and nitrogen atoms to coexist on the zeolite membrane surface and to control the content thereof appropriately. The content of nitrogen atoms, when coexist as described above on the surface of the zeolite membrane, is, in terms of molar ratio with respect to Al atoms on the zeolite membrane surface, usually 0.01 or more, and preferably 0.05 or more, more preferably 0.10 or more, still more preferably 0.20 or more, especially preferably 0.30 or more, and particularly preferably 0.50 or more, and the upper limit is not particularly limited since the limit depends on the structure of a cationic species including a nitrogen atom in zeolite contained in the zeolite membrane and the amount of nitrate ion remaining when a nitrate treatment of the zeolite membrane is performed if necessary, and the limit is usually 4 or less, preferably 3 or less, and more preferably 1 or less.

By using zeolite having such a specific nitrogen atom/Al atom ratio surface composition, the denseness and durability such as chemical reaction resistance or heat resistance of the zeolite membrane can be improved, and ammonia can be separated from a mixed gas composed of a plurality of components including ammonia and hydrogen and/or nitrogen with high selectivity, which is preferable. The above-described upper limit and lower limit values are valid within the range of significant figures. Specifically, the upper limit of 4 or less means less than 4.5, while 0.01 or more means 0.005 or more.

In the present invention, the nitrogen atom, when contained in the zeolite membrane, is a nitrogen atom derived from an ammonium ion ($NH_4^+$) or a cationic species obtained by protonating an organic amine having from 1 to 20 carbon atoms such as methylamine, dimethylamine, trimethylamine, ethylamine, diethylamine, triethylamine, ethylenediamine, dimethylethylenediamine, tetramethylethylenediamine, diethylenetriamine, triethylenetetraamine, aniline, methylaniline, benzylamine, methylbenzylamine, hexamethylenediamine, N,N-diisopropylethylamine, N,N,N-trimethyl-1-adamantanamine, pyridine, or piperidine contained in the zeolite described later, a nitrogen atom derived from an organic template (structure-directing agent) containing a nitrogen atom used when manufacturing zeolite membranes, a nitrogen atom derived from a nitrate ion remaining during a nitrate treatment of the zeolite membrane performed if necessary, or the like.

The present embodiment is not yet known in detail and is not particularly limited, and is characterized in that the effective pore diameter of zeolite used for membrane separation is controlled by using adsorption of ammonia on zeolite, and that ammonia is separated based on the hopping mechanism of ammonia in zeolite pores as described below. In the present invention in which ammonia is separated by mainly utilizing the hopping mechanism in pores accompanying adsorption/desorption of ammonia to zeolite as described above, while the ammonia separation selectivity from a mixed gas composed of a plurality of components including ammonia and hydrogen and/or nitrogen improves by a blocking effect by adsorption of ammonia to an Al site in a zeolite pore, since the adsorption power of ammonia to the Al site is high, there exists a tendency for permeation performance (permeability) to be impaired. In contrast, by allowing the alkali metal atom of the present invention to exist in a specific amount in the form of a cation as an ion pair of the Al site in zeolite constituting the zeolite membrane, the amount of ammonia adsorbed on the Al site can be controlled, and on the other hand, the ammonia separation selectivity can be maintained by the size of the alkali metal cation. By these mechanisms, the permeation performance can be enhanced while maintaining the ammonia separation selectivity. Specifically, it is important to control the content of alkali metal atoms to Al atoms in the zeolite in a molar ratio of from 0.01 to 0.070, and it is considered that when the content is less than 0.01, the ammonia permeability decreases due to adsorption of ammonia to an Al site, whereas when the content is higher than 0.20, a blocking effect by adsorption of ammonia on an Al site is weakened and the ammonia separation selectivity decreases.

Another aspect of the present invention (zeolite membrane composite E) is a zeolite membrane composite for ammonia separation including a porous support and a zeolite membrane containing zeolite on the surface thereof, characterized in that the change rate of the thermal expansion coefficient at 300° C. with respect to the thermal expansion coefficient at 30° C. of the zeolite and the thermal expansion coefficient at 400° C. are within a specific range. The zeolite membrane composite E is preferably used in the ammonia separation method of the first embodiment.

Specifically, the change rate of thermal expansion coefficient at 300° C. with respect to thermal expansion coefficient at 30° C. of the zeolite is equal to or within ±0.25% and the change rate of thermal expansion coefficient at 400° C. with respect to thermal expansion coefficient at 30° C. of the zeolite is equal to or within ±0.35%.

The thermal expansion coefficient that defines the zeolite of the present embodiment is a numerical value calculated under the following conditions. Herein, when the numerical value of the thermal expansion coefficient is positive, the value indicates that the zeolite has expanded, and when the value is negative, the value indicates that the zeolite has contracted.

(Measurement Method of Change Rate of Thermal Expansion Coefficient)

In the present invention, the change rate of thermal expansion coefficient at a predetermined temperature with respect to the thermal expansion coefficient of zeolite at 30° C. can be obtained by the following formula (1) by obtaining a crystallite constant measured at 30° C. and a predetermined temperature by a high temperature XRD measurement method under the following conditions.

(Specifications of High Temperature XRD Measurement Apparatus)

TABLE 1

| Apparatus name | | New D8 ADVANCE manufactured by Bruker Corporation |
|---|---|---|
| Optical system | | Bragg-Brentano optical system |
| Optical system specifications | Incident side | Enclosed X-ray tube (CuKα) Seller Slit (2.5°) Divergence Slit (Variable Slit) |
| | Sample stage | High-temperature sample stage HTK1200 |
| | Light-receiving side | Semiconductor array detector (Lynx Eye) Ni-filter Seller Slit (2.5°) |
| Goniometer radius | | 280 mm |

(Measurement Conditions)

TABLE 2

| X-ray output (CuKα) | 40 kV 40 mA |
|---|---|
| Scanning axis | θ/2θ |
| Scanning range (2θ) | 5.0-70.0° |
| Measurement mode | Continuous |
| Read width | 0.02° |
| Counting time | 19.2 sec (0.1 sec × 192 ch) |
| Automatic variable slit * | 6 mm (irradiation width) |

Measurement atmosphere: Air
Temperature rise condition: 20° C./min
Measurement method: XRD measurement is carried out after holding at the
measurement temperature for 5 minutes.
Measurement data is subjected to fixed slit correction using a variable slit.

Change rate of thermal expansion coefficient=(crystal lattice constant measured at predetermined temperature)÷(crystal lattice constant measured at 30° C.)−1    (1)

The change rate of the thermal expansion coefficient at 300° C. with respect to the thermal expansion coefficient at 30° C. of the zeolite of the present invention has an absolute value of 0.25% or less, preferably 0.20% or less, more preferably 0.15% or less, particularly preferably 0.10% or less, and most preferably 0.05% or less. In other words, the change rate of thermal expansion coefficient at 300° C. with respect to the thermal expansion coefficient at 30° C. of the zeolite is within ±0.25%, preferably within ±0.20%, more preferably within ±0.15%, particularly preferably within ±0.10%, and most preferably within ±0.05%.

On the other hand, the change rate of thermal expansion coefficient at 400° C. with respect to the thermal expansion coefficient at 30° C. of the zeolite has an absolute value of 0.35% or less, preferably 0.30% or less, more preferably 0.25% or less, especially preferably 0.20% or less, particularly preferably 0.15% or less, and most preferably 0.10% or less. In other words, the change rate of thermal expansion coefficient at 400° C. with respect to the thermal expansion coefficient at 30° C. of the zeolite is within ±0.35%, preferably within ±0.30%, more preferably within ±0.25%, especially preferably within ±0.20%, particularly preferably within ±0.15%, and most preferably within ±0.10%. When ammonia in a gas mixture composed of a plurality of components including ammonia and hydrogen and/or nitrogen is allowed to permeate through a zeolite membrane composite in which a zeolite exhibiting a low change rate of thermal expansion coefficient is formed into a membrane on a porous support, and when the temperature of the composite is raised to a temperature higher than 200° C., especially a temperature higher than 250° C., or even a temperature higher than 300° C., a crack in a zeolite grain boundary due to the thermal expansion (shrinkage) of the zeolite hardly occur, and therefore, ammonia can be efficiently separated to the permeation side with high permeability even under high temperature conditions. In particular, as described for RHO zeolite of the Example, a zeolite membrane composite using zeolite exhibiting such a thermal expansion coefficient exhibits stable and high separation performance as a membrane under high temperature conditions even if the membrane exhibits a nonlinear thermal expansion/contraction behavior with respect to temperature. Here, the nonlinear thermal expansion/contraction behavior with respect to temperature refers to a behavior that does not monotonously expand or contract with temperature, in other words, for example, a thermal expansion or contraction behavior is exhibited in a certain temperature range, but opposite behaviors or thermal contraction in the former case and thermal expansion behavior in the latter case are observed in other temperature ranges.

The reason for this is not yet known in detail and is not particularly limited to the following, but is considered that, even if zeolite thermally contracts or expands during a temperature rising process, the zeolite moves favorably on a support, forming a dense zeolite membrane composite that exhibits high separation performance suitable for high-temperature conditions without generating a crack. Accordingly, when ammonia is stably separated under high temperature conditions, zeolite that exhibits nonlinear thermal expansion/contraction behavior in a temperature rising process may be used. The zeolite used in the present invention is not particularly limited, and examples thereof include RHO (D. R. Corbin. etaL. *J. Am. Chem. Soc*, 112, 4821-4830), MFI, AFI, and DDR (Park S, H. etaL. *Stud. Surf Sci. Catal.* 1997, 105, 1989-1994).

The absolute value of the change rate of the thermal expansion coefficient at 400° C. with respect to the thermal expansion coefficient at 30° C. with respect to the change rate of the thermal expansion coefficient at 300° C. with respect to the thermal expansion coefficient at 30° C. of the zeolite of the present embodiment as a ratio is usually 120% or less, and preferably 115% or less, more preferably 110% or less, particularly preferably 105% or less, and most preferably 103% or less. For example, even when a heterogeneous exotherm occurs in a reactor at the beginning of a reaction when ammonia production is started, since a zeolite membrane composite in which zeolite exhibiting such change rate ratio of specific thermal expansion coefficients between specific temperatures is formed into a membrane on a porous support can suppress a crack at a grain boundary due to local thermal expansion (contraction) of the zeolite, ammonia can be stably separated to the permeation side efficiently with high permeability.

When the zeolite membrane composite of this embodiment is prepared through a step of depositing zeolite having a change rate of thermal expansion coefficient within a specific range as a seed crystal on a porous support when synthesizing a membrane, it is often preferable to stably separate ammonia with high selectivity even under high temperature conditions. The absolute value of the change rate of thermal expansion coefficient at 300° C. with respect to the thermal expansion coefficient at 30° C. of zeolite used as a seed crystal for preparing such a zeolite membrane composite is 0.25% or less, and preferably 0.20% or less, more preferably 0.15% or less, particularly preferably 0.10% or less, and most preferably 0.05% or less. On the other hand, the absolute value of the change rate of thermal expansion coefficient at 400° C. with respect to the thermal expansion coefficient at 30° C. is usually 0.30% or less, and preferably 0.25% or less, more preferably 0.20% or less, particularly preferably 0.15% or less, and most preferably 0.10% or less.

The change rate of thermal expansion coefficient at a specific temperature of the zeolite, which is a characteristic of the present embodiment, can be controlled by appropriately selecting a cationic species of zeolite to be used as will be described below. For example, regarding the relationship between a cationic species of RHO zeolite and the thermal expansion coefficient, as described in Chemical, Communications, 2000, 2221-2222, it is known that the thermal expansion coefficient varies depending on the cationic species contained in zeolite. Therefore, in order to obtain a zeolite membrane composite that stably separates ammonia with high selectivity even under the high temperature conditions of the present embodiment, it is particularly important to select a specific cationic species among RHO zeolites. On the other hand, regarding the thermal expansion coefficient of the MFI zeolite described in Examples of the present embodiment, a zeolite membrane composite exhibiting the characteristics of the present embodiment can be produced by selecting an appropriate cationic species in the zeolite as in the case of the RHO zeolite.

The cationic species contained in the zeolite of the present embodiment is preferably a cationic species that easily coordinates to an ion exchange site of the zeolite, such as a cationic species selected from the group of elements of group 1, group 2, group 8, group 9, group 10, group 11, and group 12 of the periodic table, $NH_4^+$, and two or more kinds of cationic species thereof, and more preferably a cationic species selected from group 1 and group 2 elements of the periodic table, $NH_4^+$, and two or more kinds of cationic species thereof.

The zeolite used in the present embodiment is an aluminosilicate. The $SiO_2/Al_2O_3$ molar ratio of aluminosilicate is not particularly limited, and is usually 6 or more, preferably 7 or more, more preferably 8 or more, still more preferably 10 or more, especially preferably 11 or more, particularly preferably 12 or more, and most preferably 13 or more. The upper limit is usually an amount in which Al is contained in an impurity level, and the $SiO_2/Al_2O_3$ molar ratio is usually 500 or less, preferably 100 or less, more preferably 90 or less, still more preferably 80 or less, especially preferably 70 or less, particularly preferably 50 or less, and most preferably 30 or less. By using such zeolite with an $SiO_2/Al_2O_3$ molar ratio in a specific region, the denseness of a zeolite membrane and durability such as chemical reaction resistance and heat resistance can be improved. From the viewpoint of the separation performance of allowing ammonia to permeate from a gas mixture composed of a plurality of components including ammonia and hydrogen and/or nitrogen, as described above, from a reason that the acid point of Al element becomes an adsorption site of ammonia, it is preferable to use a zeolite containing a specific amount of Al, and by using zeolite having the above-described $SiO_2/Al_2O_3$ molar ratio, ammonia can be separated with high permeability and high selectivity. The $SiO_2/Al_2O_3$ molar ratio of zeolite can be adjusted by the reaction conditions of hydrothermal synthesis described below.

The thickness of the zeolite membrane used in the present invention is not particularly limited, and is usually 0.1 μm or more, preferably 0.3 μm or more, more preferably 0.5 μm or more, still more preferably 0.7 μm or more, still more preferably 1.0 μm or more, and particularly preferably 1.5 μm or more. The thickness is usually 100 μm or less, preferably 60 μm or less, more preferably 20 μm or less, still more preferably 15 μm or less, still more preferably 10 μm or less, and particularly preferably 5 μm or less. When the thickness of a zeolite membrane is not less than the above-described lower limit, a defect is less likely to occur and the separation performance tends to be favorable. When the thickness of a zeolite membrane is not more than the above-described upper limit value, the permeation performance tends to improve, and in addition, in a high temperature region, a crack is less likely to occur in the zeolite membrane due to an increase in temperature, and thus there is a tendency that a decrease in permeation selectivity at a high temperature can be suppressed.

The average primary particle diameter of zeolite forming a zeolite membrane is not particularly limited, and is usually 30 nm or more, preferably 50 nm or more, and more preferably 100 nm or more, and the upper limit is less than or equal to the thickness of the membrane. When the average primary particle size of zeolite is not less than the above-described lower limit value, the grain boundary of the zeolite can be reduced, and therefore, favorable permeation selectivity can be obtained. Therefore, it is most preferable that the average primary particle diameter of the zeolite is the same as the thickness of the zeolite membrane. In this case, the grain boundary of zeolite can be minimized. A zeolite membrane obtained by hydrothermal synthesis described below is preferable because the particle size of zeolite and the thickness of the membrane is the same in some cases.

In the present invention, the average primary particle size is obtained as an average value by measuring the primary particle size of 30 or more arbitrarily selected particles in observation of the surface or fracture surface of the zeolite membrane composite of the present invention with a scanning electron microscope.

The shape of a zeolite membrane is not particularly limited, and any shape such as a tubular shape, a hollow fiber shape, a monolith type, and a honeycomb type can be adopted. The size of a zeolite membrane is not particularly limited, and for example, the zeolite membrane is formed as a zeolite membrane composite formed on a porous support having a size described below.

(Porous Support)

In the present invention, a zeolite membrane is preferably formed on the surface of a porous support. Preferably, zeolite is crystallized in the form of a film on the porous support.

A porous support used in the present invention preferably has chemical stability such that zeolite can be crystallized into a membrane on the surface. Examples of a suitable porous support include a gas-permeable porous polymer such as polysulfone, cellulose acetate, aromatic polyamide, vinylidene fluoride, polyethersulfone, polyacrylonitrile, polyethylene, polypropylene, polytetrafluoroethylene, or polyimide; a ceramic sintered body such as silica, α-alumina, γ-alumina, mullite, zirconia, titania, yttria, silicon nitride, or silicon carbide; a sintered body or mesh-like molding of a metal such as iron, bronze, or stainless; and an inorganic porous material such as a glass or carbon molding. From the reason that the mechanical strength, deformation resistance, heat stability, and reaction resistance at high temperatures of the support are excellent, as a porous support for separating ammonia in a high temperature region, among these, an inorganic porous support such as a ceramic sintered body, a metal sintered body, a glass or carbon molding is preferable. An inorganic porous support is preferably obtained by sintering ceramics, which is a solid material whose basic component or most of the inorganic support is composed of an inorganic nonmetallic substance.

Examples of preferable ceramic sintered bodies include ceramic sintered bodies including α-alumina, γ-alumina, silica, mullite, zirconia, titania, yttria, silicon nitride, and silicon carbide as described above, but these may be single sintered bodies or may be a mixture of a plurality of sintered bodies. Since these ceramic sintered bodies may be partly zeoliticized during synthesis of a zeolite membrane, this increases adhesion between a porous support and the zeolite membrane, so that the durability of the zeolite membrane composite can be improved.

In particular, an inorganic porous support containing at least one of alumina, silica, and mullite is more preferable since binding of the inorganic porous support and zeolite becomes strong and a dense zeolite membrane with high separation performance is easily formed due to ease of partial zeolitization of the inorganic porous support.

The porous support used in the present invention preferably has an action of crystallizing zeolite formed on the porous support on the surface thereof (hereinafter, also referred to as "porous support surface").

The pore diameter on the porous support surface is preferably controlled. The average pore diameter of a porous support near the porous support surface is usually 0.02 μm or more, and preferably 0.05 μm or more, more preferably 0.1 μm or more, still more preferably 0.15 μm or more, further preferably 0.5 μm or more, particularly preferably 0.7 μm or more, and most preferably 1.0 μm or more, and is usually 20 μm or less, and preferably 10 μm or less, more preferably 5 μm or less, and particularly preferably 2 μm or less. By using a porous support having a pore diameter in such a range, a dense zeolite membrane that improves the ammonia permeation selectivity can be formed.

The surface of a porous support is preferably smooth, and the surface may be polished with a file or the like as necessary.

The pore diameter of a portion of the porous support used in the present invention other than the vicinity of the porous support surface is not limited and does not need to be controlled in particular, and the porosity thereof is usually 20% or more, and more preferably 30% or more, and usually 60% or less, and preferably 50% or less. The porosity of the portion other than the vicinity of the porous support surface affects the permeation flow rate when separating gas and liquid. When the porosity is not less than the above-described lower limit, a permeated substance tends to diffuse, and when the porosity is not more than the above-described upper limit, the strength of the porous support tends to be prevented from decreasing. As a method for controlling the permeation flow rate, a porous support in which porous bodies having different porosities are combined in layers may be used.

The shape of a porous support used in the present invention is not limited as long as the shape can effectively separate a mixed gas or liquid mixture, and specific examples thereof include flat, tubular, cylindrical, honeycomb with many through holes or monolith. The size and the like of the porous support are any, and may be appropriately selected and adjusted in such a manner that a desired zeolite membrane composite is obtained. Among these, the shape of a porous support may be preferably tubular.

The length of a tubular porous support is not particularly limited, and is usually 2 cm or more, and preferably 4 cm or more, more preferably 5 cm or more, particularly preferably 10 cm or more, especially preferably 40 cm or more, and most preferably 50 cm or more, and is usually 200 cm or less, and preferably 150 cm or less, and more preferably 100 cm or less. When the length of a porous support is equal to or more than the above-described lower limit value, the amount of separation treatment of a mixed gas per one porous support can be increased, and therefore, the equipment cost can be reduced. When the length is less than or equal to the above-described upper limit, production of a zeolite membrane composite can be simplified, and further, a problem such as easy breakage due to vibration during use can be prevented.

The inner diameter of a tubular porous support is usually 0.1 cm or more, and preferably 0.2 cm or more, more preferably 0.3 cm or more, and particularly preferably 0.4 cm or more, and is usually 2 cm or less, and preferably 1.5 cm or less, more preferably 1.2 cm or less, and particularly preferably 1.0 cm or less. The outer diameter is usually 0.2 cm or more, and preferably 0.3 cm or more, more preferably 0.6 cm or more, and particularly preferably 1.0 cm or more, and usually 2.5 cm or less, and preferably 1.7 cm or less, and more preferably 1.3 cm or less. The wall thickness of a tubular porous support is usually 0.1 mm or more, and preferably 0.3 mm or more, more preferably 0.5 mm or more, still more preferably 0.7 mm or more, still more preferably 1.0 mm or more, and particularly preferably 1.2 mm or more, and is usually 4 mm or less, and preferably 3 mm or less, and more preferably 2 mm or less. When the inner diameter, the outer diameter, and the wall thickness of a tubular porous support are equal to or higher than the above-described lower limit values, respectively, the strength of the support can be improved and the support can be difficult to break. When the inner diameter and the outer diameter of a tubular support are equal to or less than the above-described upper limit values, respectively, the size of equipment associated with separation of ammonia can be reduced, which can be economically advantageous. When the thickness of a tubular support is not more than the above-described upper limit value, the permeation performance tends to be improved.

The absolute value of the change rate of thermal expansion coefficient at 300° C. with respect to the thermal expansion coefficient at 30° C. of the porous support used in the fifth embodiment is 0.25% or less, and preferably 0.20% or less, more preferably 0.15% or less, particularly preferably 0.10% or less, and most preferably 0.05% or less. In other words, the change rate of thermal expansion coefficient at 300° C. with respect to the thermal expansion coefficient at 30° C. of the porous support of the zeolite membrane composite E is within ±0.25%, and preferably within ±0.20%, more preferably within ±0.15%, particularly preferably within ±0.10%, and most preferably within ±0.05%. On the other hand, the absolute value of the change rate of thermal expansion coefficient at 400° C. with respect to the thermal expansion coefficient at 30° C. of the porous support of the zeolite membrane composite E is usually 0.30% or less, and preferably 0.25% or less, more preferably 0.20% or less, particularly preferably 0.15% or less, and most preferably 0.10% or less. In other words, the change rate of thermal expansion coefficient at 400° C. with respect to the thermal expansion coefficient at 30° C. of the porous support is within ±0.30%, and preferably within ±0.25%, more preferably within ±0.20%, particularly preferably within ±0.15%, and most preferably within ±0.10%. When a zeolite membrane composite formed on a porous support exhibiting such a low thermal expansion coefficient is heated for the purpose of permeating ammonia of a gas mixture composed of a plurality of components including ammonia and hydrogen and/or nitrogen even under, for example, temperature conditions exceeding 200° C., or 300° C., a zeolite membrane is less likely to crack following thermal expansion (contraction) of the porous support, and therefore can efficiently separate ammonia to the permeation side with high permeability and stability even under high temperature conditions.

The absolute value of the ratio of the change rate of thermal expansion coefficient at 400° C. with respect to the thermal expansion coefficient at 30° C. with respect to the change rate of thermal expansion coefficient at 300° C. with respect to the thermal expansion coefficient at 30° C. of the porous support used in the fifth embodiment is usually 120% or less, and preferably 115% or less, more preferably 110% or less, especially preferably 105% or less, and most preferably 103% or less. For example, since occurrence of a crack in the zeolite membrane following the local thermal expansion (contraction) of the porous support can be suppressed even when inhomogeneous heat generation occurs in a reactor during ammonia production, a zeolite membrane composite formed on a porous support exhibiting a specific thermal expansion coefficient ratio between such specific temperatures can efficiently separate ammonia to the permeation side with high permeability stably even under high temperature conditions.

(Zeolite Membrane Composite)

In the present invention, a zeolite membrane is preferably used as a zeolite membrane composite including at least zeolite and a support.

In the present invention, the zeolite membrane composite is one in which the above-described zeolite is membrane-like, and preferably crystallized and fixed on the surface or the like of the above-described porous support, and is, in some cases, preferably one in which a part of the zeolite is fixed to the inside of the support.

As the zeolite membrane composite, for example, one obtained by crystallizing zeolite into a membrane by hydrothermal synthesis on the surface of a porous support or the like is preferable.

The position of a zeolite membrane on a porous support is not particularly limited, and when a tubular support is used, the zeolite membrane may be formed on the outer surface, may be formed on the inner surface, or may be formed on both sides depending on a system to be applied. A zeolite membrane may be formed by being layered on the surface of a support, or may be crystallized in such a manner to fill pores of a surface layer of the support. In this case, it is important that there are no cracks or continuous micropores inside a crystallized membrane layer, and it is preferable to form a so-called dense membrane from the viewpoint of improving separability.

The zeolite and the support constituting the zeolite membrane composite are not particularly limited, and preferably used in any combination of the above-described zeolites and supports. Among these, specific examples of a particularly preferable combination of zeolite and porous support include MFI zeolite-porous alumina support, RHO zeolite-porous alumina support, DDR zeolite-porous alumina support, AFI zeolite-porous alumina support, CHA zeolite-porous alumina support, and AEI zeolite-porous alumina support. CHA zeolite-porous alumina support, MFI zeolite-porous alumina support, or RHO zeolite-porous alumina support is preferable, and MFI zeolite-porous alumina support or RHO zeolite-porous alumina support is more preferable.

In one embodiment of the present invention (zeolite membranes B to E), MFI zeolite-porous alumina support, or RHO zeolite-porous alumina support is preferable, and RHO zeolite-porous alumina support is more preferable.

<Method for Producing Zeolite Membrane Composite>

In the present invention, the method for forming a zeolite membrane composite is not particularly limited as long as the above-described zeolite membrane can be formed on a porous support, and the zeolite membrane composite can be produced by a known method. Any method such as (1) a method of crystallizing zeolite on a support in a membrane form, (2) a method of fixing zeolite to a support with an inorganic binder or an organic binder, (3) a method of fixing a polymer in which zeolite is dispersed to a support, or (4) a method of fixing zeolite to a support by impregnating the support with a slurry of zeolite and optionally sucking the support can be used.

Among these, a method of crystallizing zeolite on a porous support into a membrane form is particularly preferable. The crystallization method is not particularly limited, and a method of crystallizing zeolite on the surface of a support by putting the support in a reaction mixture for hydrothermal synthesis used for zeolite production (hereinafter, sometimes referred to as "aqueous reaction mixture") and directly hydrothermally synthesizing is preferable.

In this case, a zeolite membrane composite can be produced, for example, by placing an aqueous reaction mixture that is homogenized by adjusting the composition in a heat and pressure vessel such as an autoclave with a porous support therein and sealing and heating for a certain time.

The aqueous reaction mixture contains a Si atom source, an Al atom source, an alkali source, and water, and further contains an organic template (structure-directing agent) if necessary.

In order to better understand a method for producing a zeolite membrane composite, a method for producing an RHO zeolite membrane composite and a method for producing an MFI zeolite membrane composite as representative examples will be described in detail hereinafter, but the zeolite membrane and the production method of the present invention are not limited thereto.

(RHO Zeolite Membrane)

RHO zeolite used in the present invention indicates zeolite having a structure represented by RHO which is a code defined by the International Zeolite Association (IZA). RHO zeolite has a structure characterized by having three-dimensional pores composed of 8-membered oxygen rings having a diameter of 3.6×3.6 Å, and the structure is characterized by X-ray diffraction data.

The framework density of the RHO zeolite used in the present invention is 14.1 T/1,000 Å. The framework density means the number of atoms constituting a skeleton of zeolite other than oxygen per 1,000 Å$^3$, and this value is determined by the structure of the zeolite. The relationship between the framework density and the structure of zeolite is shown in ATLAS OF ZEOLITE FRAMEWORK TYPES Fifth Revised Edition 2007 ELSEVIER.

(MFI Zeolite Membrane)

MFI zeolite used in the present invention indicates zeolite having a structure represented by MFI which is a code defined by the International Zeolite Association (IZA). MFI zeolite has a structure characterized by having three-dimensional pores composed of 10-membered oxygen rings having a diameter of 5.1×5.5 Å or 5.3×5.6 Å, and the structure is characterized by X-ray diffraction data.

The framework density of the MFI zeolite used in the present invention is 17.9 T/1,000 Å. The framework density means the number of atoms constituting a skeleton of zeolite other than oxygen per 1,000 Å$^3$, and this value is determined by the structure of the zeolite. The relationship between the framework density and the structure of zeolite is shown in ATLAS OF ZEOLITE FRAMEWORK TYPES Fifth Revised Edition 2007 ELSEVIER.

<Method for Producing RHO Zeolite Membrane>

(Silicon Atom Source)

A silicon (Si) atom source used in an aqueous reaction mixture is not particularly limited, and examples thereof include aluminosilicate zeolite, fumed silica, colloidal silica, amorphous silica, a silicon alkoxide such as sodium silicate, methyl silicate, ethyl silicate, or trimethylethoxysilane, tetraethyl orthosilicate, and aluminosilicate gel, and preferred examples thereof include aluminosilicate zeolite, fumed silica, colloidal silica, amorphous silica, sodium silicate, methyl silicate, ethyl silicate, silicon alkoxide, and aluminosilicate gel. These may be used singly or in combination of two or more kinds thereof.

A Si atom source is used in such a manner that the amount of other raw materials used with respect to the Si atom source is within the above- or below-described preferred range.

(Aluminum Atom Source)

An aluminum (Al) atom source used for producing a porous support-RHO zeolite membrane composite is not particularly limited, and examples thereof include aluminosilicate zeolite, amorphous aluminum hydroxide, aluminum hydroxide with gibbsite structure, aluminum hydroxide with bayerite structure, aluminum nitrate, aluminum sulfate, aluminum oxide, sodium aluminate, boehmite, pseudoboehmite, aluminum alkoxide, and aluminosilicate gel. Aluminosilicate zeolite, amorphous aluminum hydroxide, sodium aluminate, boehmite, pseudoboehmite, aluminum alkoxide, and aluminosilicate gel are preferable, and aluminosilicate zeolite, amorphous aluminum hydroxide, sodium aluminate, and aluminosilicate gel are particularly preferable. These may be used singly or in combination of two or more kinds thereof.

An aluminosilicate zeolite may be used singly or in combination of two or more kinds thereof. When an aluminosilicate zeolite is used as an Al atom source, the above-described aluminosilicate zeolite is preferably 50% by weight or more, particularly from 70 to 100% by weight, and especially from 90 to 100% by weight of the total Al atom source. When an aluminosilicate zeolite is used as a Si atom source, the aluminosilicate zeolite is preferably 50% by mass or more, particularly from 70 to 100% by mass, and particularly from 90 to 100% by mass of the total Si atom source. When the ratio of an aluminosilicate zeolite is within this range, an RHO zeolite membrane has a high Si atom/Al atom molar ratio, resulting in a zeolite membrane having a wide range of applications excellent in acid resistance and water resistance.

A preferable range of the amount of Al atom source (including the above-described aluminosilicate zeolite and the other Al atom sources) to silicon (Si atoms) contained in a raw material mixture other than a seed crystal (Al atom/Si atom ratio) is usually 0.01 or more, and preferably 0.02 or more, more preferably 0.04 or more, and further preferably 0.06 or more, and is usually 1.0 or less, and preferably 0.5 or less, more preferably 0.2 or less, and still more preferably 0.1 or less. By controlling the amount within this range, the content of nitrogen atoms and alkali metal elements in the zeolite can be easily controlled within a preferable range of the present invention. In order to increase the Al atom/Si atom ratio, the amount of a silicon atom source used with respect to an aluminum atom source may be reduced, and on the other hand, in order to reduce the ratio, the amount of a silicon atom source used with respect to an aluminum atom source may be increased.

In certain embodiments of the present invention (for example, inventions B to E), when the Al atom/Si atom ratio is more than 1.0, the water resistance and acid resistance of an obtained RHO zeolite membrane are low, and the use as a zeolite membrane may be limited. When the Al atom/Si atom ratio is smaller than 0.01, it may be difficult to obtain an RHO zeolite membrane.

An atom source other than a silicon atom source or an aluminum atom source, such as gallium (Ga), iron (Fe), boron (B), titanium (Ti), zirconium (Zr), tin (Sn), or zinc (Zn), may be included in an aqueous reaction mixture.

The kind of alkali used as an alkali source is not particularly limited, and an alkali metal hydroxide or an alkaline earth metal hydroxide can be used.

The metal species of these metal hydroxides is usually sodium (Na), potassium (K), lithium (Li), rubidium (Rb), cesium (Cs), calcium (Ca), magnesium (Mg), strontium (Sr), or barium (Ba), preferably Na, K, or Cs, and more preferably Na or Cs. Two or more metal species of metal oxides may be used in combination, and specifically, it is preferable to use Na and Cs in combination.

Specific examples of the metal hydroxide that can be used include an alkali metal hydroxide such as sodium hydroxide, potassium hydroxide, lithium hydroxide, rubidium hydroxide, or cesium hydroxide; and an alkaline earth metal hydroxide such as calcium hydroxide, magnesium hydroxide, strontium hydroxide, or barium hydroxide.

As an alkali source used in an aqueous reaction mixture, a hydroxide ion of a counter anion of an organic template described below can be used.

In crystallization of the zeolite according to the present invention, although an organic template (structure-directing agent) is not necessarily required, by using an organic template of a kind corresponding to each structure, the ratio of silicon atoms to aluminum atoms of crystallized zeolite is increased and the crystallinity is improved, and therefore, it is preferable to use an organic template.

The organic template may be any kind as long as the template can form a desired zeolite membrane. One kind of template may be used, or two or more kinds thereof may be used in combination.

The kind of organic template suitable for reactions varies depending on the zeolite structure to be synthesized, and an organic template that provides a desired zeolite structure may be used. Specifically, for example, 18-crown-6-ether may be used for the RHO structure.

When the organic template is a cation, the template is accompanied by an anion that does not harm formation of zeolite. Representative examples of such an anion include a halogen ion such as $Cl^-$, $Br^-$, or $I^-$, and a hydroxide ion, an acetate, a sulfate, and a carboxylate. Among these, a hydroxide ion is particularly preferably used, and in the case of a hydroxide ion, the ion functions as an alkali source as described above.

The ratio of a Si atom source to an organic template in an aqueous reaction mixture in terms of the molar ratio of the organic template to $SiO_2$ (organic template/$SiO_2$ ratio) is usually 0.005 or more, and preferably 0.01 or more, more preferably 0.02 or more, still more preferably 0.05 or more, particularly preferably 0.08 or more, and most preferably 0.1 or more, and usually the ratio is 1 or less, and preferably 0.5 or less, more preferably 0.4 or less, still more preferably 0.35 or less, particularly preferably 0.30 or less, and most preferably 0.25 or less. When the organic template/$SiO_2$ ratio of an aqueous reaction mixture is in this range, zeolite that not only can form a dense zeolite membrane, but also has excellent acid resistance and does not easily desorb Al atoms is obtained. Under these conditions, a particularly dense and excellent acid-resistant RHO aluminosilicate zeolite can be formed.

By using an appropriate amount of an alkali metal atom source, an organic structure-directing agent described below can be easily coordinated to aluminum in a suitable state, and therefore, a crystal structure can be easily formed. The molar ratio (R/Si atom) of an alkali metal atom source (R) and a silicon (Si atom) contained in the raw material mixture for hydrothermal synthesis other than seed crystals is usually 0.1 or more, and preferably 0.15 or more, more preferably 0.20 or more, still more preferably 0.25 or more, especially preferably 0.30 or more, and particularly preferably 0.35 or more, and the ratio is usually 2.0 or less, and preferably 1.5 or less, more preferably 1.0 or less, still more preferably 0.8 or less, particularly preferably 0.6 or less, and most preferably 0.5 or less.

When the molar ratio of the alkali metal atom source to silicon (R/Si atom) is larger than the above-described upper limit, produced zeolite is likely to be dissolved, and the zeolite may not be obtained or the yield may be considerably reduced. When the R/Si atom is smaller than the lower limit, the raw material Al atom source or Si atom source is not sufficiently dissolved, a uniform raw material mixture for hydrothermal synthesis may not be obtained, and RHO zeolite may be difficult to produce.

(Amount of Water)

The amount of water in a raw material mixture for hydrothermal synthesis in terms of a molar ratio to silicon (Si atoms) contained in the raw material mixture other than a seed crystal is usually 10 or more, and preferably 20 or more, more preferably 30 or more, still more preferably 40 or more, and particularly preferably 50 or more, and usually is 200 mol or less, and preferably 150 or less, more preferably 100 or less, still more preferably 80 or less, and particularly preferably 60 or less. When the amount is larger than the above-described upper limit, too dilute a reaction mixture may make it difficult to form a dense membrane without defects. When the amount is less than 10, due to a thick reaction mixture, a spontaneous nucleus is likely to be generated, and growth of RHO zeolite from a support may be inhibited, which may make it difficult to form a dense membrane.

(Seed Crystal)

In the present invention, a seed crystal may be used as one component of a "zeolite" production raw material (raw material compound).

In hydrothermal synthesis, although not always necessary to have a seed crystal in a reaction system, presence of a seed crystal can promote crystallization of zeolite on a porous support. A method for allowing a seed crystal to exist in a reaction system is not particularly limited, and a method for adding a seed crystal in an aqueous reaction mixture or a method for depositing a seed crystal on a support can be used as in synthesis of powder zeolite. In the present invention, depositing a seed crystal on a support is preferred. By depositing a seed crystal in advance on a support, a dense zeolite membrane with high separation performance can be easily formed.

A seed crystal to be used is not particularly limited as long as the seed is a zeolite that promotes crystallization, and for efficient crystallization, a seed crystal having the same crystal type as a zeolite membrane to be formed is preferable. For example, when forming a zeolite membrane of RHO aluminosilicate, it is preferable to use a seed crystal of RHO zeolite.

The seed crystal particle size is desirably close to the pore diameter of a support, and may be used after pulverization as necessary. The particle size is usually 20 nm or more, and preferably 50 nm or more, more preferably 100 nm or more, still more preferably 0.15 μm or more, particularly preferably 0.5 μm or more, and most preferably 0.7 μm or more, and usually 5 μm or less, and preferably 3 μm or less, more preferably 2 μm or less, and particularly preferably 1.5 μm or less.

Depending on the pore diameter of a support, it may be desirable for the particle size of the seed crystal to be small, and a seed crystal may be crushed and used as necessary. The particle diameter of a seed crystal is usually 5 nm or more, and preferably 10 nm or more, and more preferably 20 nm or more, and is usually 5 μm or less, preferably 3 μm or less, and more preferably 2 μm or less.

The method for depositing a seed crystal on a support is not particularly limited, and for example, a dip method in which a seed crystal is dispersed in a solvent such as water and a support is immersed in the dispersion to deposit the seed crystal on the surface; a suction method in which, after immersing a support with one end sealed in a dispersion in which a seed crystal is dispersed in a solvent such as water, the support is sucked from the other end in such a manner that the seed crystal is firmly deposited on the surface of the support; a method of applying a slurry obtained by mixing a seed crystal with a solvent such as water onto a support; or the like can be used. A dip method and a suction method are desirable for producing a zeolite membrane with favorable reproducibility by controlling the amount of seed crystals deposited, and from the viewpoint of bringing a seed crystal into close contact with a support, a method of applying the seed crystal on a slurry onto the support and a suction method are desirable. For the purpose of closely depositing a seed crystal on a support and/or for the purpose of removing excessive seed crystal, it is also preferable to rub and push the support on which the seed crystal is deposited with a finger wearing a latex glove following the dip method or the suction method.

A solvent for dispersing a seed crystal is not particularly limited, and water or an alkaline aqueous solution is particularly preferable. Although the kind of alkaline aqueous solution is not specifically limited, a sodium hydroxide aqueous solution or a potassium hydroxide aqueous solution is preferable. These alkali species may be mixed. The alkali concentration of an alkaline aqueous solution is not particularly limited, and is usually 0.0001% by mole or more, and preferably 0.0002% by mole or more, more preferably 0.001% by mole or more, and further preferably 0.002% by mole or more. The concentration is usually 1% by mole or less, and preferably 0.8% by mole or less, more preferably 0.5% by mole or less, and still more preferably 0.2% by mole or less.

A solvent for dispersing a seed crystal is not particularly limited, and water is particularly preferable. The amount of a seed crystal to be dispersed is not particularly limited, and is, based on the total weight of the dispersion, usually 0.05% by mass or more, and preferably 0.1% by mass or more, more preferably 0.5% by mass or more, still more preferably 1% by mass or more, particularly preferably 2% by mass or more, and most preferably 3.0% by mass or more. The amount is usually 20% by mass or less, and preferably 10% by mass or less, more preferably 5% by mass or less, and still more preferably 4% by mass or less.

When the amount of a seed crystal to be dispersed is too small, since the amount of the seed crystal deposited on a support is small, a portion where no zeolite is generated on the support during hydrothermal synthesis is partially formed, which may result in a defective membrane. On the other hand, for example, the amount of a seed crystal deposited on a porous support by a dip method is almost constant when the amount of the seed crystal in a dispersion is more than a certain amount, and therefore, when the amount of the seed crystal in the dispersion is too large, the seed crystal is, wasted, which is disadvantageous in terms of cost.

It is desirable to form a zeolite membrane after drying a seed crystal after depositing the seed crystal on a support by dipping, suction or slurry application. Drying temperature is usually 50° C. or higher, and preferably 80° C. or higher, and more preferably 100° C. or higher, and is usually 200° C. or lower, and preferably 180° C. or lower, and more preferably 150° C. or lower. As long as the drying is sufficiently performed, there is no problem with any drying time, and the drying time is usually 10 minutes or more, and preferably 30 minutes or more, and the upper limit is not specified, and is usually 5 hours or less from an economic viewpoint.

For a dried seed crystal support, for the purpose of depositing the seed crystal on the support and/or for the purpose of removing excess seed crystal, it is also preferable to rub and push the support on which the seed crystal is deposited with a finger wearing a latex glove.

The amount of a seed crystal to be preliminarily deposited on a porous support is not particularly limited, and is, by mass per 1 m² of the film-forming surface of the porous support, usually 0.1 g or more, and preferably 0.3 g or more, more preferably 0.5 g or more, further preferably 0.80 g or more, and most preferably 1.0 g or more, and usually 100 g or less, and preferably 50 g or less, more preferably 10 g or less, still more preferably 8 g or less, and most preferably 5 g or less.

When the amount of a seed crystal deposited is less than the above-described lower limit, a crystal is less likely to be formed, and the membrane growth tends to be insufficient, or the membrane growth tends to be uneven. When the amount of a seed crystal is higher than the above-described upper limit, the surface irregularities may be increased by the seed crystal, or a seed crystal falling from a support may easily cause a spontaneous nucleus to grow and inhibit membrane growth on the support. In either case, there is a tendency that a dense zeolite membrane is less likely to be generated.

When a zeolite membrane is formed on a porous support by hydrothermal synthesis, there is no particular limitation on a method of immobilizing a support, and the support may be fixed in any form such as vertically or horizontally. In this case, a zeolite membrane may be formed by a stationary method, or a zeolite membrane may be formed under stirring of an aqueous reaction mixture.

Hydrothermal synthesis is carried out by placing a support supporting a seed crystal as described above and a prepared mixture for hydrothermal synthesis or an aqueous gel obtained by aging this in a pressure vessel and maintaining a predetermined temperature under stirring, while rotating or swinging the container, or in a stationary state, under a self-generated pressure or under gas pressurization that does not inhibit crystallization. Hydrothermal synthesis in a stationary state is desirable in that the synthesis does not inhibit crystal growth from a seed crystal on a support.

The reaction temperature at the time of forming a zeolite membrane by hydrothermal synthesis is not particularly limited as long as the temperature is a temperature suitable for obtaining a membrane having a target zeolite structure, and is usually 100° C. or higher, and preferably 110° C. or higher, further preferably 120° C. or higher, especially preferably 130° C. or higher, particularly preferably 140° C. or higher, and most preferably 150° C. or higher, and is usually 200° C. or lower, preferably 190° C. or lower, more preferably 180° C. or lower, and further preferably 170° C. or lower. When the reaction temperature is too low, zeolite may be difficult to crystallize. When the reaction temperature is too high, zeolite of a type different from target zeolite may be easily generated.

The heating (reaction) time for forming a zeolite membrane by hydrothermal synthesis is not particularly limited, and may be any time suitable for obtaining a membrane having target zeolite structure, and is usually 3 hours or more, and preferably 8 hours or more, more preferably 12 hours or more, and particularly preferably 15 hours or more, and is usually 10 days or less, and preferably 5 days or less, more preferably 3 days or less, still more preferably 2 days or less, and particularly preferably 1.5 days or less. When the reaction time is too short, zeolite may be difficult to crystallize. When the reaction time is too long, zeolite of a type different from target zeolite may be easily formed.

The pressure at the time of hydrothermal synthesis is not particularly limited, and a self-generated pressure generated when an aqueous reaction mixture placed in a closed vessel is heated to the above-described temperature range is sufficient. If necessary, an inert gas such as nitrogen may be added.

It is also possible to improve the denseness of a zeolite membrane by repeating hydrothermal synthesis a plurality of times. When hydrothermal synthesis is repeated a plurality of times, a zeolite membrane composite obtained by the first hydrothermal synthesis may be washed with water, dried by heating, and then immersed again in a newly prepared aqueous reaction mixture for hydrothermal synthesis. Although the zeolite membrane composite obtained after the first hydrothermal synthesis does not necessarily need to be washed with water or dried, the aqueous reaction mixture can be kept at an intended composition by washing with water and drying. In the case of performing synthesis a plurality of times, the number of the synthesis is usually 2 times or more, and usually 10 times or less, preferably 5 times or less, and more preferably 3 times or less. The washing with water may be performed once or repeated a plurality of times.

A zeolite membrane composite obtained by hydrothermal synthesis is washed with water, then heated and dried. Here, the heat treatment means that a zeolite membrane composite is dried by applying heat, and when an organic template is used, the organic template is fired and removed.

For the purpose of drying, the temperature of the heat treatment is usually 50° C. or higher, and preferably 80° C. or higher, and more preferably 100° C. or higher, and usually 200° C. or lower, and preferably 150° C. or lower. For the purpose of firing and removing the organic template, the temperature of the heat treatment is usually 250° C. or higher, and preferably 300° C. or higher, more preferably 350° C. or higher, and still more preferably 400° C. or higher, and is usually 800° C. or lower, and preferably 600° C. or lower, further preferably 550° C. or lower, and particularly preferably 500° C. or lower.

For the purpose of firing and removing an organic template, when the temperature of the heat treatment is too low, the residual ratio of the organic template tends to increase, and pores of zeolite decrease, which may reduce the permeation amount when used for ammonia separation. When the heat treatment temperature is too high, since the difference in thermal expansion coefficient between a support and zeolite becomes large, a crack may easily occur in a zeolite membrane, and the denseness of the zeolite membrane may be lost and the separation performance may be lowered.

The time for the heat treatment is not particularly limited as long as a zeolite membrane is sufficiently dried and an organic template is fired and removed, and for the purpose of drying, the time is preferably 0.5 hours or more, and more preferably 1 hour or more, and in order to remove an organic template by firing, although the time varies depending on the temperature rise rate or the temperature fall rate, the time is preferably 1 hour or longer, and more preferably 5 hours or longer. The upper limit of the heating time is not particularly limited, and is usually 200 hours or less, and preferably 150 hours or less, and more preferably 100 hours or less.

For the purpose of firing a template, the heat treatment may be performed in an air atmosphere, and may also be performed in an atmosphere to which an inert gas such as nitrogen or oxygen is added.

When hydrothermal synthesis is performed in the presence of an organic template, after an obtained zeolite membrane composite is washed with water, it is appropriate to remove the organic template preferably by the above-described heat treatment or firing, for example, by heat treatment or extraction.

The temperature rise rate during a heat treatment for the purpose of firing and removing an organic template is desirably as slow as possible in order to prevent a zeolite membrane from cracking due to the difference in thermal expansion coefficient between a porous support and zeolite. The temperature rise rate is usually 5° C./min or less, and preferably 2° C./min or less, more preferably 1° C./min or less, further preferably 0.5° C./min or less, and particularly preferably 0.3° C./min or less. The lower limit of the temperature rise rate is usually 0.1° C./min or more in consideration of workability.

In a heat treatment for the purpose of firing and removing an organic template, it is necessary to control the temperature drop rate after the heat treatment in order to avoid a crack in a zeolite membrane, and the temperature drop rate is preferably as slow as the temperature rise rate. The temperature drop rate is usually 5° C./min or less, and preferably 2° C./min or less, more preferably 1° C./min or less, further preferably 0.5° C./min or less, and particularly preferably 0.3° C./min or less. The lower limit of the temperature drop rate is usually 0.1° C./min or more in consideration of workability.

<Method for Producing MFI Zeolite Membrane>
(Silicon Atom Source)

Examples a silicon (Si) atom source which can be used in an aqueous reaction mixture include aluminosilicate zeolite, fumed silica, colloidal silica, amorphous silica, a silicon alkoxide such as sodium silicate, methyl silicate, ethyl silicate, or trimethylethoxysilane, tetraethyl orthosilicate, and aluminosilicate gel. Preferred examples thereof include aluminosilicate zeolite, fumed silica, colloidal silica, amorphous silica, sodium silicate, methyl silicate, ethyl silicate, silicon alkoxide, and aluminosilicate gel. These may be used singly or in combination of two or more kinds thereof.

A Si atom source is used in such a manner that the amount of other raw materials used with respect to the Si atom source is within the above- or below-described preferred range.

(Aluminum Atom Source)

An aluminum (Al) atom source used for producing a porous support-MFI zeolite membrane composite is not particularly limited, and examples thereof include aluminosilicate zeolite, amorphous aluminum hydroxide, aluminum hydroxide with gibbsite structure, aluminum hydroxide with bayerite structure, aluminum nitrate, aluminum sulfate, aluminum oxide, sodium aluminate, boehmite, pseudoboehmite, aluminum alkoxide, and aluminosilicate gel. Amorphous aluminum hydroxide, sodium aluminate, boehmite, pseudoboehmite, aluminum alkoxide, and aluminosilicate gel are preferable, and amorphous aluminum hydroxide, sodium aluminate, and aluminosilicate gel are particularly preferable. These may be used singly or in combination of two or more kinds thereof.

A preferable range of the amount of aluminum atom source (including the above-described aluminosilicate zeolite and the other aluminum atom sources) to silicon (Si atoms) contained in a raw material mixture other than a seed crystal (Al atom/Si atom ratio) as a molar ratio is usually 0.001 or more, and preferably 0.002 or more, more preferably 0.003 or more, and further preferably 0.004 or more, and is usually 1.0 or less, and preferably 0.5 or less, more preferably 0.2 or less, and still more preferably 0.1 or less. By controlling the amount within this range, the content of nitrogen atoms and alkali metal elements in the zeolite can be easily controlled within a preferable range of the present invention. In order to increase the Al atom/Si atom ratio, the amount of a silicon atom source used with respect to an aluminum atom source may be reduced, and on the other hand, in order to reduce the ratio, the amount of a silicon atom source used with respect to an aluminum atom source may be increased.

An atom source other than a Si atom source or an Al atom source, such as Ga, Fe, B, Ti, Zr, Sn, or Zn, may be included in an aqueous reaction mixture.

The kind of alkali used as an alkali source is not particularly limited, and an alkali metal hydroxide or an alkaline earth metal hydroxide can be used.

Specific examples of the metal hydroxide that can be used include an alkali metal hydroxide such as sodium hydroxide, potassium hydroxide, lithium hydroxide, rubidium hydroxide, or cesium hydroxide; and an alkaline earth metal hydroxide such as calcium hydroxide, magnesium hydroxide, strontium hydroxide, or barium hydroxide.

As an alkali source used in an aqueous reaction mixture, a hydroxide ion of a counter anion of an organic template described below can be used.

In crystallization of the zeolite according to the present invention, although an organic template (structure-directing agent) is not necessarily required, by using an organic template of a kind corresponding to each structure, the ratio of silicon atoms to aluminum atoms of crystallized zeolite is increased and the crystallinity is improved, and therefore, it is preferable to use an organic template.

The organic template may be any kind as long as the template can form a desired zeolite membrane. One kind of template may be used, or two or more kinds thereof may be used in combination.

The kind of organic template suitable for reactions varies depending on the zeolite structure to be synthesized, and an organic template that provides a desired zeolite structure may be used. Specifically, for example, tetrapropylammonium hydroxide may be used for the MFI structure.

When the organic template is a cation, the template is accompanied by an anion that does not harm formation of zeolite. Representative examples of such an anion include a halogen ion such as $Cl^-$, $Br^-$, or $I^-$, and a hydroxide ion, an acetate, a sulfate, and a carboxylate. Among these, a hydroxide ion is particularly preferably used, and in the case of a hydroxide ion, the ion functions as an alkali source as described above.

The ratio of a Si atom source to an organic template in an aqueous reaction mixture in terms of the molar ratio of the organic template to $SiO_2$ (organic template/$SiO_2$ ratio) is usually 0.005 or more, and preferably 0.01 or more, more preferably 0.02 or more, especially 0.05 or more, and most preferably 0.1 or more, and usually the ratio is 1 or less, and preferably 0.5 or less, more preferably 0.3 or less, especially 0.25 or less, and particularly preferably 0.20 or less. When the organic template/$SiO_2$ ratio of an aqueous reaction mixture is in this range, zeolite that not only can form a dense zeolite membrane, but also has excellent acid resistance and does not easily desorb Al is obtained. Under these conditions, a particularly dense and excellent acid-resistant MFI aluminosilicate zeolite can be formed.

By using an appropriate amount of an alkali metal atom source, an organic structure-directing agent described below can be easily coordinated to aluminum in a suitable state, and therefore, a crystal structure can be easily formed. The molar ratio (R/Si) of an alkali metal atom source (R) and a silicon (Si) contained in the raw material mixture for hydrothermal synthesis other than seed crystals is usually 0.01 or more, and preferably 0.02 or more, more preferably 0.03 or more, still more preferably 0.04 or more, and particularly preferably 0.05 or more, and the ratio is usually 1.0 or less, and preferably 0.6 or less, more preferably 0.4 or less, still more preferably 0.2 or less, and particularly preferably 0.1 or less.

When the molar ratio of the alkali metal atom source to silicon (R/Si) is larger than the above-described upper limit, produced zeolite is likely to be dissolved, and the zeolite may not be obtained or the yield may be considerably reduced. When the R/Si is smaller than the lower limit, the raw material Al atom source or Si atom source is not sufficiently dissolved, a uniform raw material mixture for hydrothermal synthesis may not be obtained, and MFI zeolite may be difficult to produce.

(Amount of Water)

The amount of water in a raw material mixture for hydrothermal synthesis in terms of a molar ratio to silicon (Si) contained in the raw material mixture other than a seed crystal is usually 10 or more, and preferably 15 or more, more preferably 20 or more, still more preferably 25 or more, and particularly preferably 30 or more, and usually is 500 mol or less, and preferably 300 or less, more preferably 200 or less, still more preferably 150 or less, and particularly preferably 100 or less. When the amount is larger than the above-described upper limit, too dilute a reaction mixture may make it difficult to form a dense membrane without defects. When the amount is less than 10, due to a thick reaction mixture, a spontaneous nucleus is likely to be generated, and growth of MFI zeolite from a support may be inhibited, which may make it difficult to form a dense membrane.

(Seed Crystal)

In the present invention, a seed crystal may be used as one component of a "zeolite" production raw material (raw material compound).

In hydrothermal synthesis, although not always necessary to have a seed crystal in a reaction system, presence of a seed crystal can promote crystallization of zeolite on a porous support. A method for allowing a seed crystal to exist in a reaction system is not particularly limited, and a method for adding a seed crystal in an aqueous reaction mixture or a method for depositing a seed crystal on a support can be used as in synthesis of powder zeolite. In the present invention, depositing a seed crystal on a support is preferred. By depositing a seed crystal in advance on a support, a dense zeolite membrane with high separation performance can be easily formed.

A seed crystal to be used is not particularly limited as long as the seed is a zeolite that promotes crystallization, and for efficient crystallization, a seed crystal having the same crystal type as a zeolite membrane to be formed is preferable. For example, when forming a zeolite membrane of MFI aluminosilicate, it is preferable to use a seed crystal of MFI zeolite.

The seed crystal particle size is desirably close to the pore diameter of a support, and may be used after pulverization as necessary. The particle size is usually 1 nm or more, and preferably 10 nm or more, more preferably 50 nm or more, still more preferably 0.1 μm or more, particularly preferably 0.5 μm or more, especially preferably 0.7 μm or more, and most preferably 1 μm or more, and usually 5 μm or less, and preferably 3 μm or less, more preferably 2 μm or less, most preferably 1.5 μm or less, and particularly preferably 1.2 μm or less.

Depending on the pore diameter of a support, it may be desirable for the particle size of the seed crystal to be small, and a seed crystal may be crushed and used as necessary. The particle diameter of a seed crystal is usually 0.5 nm or more, and preferably 1 nm or more, and more preferably 2 nm or more, and is usually 5 μm or less, preferably 3 μm or less, and more preferably 2 μm or less.

The method for depositing a seed crystal on a support is not particularly limited, and for example, a dip method in which a seed crystal is dispersed in a solvent such as water and a support is immersed in the dispersion to deposit the seed crystal on the surface; a suction method in which, after immersing a support with one end sealed in a dispersion in which a seed crystal is dispersed in a solvent such as water, the support is sucked from the other end in such a manner that the seed crystal is firmly deposited on the surface of the support; a method of applying a slurry obtained by mixing a seed crystal with a solvent such as water onto a support; or the like can be used. A dip method and a suction method are desirable for producing a zeolite membrane with favorable reproducibility by controlling the amount of seed crystals deposited, and from the viewpoint of bringing a seed crystal into close contact with a support, a method of applying the seed crystal on a slurry onto the support and a suction method are desirable. For the purpose of closely depositing a seed crystal on a support and/or for the purpose of removing excessive seed crystal, it is also preferable to rub and push the support on which the seed crystal is deposited with a finger wearing a latex glove following the dip method or the suction method.

A solvent for dispersing a seed crystal is not particularly limited, and water or an alkaline aqueous solution is particularly preferable. Although the kind of alkaline aqueous solution is not specifically limited, a sodium hydroxide aqueous solution or a potassium hydroxide aqueous solution is preferable. These alkali species may be mixed. The alkali concentration of an alkaline aqueous solution is not particularly limited, and is usually 0.0001% by mole or more, and preferably 0.0002% by mole or more, more preferably 0.001% by mole or more, and further preferably 0.002% by mole or more. The concentration is usually 1% by mole or less, and preferably 0.8% by mole or less, more preferably 0.5% by mole or less, and still more preferably 0.2% by mole or less.

A solvent for dispersing a seed crystal is not particularly limited, and water is particularly preferable. The amount of a seed crystal to be dispersed is not particularly limited, and is, based on the total weight of the dispersion, usually 0.05% by mass or more, and preferably 0.1% by mass or more, more preferably 0.5% by mass or more, still more preferably 1% by mass or more, particularly preferably 2% by mass or more, and most preferably 3% by mass or more. The amount is usually 20% by mass or less, and preferably 10% by mass or less, more preferably 5% by mass or less, and still more preferably 4% by mass or less.

When the amount of a seed crystal to be dispersed is too small, since the amount of the seed crystal deposited on a support is small, a portion where no zeolite is generated on the support during hydrothermal synthesis is partially formed, which may result in a defective membrane. On the other hand, for example, the amount of a seed crystal deposited on a porous support by a dip method is almost constant when the amount of the seed crystal in a dispersion is more than a certain amount, and therefore, when the amount of the seed crystal in the dispersion is too large, the seed crystal is wasted, which is disadvantageous in terms of cost.

It is desirable to form a zeolite membrane after drying a seed crystal after depositing the seed crystal on a support by dipping, suction or slurry application. Drying temperature is usually 50° C. or higher, and preferably 80° C. or higher, and more preferably 100° C. or higher, and is usually 200° C. or lower, and preferably 180° C. or lower, and more preferably 150° C. or lower. As long as the drying is sufficiently performed, there is no problem with any drying time, and the drying time is usually 10 minutes or more, and preferably 30 minutes or more, and the upper limit is not specified, and is usually 5 hours or less from an economic viewpoint.

For a dried seed crystal support, for the purpose of depositing the seed crystal on the support and/or for the purpose of removing excess seed crystal, it is also preferable to rub and push the support on which the seed crystal is deposited with a finger wearing a latex glove.

The amount of a seed crystal to be preliminarily deposited on a porous support is not particularly limited, and is, by mass per 1 m² of the film-forming surface of the porous support, usually 0.1 g or more, and preferably 0.3 g or more, more preferably 0.5 g or more, further preferably 0.80 g or more, and most preferably 1.0 g or more, and usually 100 g or less, and preferably 50 g or less, more preferably 10 g or less, still more preferably 8 g or less, and most preferably 5 g or less.

When the amount of a seed crystal deposited is less than the above-described lower limit, a crystal is less likely to be formed, and the membrane growth tends to be insufficient, or the membrane growth tends to be uneven. When the amount of a seed crystal is higher than the above-described upper limit, the surface irregularities may be increased by the seed crystal, or a seed crystal falling from a support may easily cause a spontaneous nucleus to grow and inhibit membrane growth on the support. In either case, there is a tendency that a dense zeolite membrane is less likely to be generated.

When a zeolite membrane is formed on a porous support by hydrothermal synthesis, there is no particular limitation on a method of immobilizing a support, and the support may be fixed in any form such as vertically or horizontally. In this case, a zeolite membrane may be formed by a stationary method, or a zeolite membrane may be formed under stirring of an aqueous reaction mixture.

Hydrothermal synthesis is carried out by placing a support supporting a seed crystal as described above and a prepared mixture for hydrothermal synthesis or an aqueous gel obtained by aging this in a pressure vessel and maintaining a predetermined temperature under stirring, while rotating or swinging the container, or in a stationary state, under a self-generated pressure or under gas pressurization that does not inhibit crystallization. Hydrothermal synthesis in a stationary state is desirable in that the synthesis does not inhibit crystal growth from a seed crystal on a support.

The reaction temperature at the time of forming a zeolite membrane by hydrothermal synthesis is not particularly limited as long as the temperature is a temperature suitable for obtaining a membrane having a target zeolite structure, and is usually 100° C. or higher, and preferably 120° C. or higher, further preferably 130° C. or higher, especially preferably 140° C. or higher, particularly preferably 150° C. or higher, and most preferably 160° C. or higher, and is usually 200° C. or lower, preferably 190° C. or lower, further preferably 180° C. or lower, and particularly preferably 170° C. or lower. When the reaction temperature is too low, zeolite may be difficult to crystallize. When the reaction temperature is too high, zeolite of a type different from target zeolite may be easily generated.

The heating (reaction) time for forming a zeolite membrane by hydrothermal synthesis is not particularly limited, and may be any time suitable for obtaining a membrane having target zeolite structure, and is usually 1 hour or more, and preferably 5 hours or more, and further preferably 10 hours or more, and is usually 10 days or less, and preferably 5 days or less, more preferably 3 days or less, still more preferably 2 days or less, and particularly preferably 1 day or less. When the reaction time is too short, zeolite may be difficult to crystallize. When the reaction time is too long, zeolite of a type different from target zeolite may be easily formed.

The pressure at the time of hydrothermal synthesis is not particularly limited, and a self-generated pressure generated when an aqueous reaction mixture placed in a closed vessel is heated to the above-described temperature range is sufficient. If necessary, an inert gas such as nitrogen may be added.

It is also possible to improve the denseness of a zeolite membrane by repeating hydrothermal synthesis a plurality of times. When hydrothermal synthesis is repeated a plurality of times, a zeolite membrane composite obtained by the first hydrothermal synthesis may be washed with water, dried by heating, and then immersed again in a newly prepared aqueous reaction mixture for hydrothermal synthesis. Although the zeolite membrane composite obtained after the first hydrothermal synthesis does not necessarily need to be washed with water or dried, the aqueous reaction mixture can be kept at an intended composition by washing with water and drying. In the case of performing synthesis a plurality of times, the number of the synthesis is usually 2 times or more, and usually 10 times or less, preferably 5 times or less, and more preferably 3 times or less. The washing with water may be performed once or a plurality of times.

A zeolite membrane composite obtained by hydrothermal synthesis is washed with water, then heated and dried. Here, the heat treatment means that a zeolite membrane composite is dried by applying heat, and when an organic template is used, the organic template is fired and removed.

For the purpose of drying, the temperature of the heat treatment is usually 50° C. or higher, and preferably 80° C. or higher, and more preferably 100° C. or higher, and usually 200° C. or lower, and preferably 150° C. or lower. For the purpose of firing and removing the organic template, the temperature of the heat treatment is usually 350° C. or higher, and preferably 400° C. or higher, more preferably 450° C. or higher, and still more preferably 500° C. or higher, and is usually 900° C. or lower, and preferably 800° C. or lower, further preferably 700° C. or lower, and particularly preferably 600° C. or lower.

For the purpose of firing and removing an organic template, when the temperature of the heat treatment is too low, the residual ratio of the organic template tends to increase, and pores of zeolite decrease, which may reduce the permeation amount when used for ammonia separation. When the heat treatment temperature is too high, since the difference in thermal expansion coefficient between a support and zeolite becomes large, a crack may easily occur in a zeolite membrane, and the denseness of the zeolite membrane may be lost and the separation performance may be lowered. When tetrapropylammonium hydroxide is used as an organic template, the content of nitrogen atoms in zeolite can be controlled by adjusting the heat treatment temperature.

The time for the heat treatment is not particularly limited as long as a zeolite membrane is sufficiently dried and an organic template is fired and removed, and for the purpose of drying, the time is preferably 0.5 hours or more, and more preferably 1 hour or more, and in order to remove an organic template by firing, although the time varies depending on the temperature rise rate or the temperature fall rate, the time is preferably 1 hour or longer, and more preferably 5 hours or longer. The upper limit of the heating time is not particularly limited, and is usually 200 hours or less, and preferably 150 hours or less, and more preferably 100 hours or less.

For the purpose of firing a template, the heat treatment may be performed in an air atmosphere, and may also be performed in an atmosphere to which an inert gas such as nitrogen or oxygen is added.

When hydrothermal synthesis is performed in the presence of an organic template, after an obtained zeolite membrane composite is washed with water, it is appropriate to remove the organic template preferably by the above-described heat treatment or firing, for example, by heat treatment or extraction.

The temperature rise rate during a heat treatment for the purpose of firing and removing an organic template is desirably as slow as possible in order to prevent a zeolite membrane from cracking due to the difference in thermal expansion coefficient between a porous support and zeolite. The temperature rise rate is usually 5° C./min or less, and preferably 2° C./min or less, more preferably 1° C./min or less, particularly preferably 0.5° C./min or less, and most preferably 0.3° C./min or less. The lower limit of the temperature rise rate is usually 0.1° C./min or more in consideration of workability.

In a heat treatment for the purpose of firing and removing an organic template, it is necessary to control the temperature drop rate after the heat treatment in order to avoid a crack in a zeolite membrane, and the temperature drop rate is preferably as slow as the temperature rise rate. The temperature drop rate is usually 5° C./min or less, and preferably 2° C./min or less, more preferably 1° C./min or less, particularly preferably 0.5° C./min or less, and most preferably 0.3° C./min or less. The lower limit of the temperature drop rate is usually 0.1° C./min or more in consideration of workability.

(Ion Exchange)

A synthesized zeolite membrane may be ion exchanged as necessary. In particular, in certain embodiments of the present invention (for example, zeolite membranes of Inventions B, C, D, and E), the synthesized zeolite membrane undergoes an ion exchange treatment. Since the thermal expansion characteristics and the separation heat stability of ammonia of zeolite, which are one of the characteristics of the present invention, are greatly affected by the cationic species in the zeolite, this ion exchange is an important control method. As will be described below, the ammonia permeation performance and/or separation performance of a zeolite membrane may be improved depending on the cationic species to be used. In other words, the cationic species used in the present invention is appropriately selected in consideration of the ammonia permeation performance and separation performance while ensuring the thermal expansion characteristics and the ammonia separation heat stability of the above zeolite.

(Ion Exchange)

When a zeolite membrane is synthesized using an organic template, ion exchange is usually performed after removing the organic template. In the present invention, in order to increase the nitrogen content of a zeolite membrane surface, $NH_4^+$, any cationic species obtained by protonating an organic amine having from 1 to 20 carbon atoms, such as methylamine, dimethylamine, trimethylamine, ethylamine, diethylamine, triethylamine, ethylenediamine, dimethylethylenediamine, tetramethylethylenediamine, diethylenetriamine, triethylenetetraamine, aniline, methylaniline, benzylamine, methylbenzylamine, hexamethylenediamine, N,N-diisopropylethylamine, N,N,N-trimethyl-1-adamantanamine, pyridine, or piperidine is preferable as an ion for ion exchange, and an alkali metal ion such as proton, $Na^+$, $K^+$, $Li^+$, $Rb^+$, or $Cs^+$, an alkaline earth metal ion such as $Ca^{2+}$, $Mg^{2+}$, $Sr^{2+}$, or $Ba^{2+}$, a transition metal ion such as Fe, Cu, Zn, Ga, or La, or the like may coexist. Among these, a proton, $NH_4^+$, $Na^+$, $Li^+$, $Cs^+$, an Fe ion, a Ga ion, or an La ion is preferable. A plurality of kinds of these ions may be mixed in zeolite, and a method of mixing the above-described ions is suitably employed in order to balance the thermal expansion characteristics and the ammonia permeation performance of the zeolite. By controlling the cationic species to be ion-exchanged and the amount thereof as described above, the ammonia affinity of the zeolite and the effective pore diameter in the zeolite pores can be controlled, whereby it is possible to increase the ammonia permeation selectivity and to improve the permeation amount of ammonia. Among these, $NH_4^+$, any cationic species obtained by protonating an organic amine having from 1 to 20 carbon atoms, such as methylamine, dimethylamine, trimethylamine, ethylamine, diethylamine, triethylamine, ethylenediamine, dimethylethylenediamine, tetramethylethylenediamine, diethylenetriamine, triethylenetetraamine, aniline, methylaniline, benzylamine, methylbenzylamine, hexamethylenediamine, N,N-diisopropylethylamine, N,N,N-trimethyl-1-adamantanamine, pyridine, or piperidine is preferable as an ionic species that increases the ammonia permeation selectivity. Among them, $NH_4^+$ or a cationic species in which an amine with a small molecular size such as an organic amine having from 1 to 6 carbon atoms is protonated is more preferable for the above reason, and among them, $NH_4^+$ is particularly preferable. On the other hand, as an ion species that improves the permeation amount of ammonia, a proton, $Na^+$, $Li^+$, $Cs^+$, an Fe ion, a Ga ion, or an La ion is preferable, an $Na^+$ ion, an $Li^+$ ion, or a $Cs^+$ ion is particularly preferable, and an $Na^+$ ion most preferably coexists. In the present invention, the molar ratio of nitrogen atoms to Al atoms in a zeolite membrane can be controlled by adjusting the exchange amount of ions that essentially require ionic species containing nitrogen atoms.

When $Na^+$ ions are contained in the zeolite of the present invention, the content thereof in terms of molar ratio with respect to Al atoms in the zeolite is usually 0.01 or more, and preferably 0.02 or more, more preferably 0.03 or more, still more preferably 0.04 or more, and particularly preferably 0.05 or more, and the upper limit thereof is not particularly limited, and is usually 0.10 molar equivalent or less, and preferably 0.070 molar equivalent or less, more preferably 0.065 molar equivalent or less, further preferably 0.060 molar equivalent or less, and most preferably 055 molar equivalent or less. By using zeolite having a $Na^+$/Al atomic ratio in such a specific region, ammonia can be separated from a mixed gas composed of a plurality of components including ammonia and hydrogen and/or nitrogen with high permeability.

Ion exchange may be performed by treating a zeolite membrane after firing (for example, when using an organic template) with a nitrate, a sulfate, a phosphate, an organic acid salt, a hydroxide, and a halogen (such as Cl or Br) salt of the above-described cation to be ion-exchanged, and in some cases, an acid such as hydrochloric acid, usually at from room temperature to 100° C., followed by washing with water or with hot water of from 40° C. to 100° C. A solvent used for an ion exchange treatment may be water or an organic solvent as long as a salt to be ion-exchanged is dissolved, and the concentration of the salt to be treated is usually 10 mol/L or less, and the lower limit is 0.1 mol/L or more, preferably 0.5 mol/L or more, and more preferably 1 mol/L or more. These treatment conditions may be appropriately set according to the salt and solvent kind to be used. When an acid such as hydrochloric acid is used, the acid destroys the crystal structure of zeolite, and therefore, the concentration of the acid to be treated is usually 5 mol/L or less, and the temperature and time may be appropriately set. Since the ion exchange rate increases by performing an ion exchange treatment repeatedly, the number of times of ion exchange treatments is not particularly limited, and the treatment may be repeated until a desired effect is obtained. An ion-exchanged zeolite membrane hinders gas permeability when a residue from a raw material for an ion exchange treatment is present in zeolite pores after the ion exchange treatment, and therefore, the zeolite membrane may be fired at from 200 to 500° C. and the residue after the ion exchange treatment may be removed, as necessary.

(Nitrate Treatment)

In certain embodiments of the present invention (for example, zeolite membranes of inventions B, C, D, and E), since it is preferable to use a nitrate treatment as a method for adjusting the content of nitrogen atoms in a zeolite membrane, a nitrate treatment will be described below.

In the present invention, a synthesized zeolite membrane may be subjected to a nitrate treatment as necessary. A nitrate treatment may be performed after an organic template is removed by firing even in a state containing the organic template. A nitrate treatment is performed, for example, by immersing a zeolite membrane composite in a solution containing nitrate. This may be preferable because an effect of a nitrate blocking a fine defect present on the film surface may be obtained. Furthermore, when nitrate is present in zeolite pores, a zeolite membrane has an effect of improving the affinity of the zeolite membrane with ammonia, and this treatment is suitably employed as a technique for improving the permeability of ammonia. A solvent used for a nitrate treatment may be water or an organic solvent as long as a salt dissolves, a nitrate to be used is not limited, and examples thereof include magnesium nitrate, calcium nitrate, barium nitrate, aluminum nitrate, gallium nitrate, indium nitrate, iron nitrate, cobalt nitrate, nickel nitrate, copper nitrate, and zinc nitrate. These may be used singly or in combination of two or more kinds thereof. Among these, magnesium nitrate, calcium nitrate, barium nitrate, aluminum nitrate, gallium nitrate, or indium nitrate is preferable, and among them, magnesium nitrate, calcium nitrate, barium nitrate, or aluminum nitrate is more preferable, and aluminum nitrate is particularly preferable because an effect of blocking a fine defect on the surface of a zeolite membrane is considerable and ammonia separation performance is improved.

The concentration of nitrate is usually 10 mol/L or less, and the lower limit is 0.1 mol/L or more, preferably 0.5 mol/L or more, and more preferably 1 mol/L or more. The treatment temperature is usually from room temperature to 150° C., and the treatment may be performed for about from 10 minutes to 48 hours, and these treatment conditions may be appropriately set according to the nitrate and solvent type to be used. A zeolite membrane after a nitrate treatment may be washed with water, and the nitrogen atom content of the zeolite membrane can be adjusted to a preferred range by repeating washing with water.

(Aluminum Salt Treatment)

In the present invention, a synthesized zeolite membrane may be subjected to an aluminum salt treatment as necessary. An aluminum salt treatment may be performed after an organic template is removed by firing even in a state including the organic template. An aluminum salt treatment is performed by immersing a zeolite membrane composite in a solution containing, for example, an aluminum salt. As a result, an effect of an aluminum salt blocking a fine defect present on the film surface may be obtained. Further, when an aluminum salt is present in zeolite pores, an aluminum salt treatment has an effect of attracting ammonia, and is suitably employed as a technique for improving the ammonia permeability. A solvent used for an aluminum salt treatment may be water or an organic solvent as long as a salt dissolves, and an aluminum salt to be used is not limited, and examples thereof include aluminum nitrate, aluminum sulfate, aluminum chloride, aluminum phosphate, aluminum acetate, aluminum carbonate, and aluminum hydroxide. These may be used singly or in combination of two or more kinds thereof.

The concentration of nitrate is usually 10 mol/L or less, and the lower limit is 0.1 mol/L or more, preferably 0.5 mol/L or more, and more preferably 1 mol/L or more. The treatment temperature is usually from room temperature to 150° C., and the treatment may be performed for about from 10 minutes to 48 hours, and these treatment conditions may be appropriately set according to the aluminum salt and solvent type to be used. A zeolite membrane after an aluminum salt treatment may be washed with water, and the Al atom content of the zeolite membrane can be adjusted by repeating washing with water. In order to increase the Si atom/Al atomic ratio of the present invention, it is preferable to reduce the concentration and treatment amount of an aluminum salt to be treated, or to increase the number of times of water washing after the aluminum salt treatment, and on the other hand, in order to reduce the ratio, it is preferable to increase the concentration and treatment amount of an aluminum salt to be treated, or to reduce the number of times of water washing after the aluminum salt treatment.

(Silylation Treatment)

In the present invention, a synthesized zeolite membrane may be subjected to a silylation treatment as necessary. A silylation treatment is performed by immersing a zeolite membrane composite in a solution containing, for example, an Si compound. As a result, the surface of a zeolite membrane can be modified with an Si compound and have specific physicochemical properties. For example, by reliably forming a layer containing a large amount of Si—OH on the zeolite membrane surface, the polarity of the membrane surface can be improved and the separation performance of a polar molecule can be improved. By modifying the surface of a zeolite membrane with an Si compound, an effect of blocking fine defects existing on the membrane surface may be obtained. Furthermore, the pore diameter of zeolite can be controlled by a silylation treatment, and a technique for improving the ammonia permeation selectivity by performing this treatment is also preferably employed.

A solvent used for a silylation treatment may be water or an organic solvent. A solution may be acidic or basic, and in this case, a silylation reaction is catalyzed by the acid or base. A silylating agent to be used is not limited, and alkoxysilane is preferable. The treatment temperature is usually from room temperature to 150° C., and the treatment may be performed for about from 10 minutes to 30 hours, and these treatment conditions may be appropriately set according to the silylating agent and solvent type to be used.

In the present invention, the content of nitrogen atoms contained on the surface of the zeolite membrane of the present invention can be controlled by a method of adjusting the Al atom/Si atom ratio of zeolite by selecting a cationic species containing nitrogen atoms in the zeolite contained in the zeolite membrane, a method of adjusting the content of nitrogen atoms by adjusting the amount of ion exchange by an ion exchange method, a method of using an organic template (structure-directing agent) containing nitrogen atoms as necessary when producing a zeolite membrane, and adjusting the amount of addition and the heating temperature and heating time when the organic template is removed by firing, a method of treating a zeolite membrane with nitrate, a method of adjusting the number of times of washing when washing a nitric acid-treated zeolite membrane, and appropriately combining these methods, as described above.

In the present invention, the content of Al atoms contained on the surface of the zeolite membrane of the present invention can be controlled by a method of adjusting the Al atom/Si atom ratio of zeolite contained in a zeolite membrane, a method of treating a zeolite membrane with an aluminum salt, a method of adjusting the number of times of washing when washing an aluminum salt-treated zeolite membrane and appropriately combining these methods, as described above.

In the present invention, the content of alkali metals contained on the surface of the zeolite membrane of the present invention can be controlled by a method of adjusting the Al atom/Si atom ratio of zeolite contained in a zeolite membrane, a method of adjusting the content of alkali metal elements by adjusting the ion exchange amount by an ion exchange method, a method of adjusting the number of times of washing when washing a membrane and appropriately combining these methods, as described above.

A zeolite membrane composite thus produced has excellent characteristics and can be suitably used as a means for membrane separation of ammonia from a mixed gas in the present invention.

EXAMPLES

Hereinafter, although the present invention is described more specifically based on Examples, the present invention is not limited by the following Examples without departing from the scope of the invention. The values of various production conditions and evaluation results in the following Examples have meanings as preferable values of the upper limit or the lower limit in an embodiment of the present invention, and a preferred range may be a range defined by a combination of the above-described upper limit or lower limit value and a value of the following Examples or a combination of values of Examples.

In the following, "CHA silicate zeolite" is simply called "CHA zeolite", "RHO silicate zeolite" is simply called "RHO zeolite", and "MFI silicate zeolite" is simply called "MFI zeolite"

Example A

[Measurement of Separation Performance]
In the following, the separation performance of a zeolite membrane composite was measured as follows.
(1) Ammonia Separation Test In an apparatus schematically shown in FIG. 1, an ammonia separation test was performed as follows. In the apparatus of FIG. 1, a mixed gas containing ammonia gas ($NH_3$), nitrogen gas ($N_2$), and hydrogen ($H_2$) was supplied as a supply gas at a flow rate of 100 SCCM between a pressure vessel and a zeolite membrane composite, a back pressure valve was adjusted in such a manner that the pressure difference between gas on the supply side and gas permeated through a membrane was constant at 0.3 MPa, an exhaust gas discharged from a pipe 10 was analyzed with a micro gas chromatograph, and the concentration and flow rate of the permeated gas were calculated.

In an ammonia separation test, in order to remove components such as moisture and air from a pressure vessel, after purging with a sample gas to be used for drying and evacuation not less than a measurement temperature, the sample gas temperature and the differential pressure between the supply gas side and the permeated gas side of a zeolite membrane composite was kept constant and the permeate gas flow rate was stabilized, then the flow rate of the sample gas (permeated gas) permeated through the zeolite membrane composite was measured and the gas permeance [mol/($m^2 \cdot s \cdot Pa$)] was calculated. As the pressure for calculating the permeance, a pressure difference (differential pressure) between the supply side and the permeation side of a supply gas was used. In the case of a mixed gas, a partial pressure difference was used.

Based on the measurement result, the ideal separation factor α' was calculated by the following formula (1).

$$\alpha' = (Q1/Q2)/(P1/P2) \tag{1}$$

[In the formula (1), Q1 and Q2 indicate the permeation amounts [mol·($m^2 \cdot s$)$^{-1}$] of a highly permeable gas and a low permeable gas, respectively, and P1 and P2 indicate the pressure differences [Pa] between the supply side and the permeation side of the highly permeable gas and the low permeable gas, respectively.]

This coefficient, indicating the ratio between the gas permeances, can be determined as the ratio obtained by calculating the permeance of each gas.

Production Example A1: Production of CHA Zeolite Membrane Composite 1

A CHA zeolite membrane composite 1 was produced by the following method.
(Raw Material Mixture for Hydrothermal Synthesis)

First, a raw material mixture for hydrothermal synthesis was prepared as follows.

To a mixture of 1.45 g of 1 mol/L-NaOH aqueous solution, 5.78 g of 1 mol/L-KOH aqueous solution, and 114.6 g of water, 0.19 g of aluminum hydroxide (containing $Al_2O_3$-53.5% by mass, manufactured by Aldrich Co., Ltd.) was added and dissolved by stirring to obtain a transparent solution. To this, 2.43 g of a 25% by mass aqueous solution of TMADAOH was added as an organic template, and then 10.85 g of colloidal silica (Snowtech-40, manufactured by Nissan Chemical Co., Ltd.) was added and stirred for 2 hours to obtain a raw material mixture for hydrothermal synthesis. The composition (molar ratio) of this mixture was $SiO_2/Al_2O_3/NaOH/KOH/H_2O/TMADAOH = 1/0.018/0.02/0.08/100/0.04$, $SiO_2/Al_2O_3=58$.
(Support)

As a porous support, an alumina tube BN1 (outer diameter 6 mm, inner diameter 4 mm) manufactured by Noritake Company Limited cut into a length of 80 mm, washed with an ultrasonic cleaner, and then dried was used.
(Seed Crystal Dispersion)

A crystal having a gel composition (molar ratio) of $SiO_2/Al_2O_3/NaOH/KOH/H_2O/TMADAOH = 1/0.033/0.1/0.06/20/0.07$ obtained by hydrothermal synthesis at 160° C. for 2 days was filtered, washed with water, and dried to produce CHA zeolite as a seed crystal. The seed crystal grain size was about from 0.3 to 3 μm. Next, the seed crystal was dispersed in water in such a manner that the concentration of a dispersion was about 1% by mass to produce a seed crystal dispersion (CHA seed crystal dispersion).
(Production of Membrane Composite)

The above-described porous support was prepared, and the support was immersed in the seed crystal dispersion for 1 minute, and then dried at 100° C. for 1 hour to deposit the seed crystal on the support. The mass of the deposited seed crystal was about 0.001 g.

The support with the seed crystal deposited thereon was immersed in the vertical direction in a Teflon (registered trademark) inner cylinder (200 ml) containing the above-described raw material mixture for hydrothermal synthesis, an autoclave was sealed, and heated at 180° C. for 72 hours in a stationary state under a self-generated pressure. After elapse of a predetermined time, after cooling, the support-zeolite membrane composite was taken out from the raw material mixture for hydrothermal synthesis, washed, and dried at 100° C. for 3 hours.

Next, the dried membrane composite was fired in air in an electric furnace at 450° C. for 10 hours and at 500° C. for 5 hours, and a CHA zeolite membrane composite 1 from which a template contained in zeolite was removed was obtained. At this time, the temperature rise rate and the temperature drop rate from room temperature to 450° C. were both 0.5° C./min, and the temperature rise rate and the temperature drop rate from 450° C. to 500° C. were both 0.1° C./min. The mass of the CHA zeolite crystallized on the support, which was determined from the difference between the mass of the membrane composite and the mass of the support after firing, was about from 0.279 to 0.289 g. The air permeation amount of the membrane composite after firing was from 2.4 to 2.9 cm$^3$/min.

Example A1

<Evaluation of Membrane Separation Performance>

In a pre-treatment, a mixed gas of 50% by volume $H_2$/50% by volume $N_2$ was introduced as a supply gas between a pressure vessel and a CHA zeolite membrane composite 1 described in Production Example A1 at 200° C., the pressure was maintained at about 0.4 MPa, and the inside of a cylinder of the CHA zeolite membrane composite 1 was set at 0.098 MPa (atmospheric pressure) and dried for about 120 minutes.

Using the CHA zeolite membrane composite 1, an ammonia separation test was performed by the above-described method under the conditions where the temperature of the CHA zeolite membrane composite 1 was 100° C., 150° C., 200° C., and 250° C. As the mixed gas, a mixed gas of 12.0% by volume $NH_3$/51.0% by volume $N_2$/37.0% by volume $H_2$ was used. Table 3 shows the ammonia concentration in the obtained permeated gas, the ammonia/hydrogen ($NH_3/H_2$) permeance ratio, and the ammonia/nitrogen ($NH_3/N_2$) permeance ratio. In Table 3, the concentration of ammonia in the permeated gas is a value obtained by rounding off the first decimal place.

TABLE 3

|  | 100° C. | 150° C. | 200° C. | 250° C. |
|---|---|---|---|---|
| $NH_3$ concentration in permeated gas | 26% | 25% | 22% | 20% |
| $NH_3/N_2$ permeance ratio | 11 | 10 | 8 | 7 |
| $NH_3/H_2$ permeance ratio | 3 | 3 | 2 | 1 |

Example A2

As a result of evaluating ammonia separation by the same method as in Example A1 except that the CHA zeolite membrane composite 1 described in Production Example A1 was used, the temperature was set to 100° C., and the mixed gas was changed to a mixed gas of 3.0% by volume $NH_3$/24.0% by volume $N_2$/73.0% by volume $H_2$, the ammonia gas concentration in permeated gas was 4.1% by volume. The obtained results show that ammonia can be separated from the mixed gas.

Example A3

As a result of evaluating ammonia separation by the same method as in Example A1 except that the CHA zeolite membrane composite 1 described in Production Example A1 was used, the temperature was set to 100° C., and the mixed gas was changed to a mixed gas of 2.0% by volume $NH_3$/19.0% by volume $N_2$/79.0% by volume $H_2$, the ammonia gas concentration in permeated gas was 2.3% by volume. From the obtained results, it can be seen that ammonia can be separated from the mixed gas.

Comparative Example A1

Ammonia separation was evaluated in the same manner as in Example A1 except that the temperature of CHA zeolite membrane composite 1 described in Production Example A1 was set to 100° C. and a mixed gas of 0.7% by volume $NH_3$/80.0% by volume $N_2$/19.3% by volume $H_2$ was used. As a result, the ammonia gas concentration in the permeated gas was 0.8% by volume.

Comparative Example A2

Ammonia separation was evaluated in the same manner as in Example A1 except that the temperature of CHA zeolite membrane composite 1 described in Production Example A1 was set to 100° C. and a mixed gas of 0.8% by volume $NH_3$/20.1% by volume $N_2$/79.1% by volume $H_2$ was used. As a result, the ammonia gas concentration in the permeated gas was 0.8% by volume.

As can be seen from Examples A1, A2, A3 and Comparative Examples A1, A2, even in cases in which the same zeolite membrane composite is used, when the ammonia gas concentration in the mixed gas is low, it is difficult to separate the ammonia in the mixed gas, whereas when the ammonia gas concentration in the mixed gas is 1.0% by volume or more, ammonia can be separated efficiently.

Reference Example A1

As a result of evaluating ammonia separation by the same method as in Example A2 except that the CHA zeolite membrane composite 1 produced in Example A1 was used, the temperature of the CHA zeolite membrane composite 1 was set to 100° C., and a mixed gas of 12% by volume $NH_3$/50% by volume $N_2$/38% by volume $H_2$ was allowed to pass at a flow rate of 100 SCCM, the hydrogen permeance was $7.0 \times 10^{-8}$ [mol/(m$^2$·s·Pa)], the nitrogen permeance was $2.1 \times 10^{-8}$ [mol/(m$^2$·s·Pa)], and the ammonia permeance was $2.4 \times 10^{-7}$ [mol/(m$^2$·s·Pa)]. In contrast, the hydrogen permeance when hydrogen gas alone was allowed to pass was $1.6 \times 10^{-6}$ [mol/(m$^2$·s·Pa)] and the nitrogen permeance when nitrogen gas alone was allowed to pass was $3.0 \times 10^{-7}$ [mol/(m$^2$·s·Pa)], and from these results, it was found that when ammonia gas was contained in a supply gas, the permeance of hydrogen and nitrogen was considerably reduced. From this result, it is considered that when the ammonia gas concentration in the mixed gas is a specific amount or more, the ammonia in the supply gas was adsorbed on the zeolite and exhibited an effect of inhibiting permeation of hydrogen and nitrogen.

Production Example A2: Production of CHA Zeolite Membrane Composite 2

The CHA zeolite membrane composite 1 after removal of the template obtained in Production Example A1 was placed in a Teflon (registered trademark) inner cylinder (65 ml) containing 45 g of 1M ammonium nitrate aqueous solution. An autoclave was sealed and heated at 100° C. for 1 hour in a stationary state under a self-generated pressure.

After elapse of a predetermined time, after cooling, the CHA zeolite membrane was taken out from the aqueous solution, and washing with 100° C. ion exchanged hot water for 1 hour was repeated 3 times, followed by drying at 100° C. for 4 hours or more to obtain an $NH_4^+$-type CHA zeolite membrane composite which is a CHA zeolite membrane composite 2.

Example A4

<Evaluation of Membrane Separation Performance>

Ammonia separation evaluation was performed in the same manner as in Example A1 except that the CHA zeolite membrane composite 2 described in Production Example A2 was used in place of the CHA zeolite membrane 1 described in Production Example A1. Table 4 shows the ammonia concentration in the obtained permeated gas, the ammonia/hydrogen permeance ratio, and the ammonia/nitrogen permeance ratio. In Table 4, the concentration of ammonia in the permeated gas is a value obtained by rounding off the first decimal place. From the results in Table 4, it can be seen that when the ammonia gas concentration in the mixed gas is a specific amount or more, ammonia can be efficiently separated. It can also be seen that ammonia separation can be performed efficiently even under high temperature conditions.

TABLE 4

|  | 100° C. | 150° C. | 200° C. | 250° C. |
|---|---|---|---|---|
| $NH_3$ concentration in permeated gas | 31% | 27% | 24% | 22% |
| $NH_3/N_2$ permeance ratio | 26 | 16 | 11 | 9 |
| $NH_3/H_2$ permeance ratio | 6 | 4 | 2 | 2 |

Production Example A3: Production of RHO Zeolite Membrane Composite 1

(Raw Material Mixture for Hydrothermal Synthesis)

6.8 g of 18-crown-6-ether (manufactured by Tokyo Chemical Industry Co., Ltd.), 2.1 g of NaOH (manufactured by Kishida Chemical Co., Ltd.), and 4.2 g of $CsOH \cdot H_2O$ (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was then added dropwise to 8.9 g of Y-type (FAU) zeolite (SAR=30, CBV720 manufactured by Zeolyst International) to prepare a raw material mixture for hydrothermal synthesis. The gel composition (molar ratio) of the obtained raw material mixture for hydrothermal synthesis was $SiO_2/Al_2O_3$/NaOH/$CsOH$/$H_2O$/18-crown-6-ether=1/0.033/0.36/0.18/50/0.18.
(Support)

As a porous support, an alumina tube (outer diameter 6 mm, pore diameter 0.15 μm, manufactured by Noritake Company Limited) cut into a length of 40 mm, washed with water, and then dried was used.
(Seed Crystal Dispersion)

23 g of 18-crown-6-ether (manufactured by Tokyo Chemical Industry Co., Ltd.), 6 g of NaOH (manufactured by Kishida Chemical Co., Ltd.), and 5 g of $CsOH \cdot H_2O$ (manufactured by Mitsuwa Chemical Co., Ltd.) were dissolved in 84 g of water, and the resulting solution was stirred at 80° C. for 3 hours to obtain a crown ether-alkali aqueous solution.

Next, the above-described crown ether-alkali aqueous solution was added dropwise to 30 g of FAU zeolite (SAR=30, CBV720 manufactured by Zeolyst International), 0.6 g of RHO zeolite synthesized according to WO 2015020014 was further added as a seed crystal, and the mixture was stirred at room temperature for 2 hours to prepare a mixture. The composition (molar ratio) of this mixture was $SiO_2/Al_2O_3$/NaOH/$CsOH$/$H_2O$/18-crown-6-ether=1/0.033/0.30/0.06/10/0.18.

This mixture was aged at room temperature for 24 hours, then placed in a pressure vessel and allowed to stand still in an oven at 150° C. for 72 hours for hydrothermal synthesis. After this hydrothermal synthesis reaction, the reaction solution was cooled, and a produced crystal was recovered by filtration. The recovered crystal was dried at 100° C. for 12 hours to obtain a crystal that is RHO zeolite.

The obtained RHO zeolite was pulverized by a ball mill to produce a seed crystal dispersion. Specifically, 10 g of the above-described RHO zeolite, 300 g of φ3 mm HD Alumina Ball (manufactured by Nikkato Corporation), and 90 g of water were placed in 500 mL polyethylene bottle, and ball-milled for 6 hours to obtain a 10% by mass RHO zeolite dispersion. Water was added to the zeolite dispersion in such a manner that the RHO zeolite was 3% by mass to obtain a seed crystal dispersion.
(Production of Membrane Composite)

The seed crystal dispersion was dropped onto the support, and the seed crystal was deposited on the support by a rubbing method.

Next, the support with the seed crystal deposited thereon was immersed in the vertical direction in a Teflon (registered trademark) inner cylinder containing the raw material mixture for hydrothermal synthesis, an autoclave was sealed, and heated at 150° C. for 72 hours under a self-generated pressure.

After elapse of a predetermined time, after cooling, a support-zeolite membrane composite was taken out from an autoclave, and after washing, dried at 100° C. for 5 hours or more. After drying, the air permeation amount in an as-made state was 1.5 L/($m^2$·min). Next, in order to remove a template, the obtained membrane composite was fired at 300 degrees to obtain an RHO zeolite membrane composite. The weight of the RHO zeolite crystallized on the support determined from the difference between the weight of the zeolite membrane composite and the weight of the support after firing was 78 g/$m^2$.

Next, the RHO zeolite membrane composite after removal of the template was placed into a Teflon (registered trademark) inner cylinder (65 ml) containing 45 g of a 3M ammonium nitrate aqueous solution, and an autoclave was sealed and heated at 110° C. for 1 hour in a stationary state under a self-generated pressure.

After elapse of a predetermined time, after cooling, the RHO zeolite membrane was taken out from the aqueous solution, washed with water, and then dried at 100° C. for 4 hours or more to obtain an $NH_4^+$-type RHO zeolite membrane composite.

In order to convert the obtained $NH_4^+$-type RHO zeolite membrane composite into $H^+$-type, this RHO zeolite membrane composite was fired in an electric furnace at 400° C. for 2 hours. At this time, the temperature rise rate and the temperature drop rate up to 150° C. were both set at 2.5° C./min, and the temperature rise rate and the temperature drop rate from 150° C. to 400° C. were set to 0.5° C./min to obtain an H+-type RHO zeolite membrane composite which is an RHO zeolite membrane composite 1.

Example A5

<Evaluation of Membrane Separation Performance>

Using the RHO zeolite membrane composite 1 described in Production Example A3, an ammonia separation test from a mixed gas of ammonia/hydrogen/nitrogen was performed as described above, using the apparatus shown in FIG. 1.

In a pre-treatment, a mixed gas of 50% by volume $H_2$/50% by volume $N_2$ was introduced as a supply gas between a pressure vessel and an RHO zeolite membrane composite 1 at 250° C., the pressure was maintained at about 0.3 MPa, and the inside of a cylinder of the RHO zeolite membrane composite 1 was set at 0.098 MPa (atmospheric pressure) and dried for about 120 minutes.

A mixed gas of 12% by volume $NH_3$/51% by volume $N_2$/37% by volume $H_2$ was then allowed to pass at 100 SCCM, and the back pressure was set to 0.4 MPa. At this time, the differential pressure between the supply gas side and the permeated gas side of the RHO zeolite membrane composite 1 was 0.3 MPa.

The mixed gas was allowed to pass while changing the temperature of the RHO zeolite membrane composite 1 to 150° C., 250° C., and 300° C., and the ammonia concentration in the obtained permeated gas and the permeance ratio of ammonia/hydrogen and ammonia/nitrogen were calculated. The results obtained are shown in Table 5. In Table 5, the concentration of ammonia in the permeated gas is a value obtained by rounding off the first decimal place. The ammonia permeance at 250° C. was $1.0 \times 10^{-8}$ [mol/($m^2 \cdot s \cdot Pa$)]. From the results in Table 5, it can be seen that when the ammonia gas concentration in the mixed gas is a specific amount or more, ammonia can be efficiently separated. It was also confirmed that ammonia could be separated with high selectivity without any gaps or defects between zeolite particles under high temperature conditions.

TABLE 5

| | 150° C. | 250° C. | 300° C. |
|---|---|---|---|
| $NH_3$ concentration in permeated gas | 52% | 54% | 52% |
| $NH_3/N_2$ permeance ratio | 20 | 25 | 24 |
| $NH_3/H_2$ permeance ratio | 5 | 6 | 5 |

Production Example A4: Production of RHO Zeolite Membrane Composite 2

An $NH_4^+$-type RHO zeolite membrane composite was obtained in the same manner as in Production Example A3 except that a support with a seed crystal deposited thereon was immersed in the vertical direction in a Teflon (registered trademark) inner cylinder containing a raw material mixture for hydrothermal synthesis 2, an autoclave was sealed, and heated at 150° C. for 72 hours under a self-generated pressure, and that conversion from $NH_4^+$-type to H+-type was not performed.

The $NH_4^+$-type RHO zeolite membrane composite after removal of the template was then placed into a Teflon (registered trademark) inner cylinder (65 ml) containing 45 g of a 1M aluminum nitrate aqueous solution. An autoclave was sealed and heated at 100° C. for 1 hour in a stationary state under a self-generated pressure.

After elapse of a predetermined time, after cooling, the RHO zeolite membrane composite was taken out from the aqueous solution, washed with water, and then dried at 100° C. for 4 hours or more to obtain an Al-treated $NH_4^+$-type RHO zeolite membrane composite, and the obtained composite was again placed in a Teflon (registered trademark) inner cylinder (65 ml) containing 45 g of a 1M sodium nitrate aqueous solution. An autoclave was sealed and heated at 100° C. for 1 hour in a stationary state under a self-generated pressure.

After elapse of a predetermined time, after cooling, the RHO zeolite membrane was taken out from the aqueous solution, washed with water, and then dried at 100° C. for 4 hours or more to obtain an RHO zeolite membrane composite which is the RHO zeolite membrane composite 2, ion-exchanged to $Na^+$-type after an Al treatment.

Example A6

<Evaluation of Membrane Separation Performance>

Using the RHO zeolite membrane composite 2 described in Production Example A4, an ammonia separation test from a mixed gas of ammonia/hydrogen/nitrogen was performed using the apparatus shown in FIG. 1 in accordance with the above-described method.

In a pre-treatment, a mixed gas of 50% by volume $H_2$/50% by volume $N_2$ was introduced as a supply gas 7 between a pressure vessel 2 and a zeolite membrane composite 2 at 250° C., the pressure was maintained at about 0.3 MPa, and the inside of a cylinder of the RHO zeolite membrane composite 2 was set at 0.098 MPa (atmospheric pressure) and dried for about 120 minutes.

A mixed gas of 12% by volume $NH_3$/51% by volume $N_2$/37% by volume $H_2$ was then allowed to pass at 100 SCCM, and the back pressure was set to 0.4 MPa. At this time, the differential pressure between the supply gas 7 side and the permeated gas 8 side of the zeolite membrane composite 2 was 0.3 MPa.

The mixed gas was then allowed to pass while changing the temperature of the RHO zeolite membrane composite 2 to 100° C. and 250° C., and the ammonia concentration in the obtained permeated gas and the permeance ratio of ammonia/hydrogen and ammonia/nitrogen were calculated. The results obtained are shown in Table 6. In Table 6, the concentration of ammonia in the permeated gas is a value obtained by rounding off the first decimal place. From the results in Table 6, it can be seen that when the ammonia gas concentration in the mixed gas is a specific amount or more, ammonia can be efficiently separated. It was also confirmed that the RHO zeolite membrane composite was able to separate ammonia with high selectivity under high temperature conditions. The ammonia permeance at 250° C. was $2.0 \times 10^{-8}$ [mol/($m^2 \cdot s \cdot Pa$)].

TABLE 6

| | 100° C. | 250° C. |
|---|---|---|
| $NH_3$ concentration in permeated gas | 60% | 56% |
| $NH_3/N_2$ permeance ratio | 29 | 31 |
| $NH_3/H_2$ permeance ratio | 7 | 6 |

Production Example A5: Production of RHO Zeolite Membrane Composite 3, 4

A seed crystal and a support were prepared in the same manner as in Production Example A4 except that water was added in such a manner that RHO zeolite was 1% by mass to obtain a seed crystal dispersion, and a support whose inside was evacuated was immersed in this seed crystal dispersion for 1 minute, and then the seed crystal was deposited on the support by a rubbing method with the inside of the support evacuated.

Next, the support on which the seed crystal was deposited was immersed in a Teflon (registered trademark) inner cylinder containing a raw material mixture for hydrothermal synthesis produced by the same method as in Production Example A4 in the vertical direction to seal an autoclave, and heated at 160° C. for 24 hours under a self-generated pressure.

After elapse of a predetermined time, after cooling, a support-zeolite membrane composite was taken out from an autoclave, and after washing, dried at 100° C. for 5 hours or more. After drying, the air permeation amount in an as-made state was 0.0 L/(m²·min). Next, in order to remove a template, the obtained membrane composite was fired to obtain an RHO zeolite membrane composite. The weight of the RHO zeolite crystallized on the support determined from the difference between the weight of the zeolite membrane composite and the weight of the support after firing was 62 g/m².

Next, the RHO zeolite membrane composite after removal of the template was placed into a Teflon (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour.

Treatment with 1M ammonium nitrate aqueous solution was then repeated 5 times, followed by drying at 100° C. for 4 hours or more to obtain an $NH_4^+$-type RHO zeolite membrane composite as an RHO zeolite membrane composite 3.

The $NH_4^+$-type RHO zeolite membrane composite 3 obtained was placed into a Teflon (registered trademark) inner cylinder (65 ml) containing 45 g of a 1M aluminum nitrate aqueous solution, and an autoclave was sealed and heated at 100° C. for 1 hour in a stationary state under a self-generated pressure.

After elapse of a predetermined time, after cooling, the RHO zeolite membrane composite 3 was taken out from the aqueous solution, washed with water, and then dried at 100° C. for 4 hours or more to obtain an Al-treated $NH_4^+$-type RHO zeolite membrane composite which is an RHO zeolite membrane composite 4.

Example A7

<Evaluation of Membrane Separation Performance>

Using the RHO zeolite membrane composite 4 described in Production Example A5, an ammonia separation test from a mixed gas of ammonia ($NH_3$)/hydrogen ($H_2$)/nitrogen ($N_2$) was conducted using the apparatus shown in FIG. 1.

In a pre-treatment, a mixed gas of 10% by volume $NH_3$/30% by volume $H_2$/60% by volume $N_2$ was introduced as a supply gas between a pressure vessel and the RHO zeolite membrane composite 4 at 250° C., the pressure was maintained at about 0.3 MPa, and the inside of a cylinder of the RHO zeolite membrane composite 4 was set at 0.098 MPa (atmospheric pressure) and dried for about 120 minutes. A mixed gas of 12% by volume $NH_3$/51% by volume $N_2$/37% by volume $H_2$ was then allowed to pass at 100 SCCM, and the back pressure was set to 0.4 MPa. At this time, the differential pressure between the supply gas side and the permeated gas side of the RHO zeolite membrane composite 4 was 0.3 MPa. 3.9 SCCM of argon was supplied from the supply gas 9 as a sweep gas.

The mixed gas was allowed to pass while changing the temperature of the RHO zeolite membrane composite 4 to 250° C., 300° C., and 325° C., and the ammonia concentration in the obtained permeated gas and the permeance ratio of ammonia/hydrogen and ammonia/nitrogen were shown in Table 7. In Table 7, the concentration of ammonia in the permeated gas is a value obtained by rounding off the first decimal place. From these results, it was confirmed that $NH_4^+$-type RHO zeolite membrane treated with Al under high temperature conditions was able to separate ammonia with high selectivity. The ammonia permeance at 250° C. was $1.0\times10^{-8}$ [mol/(m²·s·Pa)], and the ammonia permeance at 325° C. was $2.0\times10^{-8}$ [mol/(m²·s·Pa)]. From the results in Table 7, it can be seen that when the ammonia gas concentration in the mixed gas is a specific amount or more, ammonia can be efficiently separated. It can also be seen that ammonia separation can be performed efficiently even under high temperature conditions.

TABLE 7

|  | 250° C. | 300° C. | 325° C. |
| --- | --- | --- | --- |
| $NH_3$ concentration in permeated gas | 71% | 70% | 71% |
| $NH_3/N_2$ permeance ratio | 43 | 59 | 63 |
| $NH_3/H_2$ permeance ratio | 15 | 13 | 13 |

Production Example A6: Production of RHO Zeolite Membrane Composite 5

An $NH_4^+$-type RHO zeolite membrane composite obtained by the same method as the RHO zeolite membrane composite 3 of Production Example A5 was placed into a Teflon (registered trademark) inner cylinder (65 ml) containing 50 g of a 1M sodium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour, followed by drying at 100° C. for 4 hours or more to obtain an RHO zeolite membrane composite ion-exchanged to $Na^+$-type. Next, the $Na^+$-type RHO zeolite membrane obtained was placed into a Teflon (registered trademark) inner cylinder (65 ml) containing 50 g of a 1M aluminum nitrate aqueous solution, and an autoclave was sealed and heated at 100° C. for 1 hour in a stationary state under a self-generated pressure.

After elapse of a predetermined time, after cooling, the RHO membrane was taken out from the aqueous solution, and 1 hour washing with 100° C. ion exchanged hot water was repeated 3 times, followed by drying at 100° C. for 4 hours or more to obtain an Al-treated $Na^+$-type RHO zeolite membrane composite which is an RHO zeolite membrane composite 5.

Example A8

<Evaluation of Membrane Separation Performance>

A separation test of a mixed gas of 12.0% by volume $NH_3$/51.0% by volume $N_2$/37.0% by volume $H_2$ was conducted in the same manner as in Example A7 except that the RHO zeolite membrane composite 5 described in Production Example A6 was used in place of the RHO zeolite membrane composite 4 described in Production Example A5, and that argon was supplied in an amount of 8.3 SCCM as a sweep gas.

The ammonia concentration in the obtained permeated gas and the permeance ratio of ammonia/hydrogen and ammonia/nitrogen were shown in Table 8. In Table 8, the concentration of ammonia in the permeated gas is a value obtained by rounding off the first decimal place. The ammonia permeance at 250° C. was $4.4 \times 10^{-8}$ [mol/(m$^2$·s·Pa)], and the ammonia permeance at 325° C. was $1.1 \times 10^{-7}$ [mol/(m$^2$·s·Pa)]. From these results, it can be seen that when the ammonia gas concentration in the mixed gas is a specific amount or more, ammonia can be efficiently separated. It was also confirmed that ammonia could be separated with high selectivity even under high temperature conditions.

TABLE 8

|  | 250° C. | 300° C. | 325° C. |
| --- | --- | --- | --- |
| NH$_3$ concentration in permeated gas | 82% | 77% | 66% |
| NH$_3$/N$_2$ permeance ratio | 259 | 237 | 230 |
| NH$_3$/H$_2$ permeance ratio | 44 | 35 | 34 |

Example A9

As a result of evaluating ammonia separation by the same method as in Example A8 except that the RHO zeolite membrane composite 5 described in Production Example A6 was used, the temperature was set to 250° C., and the mixed gas was changed to a mixed gas of 2.0% by volume NH$_3$/20.0% by volume N$_2$/78.0% by volume H$_2$, the ammonia gas concentration in permeated gas was 19.9% by volume. The obtained results show that ammonia can be separated from the mixed gas.

Example A10

As a result of evaluating ammonia separation by the same method as in Example A8 except that the RHO zeolite membrane composite 5 described in Production Example A6 was used, the temperature was set to 250° C., and the mixed gas was changed to a mixed gas of 3.0% by volume NH$_3$/20.0% by volume N$_2$/77.0% by volume H$_2$, the ammonia gas concentration in permeated Etas was 27.6% by volume. From the obtained results, it can be seen that ammonia can be separated from the mixed gas.

Production Example A7: Production of RHO Zeolite Membrane Composite 6

(Mixture for Hydrothermal Synthesis)
The following raw material mixture for hydrothermal synthesis was prepared.

6.8 g of 18-crown-6-ether (manufactured by Tokyo Chemical Industry Co., Ltd.), 2.1 g of NaOH (manufactured by Kishida Chemical Co., Ltd.), and 4.2 g of CsOH·H$_2$O (manufactured by Mitsuwa Chemical Co., Ltd.) 6.8 a of 18-crown-6-ether (manufactured by Tokyo Chemical Industry Co., Ltd.), 2.1 g of NaOH (manufactured by Kishida Chemical Co., Ltd.), and 4.2 g of CsOH·H$_2$O (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was then added dropwise to 8.9 g of Y-type (FAU) zeolite (SAR=30, CBV720 manufactured by Zeolyst International) and 0.2 g of aluminum hydroxide (Al$_2$O$_3$, 53.5% by mass, manufactured by Aldrich Co., Ltd.) to prepare a raw material mixture for hydrothermal synthesis. The gel composition (molar ratio) of the obtained raw material mixture for hydrothermal synthesis was SiO$_2$/Al$_2$O$_3$/NaOH/CsOH/H$_2$O/18-crown-6-ether=1/0.04010.36/0.18150/0.18.

(Production of Membrane Composite)
A seed crystal and a support were prepared in the same manner as in Production Example A4 except that water was added in such a manner that RHO zeolite was 1% by mass to obtain a seed crystal dispersion, and a support whose inside was evacuated was immersed in this seed crystal dispersion for 1 minute, and then the seed crystal was deposited on the support by a rubbing method with the inside of the support evacuated.

Next, the support on which the seed crystal was deposited was immersed in a Teflon (registered trademark) inner cylinder containing a raw material mixture for hydrothermal synthesis in the vertical direction to seal an autoclave, and heated at 160° C. for 24 hours under a self-generated pressure.

After elapse of a predetermined time, after cooling, a support-zeolite membrane composite was taken out from an autoclave, and after washing, dried at 100° C. for 5 hours or more. After drying, the air permeation amount in an as-made state was 0.0 L/(m$^2$·min). Next, in order to remove a template, the obtained membrane composite was fired to obtain an RHO zeolite membrane composite. The weight of the RHO zeolite crystallized on the support determined from the difference between the weight of the zeolite membrane composite and the weight of the support after firing was 56 g/m$^2$.

Next, the RHO zeolite membrane composite after removal of the template was placed into a Teflon (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour.

Next, treatment with 1M ammonium nitrate aqueous solution was then repeated 5 times, followed by drying at 100° C. for 4 hours or more to obtain an NH$_4$$^+$-type RHO zeolite membrane composite.

The NH$_4$$^+$-type RHO zeolite membrane composite was placed into a Teflon (registered trademark) inner cylinder (65 ml) containing 50 g of a 1M aluminum nitrate aqueous solution. An autoclave was sealed and heated at 100° C. for 1 hour in a stationary state under a self-generated pressure.

After elapse of a predetermined time, after cooling, the RHO membrane was taken out from the aqueous solution, washed with water, and then dried at 100° C. for 4 hours or more to obtain an Al-treated NH$_4$$^+$-type RHO zeolite membrane composite which is an RHO zeolite membrane composite 6.

Example A11

<Evaluation of Membrane Separation Performance>
A separation test of a mixed gas of 12% by volume NH$_3$/51% by volume N$_2$/37% by volume H$_2$ was conducted under the conditions where the temperature of the RHO zeolite membrane composite 6 was 250° C. and 325° C. in the same manner as in Example A7 except that the RHO zeolite membrane composite 6 described in Production Example A7 was used in place of the RHO zeolite membrane composite 4 described in Production Example A5.

The ammonia concentration in the obtained permeated gas and the permeance ratio of ammonia/hydrogen and ammonia/nitrogen were shown in Table 9. In Table 9, the concentration of ammonia in the permeated gas is a value obtained by rounding off the first decimal place. From these results, it can be seen that when the ammonia gas concentration in the mixed gas is a specific amount or more, ammonia can be efficiently separated. It was also confirmed that an RHO membrane produced using a gel composition with an increased Al content could separate ammonia with higher selectivity even under high temperature conditions. The ammonia permeance at 250° C. was $1.3 \times 10^{-8}$ [mol/(m²·s·Pa)], and the ammonia permeance at 325° C. was $2.8 \times 10^{-8}$ [mol/(m²·s·Pa)].

|  | 250° C. | 325° C. |
|---|---|---|
| NH₃ concentration in permeated gas | 85% | 81% |
| NH₃/N₂ permeance ratio | 408 | 368 |
| NH₃/H₂ permeance ratio | 132 | 69 |

Production Example A8: Production of MFI Zeolite Membrane Composite 1

(Raw Material Mixture for Hydrothermal Synthesis)

A raw material mixture for hydrothermal synthesis was prepared by the following method.

To a mixture of 13.65 g of a 50% by weight NaOH aqueous solution and 101 g of water, 0.15 g of sodium aluminate (containing $Al_2O_3$—62.2% by mass) was added and stirred at room temperature for 10 minutes. To this, 32.3 g of colloidal silica (Snowtech-40, manufactured by Nissan Chemical Co., Ltd.) was added and stirred for 5 hours at 50 degrees to obtain a raw material mixture for hydrothermal reaction. The composition (molar ratio) of this raw material mixture for hydrothermal reaction was $SiO_2/Al_2O_3/NaOH/H_2O$=3.0510.013/0.193/100, $SiO_2/Al_2O_3$=239.

(Seed Crystal Dispersion)

ZSM5 zeolite (manufactured by Tosoh Corporation, HSZ-800 series 822H0A) was ground in a mortar, and the seed crystal was dispersed in such a manner that the concentration thereof was about 0.4% by mass to prepare a seed crystal dispersion.

(Production of Membrane Composite)

After immersing a porous support subjected to the same treatment as in Production Example A1 in the above-described seed crystal dispersion for 1 minute, the support was dried at 70° C. for 1 hour, again immersed in a seed crystal dispersion for 1 minute, and then dried at 70° C. for 1 hour to deposit the seed crystal on the support. The mass of the deposited seed crystal was about 0.0016 g. A porous support having a seed crystal deposited thereon was prepared by the above-described method.

Three supports with the seed crystal deposited thereon were each immersed in the vertical direction in the above-described Teflon (registered trademark) inner cylinder (200 ml) containing the above-described raw material mixture for hydrothermal synthesis, an autoclave was sealed, and heated at 180° C. for 30 hours in a stationary state under a self-generated pressure. After elapse of a predetermined time, after cooling, the support-zeolite membrane composite was taken out from the reaction mixture, washed, and dried at 100° C. for 3 hours to obtain an MFI zeolite membrane composite 1. The mass of MFI zeolite crystallized on the support was from 0.26 to 0.28 g. The air permeation amount of the membrane composite after firing was from 0.0 to 0.1 cm³/min.

Example A12

<Evaluation of Membrane Separation Performance>

Ammonia separation evaluation was performed in the same manner as in Example A1 except that the MFI zeolite membrane composite 1 described in Production Example A8 was used in place of the CHA zeolite membrane composite 1 described in Production Example A1. Table 10 shows the ammonia concentration in the obtained permeated gas, the ammonia/hydrogen permeance ratio, and the ammonia/nitrogen permeance ratio. In Table 10, the concentration of ammonia in the permeated gas is a value obtained by rounding off the first decimal place. The permeance of ammonia at 250° C. was $7.5 \times 10^{-8}$ [mol/(m²·s·Pa)]. From these results, it can be seen that when the ammonia gas concentration in the mixed gas is a specific amount or more, ammonia can be efficiently separated. It was also confirmed that even when the temperature was changed from 150° C. to 250° C., ammonia permeated through the membrane with high selectivity. It was therefore confirmed that ammonia could be separated with high selectivity even under high temperature conditions.

TABLE 10

|  | 100° C. | 150° C. | 200° C. | 250° C. |
|---|---|---|---|---|
| NH₃ concentration in permeated gas | 46% | 44% | 46% | 45% |
| NH₃/N₂ permeance ratio | 18 | 18 | 23 | 23 |
| NH₃/H₂ permeance ratio | 5 | 4 | 5 | 5 |

Example A13

As a result of evaluating ammonia separation by the same method as in Example A12 except that the temperature was set to 250° C., and the mixed gas was changed to a mixed gas of 2.0% by volume $NH_3$/20.0% by volume $N_2$/78.0% by volume $H_2$, the ammonia gas concentration in permeated gas was 7.0% by volume. The obtained results show that ammonia can be separated from the mixed gas.

Example A14

As a result of evaluating ammonia separation by the same method as in Example A12 except that the temperature was set to 250° C., and the mixed gas was changed to a mixed gas of 3.0% by volume $NH_3$/20.0% by volume $N_2$/77.0% by volume $H_2$, the ammonia gas concentration in permeated gas was 10.7% by volume. The obtained results show that ammonia can be separated from the mixed gas.

Reference Example A2

As a result of evaluating ammonia separation by the same method as in Example A12 except that the MFI zeolite membrane composite 1 produced in Production Example A8 was used, the temperature of the MFI zeolite membrane composite 1 was set to 250° C., and a mixed gas of 12% by volume $NH_3$/50% by volume $N_2$/38% by volume $H_2$ was allowed to pass at a flow rate of 100 SCCM, the hydrogen permeance was $1.6 \times 10^{-8}$ [mol/(m²·s·Pa)], the nitrogen permeance was $3.3 \times 10^{-9}$ [mol/(m²·s·Pa)], and the ammonia permeance was $7.5 \times 10^{-8}$ [mol/(m²·s·Pa)]. In contrast, the hydrogen permeance when hydrogen gas alone was allowed to pass was $4.7 \times 10^{-7}$ [mol/(m²·s·Pa)] and the nitrogen permeance when nitrogen gas alone was allowed to pass was $3.0 \times 10^{-7}$ [mol/(m²·s·Pa)], and from these results, it was found that when ammonia gas was contained in a supply gas, the permeance of hydrogen and nitrogen was considerably reduced. From this result, it is considered that when the ammonia gas concentration in the mixed gas is a specific amount or more, the ammonia in the supply gas was adsorbed on the zeolite and exhibited an effect of inhibiting permeation of hydrogen and nitrogen.

Table 11 shows data of Examples A1 to A3, A8 to 10, A12 to 14, and Comparative Examples A1 to A2. The evaluation results at 100° C. for Examples A1 to A3 and Comparative Examples A1 and A2 and at 250° C. for Examples A8 to 10 and A12 to 14 are shown. From these results, it was found that the concentration degree of ammonia with respect to hydrogen and nitrogen increases when the concentration of ammonia gas in a mixed gas is not less than a specific amount.

Scanning axis: θ/2θ
Scanning range (2θ): 5.0-70.0°
Measurement mode: Continuous
Read width: 0.010
Counting time: 57.0 sec (0.3 sec×190ch)
Automatic variable slit (Automatic-DS): 1 mm (irradiation width)

The measurement data was subjected to variable→fixed slit correction.

X-rays were irradiated in a direction perpendicular to the axial direction of a cylindrical tube. In order to avoid noise or the like as much as possible, X-rays were set to be mainly irradiated along not a line in contact with the surface of a sample stage, but the other line above the surface of the sample stage, of two lines where a cylindrical tubular membrane composite on the sample stage and planes parallel to the surface of the sample stage were in contact with.

The irradiation width was measured with an automatic variable slit fixed at 1 mm, and variable slit→fixed slit conversion was performed using XRD analysis software JADE+9.4 (English version), created by Materials Data, Inc. to obtain an XRD pattern.

TABLE 11

| Membrane | Membrane type | Raw material gas concentration (vol %) | | | Membrane permeated gas concentration (vol %) | | | Concentration degree (membrane permeated gas/raw material gas) | | | $NH_3$ concentration degree/$H_2$ concentration degree |
|---|---|---|---|---|---|---|---|---|---|---|---|
| | | $H_2$ | $N_2$ | $NH_3$ | $H_2$ | $N_2$ | $NH_3$ | $H_2$ | $N_2$ | $NH_3$ | |
| Example A1 | CHA | 37.0 | 51.0 | 12.0 | 51.8 | 28.0 | 26.4 | 1.40 | 0.55 | 2.20 | 1.6 |
| Example A2 | CHA | 73.0 | 24.0 | 3.0 | 80.1 | 15.8 | 4.1 | 1.10 | 0.66 | 1.36 | 1.2 |
| Example A3 | CHA | 79.0 | 19.0 | 2.0 | 83.4 | 14.3 | 2.3 | 1.06 | 0.75 | 1.16 | 1.1 |
| Example A8 | RHO | 37.0 | 51.0 | 12.0 | 14.5 | 3.3 | 82.2 | 0.39 | 0.06 | 6.85 | 17.5 |
| Example A9 | RHO | 78.0 | 20.0 | 2.0 | 76.7 | 3.4 | 19.9 | 0.98 | 0.17 | 9.97 | 10.1 |
| Example A10 | RHO | 77.0 | 20.0 | 3.0 | 69.3 | 3.0 | 27.6 | 0.90 | 0.15 | 9.21 | 10.2 |
| Example A12 | MR | 37.0 | 51.0 | 12.0 | 42.6 | 12.6 | 44.8 | 1.15 | 0.25 | 3.73 | 3.2 |
| Example A13 | MFI | 78.0 | 20.0 | 2.0 | 73.3 | 19.7 | 7.0 | 0.94 | 0.98 | 3.52 | 3.7 |
| Example A14 | MEI | 77.0 | 20.0 | 3.0 | 70.8 | 18.5 | 10.7 | 0.92 | 0.92 | 3.56 | 3.9 |
| Comparative Example A1 | CHA | 19.3 | 80.0 | 0.7 | 23.4 | 74.3 | 0.8 | 1.21 | 0.93 | 1.14 | 0.9 |
| Comparative Example A2 | CHA | 79.1 | 20.1 | 0.8 | 82.1 | 17.1 | 0.8 | 1.04 | 0.85 | 1.05 | 1.0 |

Example B

[Measurement of Physical Properties and Separation Performance]

In the following, the physical properties and separation performance of zeolite or a zeolite membrane composite were measured as follows.

(1) X-Ray Diffraction (XRD) Measurement

XRD measurement was carried out based on the following conditions.

Apparatus name: New D8 ADVANCE manufactured by Bruker Corporation
Optical system: Bragg-Brentano optical system
Optical system specifications Incident side: Enclosed
  X-ray tube (CuKα)
  Soller Slit (2.5°)
  Divergence Slit (Variable Slit)
Sample stage: XYZ stage
Light-receiving side: Semiconductor array detector (Lynx Eye 1D mode)
  Ni-filter
    Soller Slit (2.5°)
Goniometer radius: 280 mm
Measurement conditions X-ray output (CuKα): 40 kV, 40 mA (2) XPS Measurement (Na, Si, Al, N)

XPS measurement was carried out based on the following conditions.

Model name: Quantum 2000 manufactured by ULVAC-PHI, Incorporated
X-ray source for measurement: Monochromatic Al-Kα, output 16 kV-34 W
  (X-ray generation area 170 ump)
Charge neutralization: electron gun 5 μA, ion gun 3V
Spectroscopic system: Path energy
Wide spectrum: 187.70 eV
Narrow spectrum (N1s, O1s, Na1s, Al2p, Si2p, Cs3d5): 58.70 eV
  When Cs was detected, the peak position of Cs3d5 and Al2p overlapped, and therefore, the peak of Al2s was used instead of Al2p. (It was confirmed that there was no difference in the analytical value of the surface composition using either Al2p or Al2s using a sample containing no Cs.)
Measurement area: 300 μm square
Extraction angle: 45° (from surface)
Energy correction; Si2p=103.4 eV Quantification was performed using a sensitivity correction coefficient provided by ULVAC-PHI, Incorporated, and the background for quantitative calculation was determined by the Shirley method.

(3) Air Permeation Amount

One end of the zeolite membrane composite was sealed, the other end was connected to 5 kPa vacuum line in a sealed state, and the air flow rate was measured with a mass flow meter installed between the vacuum line and the zeolite membrane composite, to obtain an air permeation amount [L/(m²·h)]. 8300 made by KOFLOC, Corp., for $N_2$ gas, maximum flow rate 500 ml/min (in terms of 20° C., 1 atm) was used as the mass flow meter. When the display of the mass flow meter was 10 ml/min (in terms of 20° C., 1 atm) or less in 8300 manufactured by KOFLOC, Corp., measurement was carried out using MM-2100M manufactured by Lintec Corporation, for Air gas, and a maximum flow rate of 20 ml/min (in terms of 0° C., 1 atm).

In FIG. 1, a cylindrical zeolite membrane composite 1 is installed in a thermostat (not shown) in a state of being stored in a pressure vessel 2 made of stainless steel. The thermostat is provided with a temperature control device in such a manner that the temperature of a supply gas can be adjusted.

One end of the cylindrical zeolite membrane composite 1 is sealed with an end pin 3 having a T-shaped cross section. The other end of the zeolite membrane composite 1 is connected to a discharge pipe 10 for permeated gas 8 through a connection portion 4, and a pipe 10 extends to the outside of the pressure vessel 2. Further, a pressure gauge 5 for measuring the supply pressure of a supply gas 7 from a supply pipe 12 and a back pressure valve 6 for adjusting the supply pressure are connected to a gas discharge pipe 13 from the pressure vessel 2. Each connection portion is connected with favorable airtightness.

In the apparatus of FIG. 1, when performing a single component gas permeation test, the supply gas (sample gas) 7 was supplied between the pressure vessel 2 and the zeolite membrane composite 1 at a constant flow rate, the pressure on the supply side was made constant by the back pressure valve 6, and the permeated gas 8 that had passed through the zeolite membrane composite 1 was measured with a flow meter connected to the pipe 10.

One end of the cylindrical zeolite membrane composite 1 is sealed with an end pin 3 having a T-shaped cross section. The other end of the zeolite membrane composite 1 is connected to a discharge pipe 11 for permeated gas 8 through a connection portion 4, and a pipe 11 extends to the outside of the pressure vessel 2. A pressure gauge 5 for measuring the pressure on the supply side of the supply gas 7 is connected to a supply pipe 12 for the supply gas (sample gas) 7 to the pressure vessel 2. Each connection portion is connected with favorable airtightness.

(4) Ammonia Separation Test

In the apparatus schematically shown in FIG. 1, an ammonia separation test was performed as follows. In the apparatus of FIG. 1, a mixed gas containing ammonia, nitrogen, and hydrogen as a supply gas was supplied between the pressure vessel and the zeolite membrane composite at a flow rate of 100 SCCM, the back pressure valve was adjusted in such a manner that the pressure difference between gas on the supply side and gas that had passed through the membrane was constant at 0.3 MPa, helium whose flow rate was controlled by a mass flow controller was mixed with exhaust gas discharged from the pipe 10 as a standard substance, analysis was performed with a micro gas chromatograph, and the concentration and flow rate of permeated gas were calculated.

In the ammonia separation test, in order to remove components such as moisture and air from the pressure vessel, for drying and exhausting at or higher than a measurement temperature, after purging with a sample gas to be used, the sample gas temperature and the pressure difference between the supply gas side and the permeated gas side of a zeolite membrane composite were made constant, and after the permeate gas flow rate was stabilized, the flow rate of the sample gas (permeated gas) permeated through the zeolite membrane composite was measured, and the gas permeance [mol/(m²·s·Pa)] was calculated. As the pressure for calculating the permeance, the pressure difference (differential pressure) between the supply side and the permeation side of a supply gas was used. In the case of a mixed gas, a partial pressure difference was used.

Based on the measurement result, the ideal separation factor α' was calculated by the following formula (1).

$$\alpha' = (Q1/Q2)/(P1/P2) \qquad (1)$$

[In the formula (1), Q1 and Q2 indicate the permeation amounts $[mol \cdot (m^2 \cdot s)^{-1}]$ of a highly permeable gas and a low permeable gas, respectively, and P1 and P2 indicate the pressure differences [Pa] between the supply side and the permeation side of the highly permeable gas and the low permeable gas, respectively.]

This coefficient, indicating the ratio between the gas permeances, can be determined as the ratio obtained by calculating the permeance of each gas.

Production Example B1: Production of RHO Zeolite Membrane Composite 1, 2

RHO zeolite membrane composites 1 and 2 were produced by the following method. Prior to the production of the RHO zeolite membrane composites 1 and 2, a raw material mixture for hydrothermal synthesis 1, a support, and a seed crystal dispersion 1 were prepared as follows.
(Raw Material Mixture for Hydrothermal Synthesis 1)

6.8 g of 18-crown-6-ether (manufactured by Tokyo Chemical Industry Co., Ltd.), 2.1 g of NaOH (manufactured by Kishida Chemical Co., Ltd.), and 4.2 g of CsOH·$H_2O$ (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was added dropwise to 8.9 g of Y (FAU) zeolite (SAR=30, CBV720, manufactured by Zeolyst International) to prepare a raw material mixture for hydrothermal synthesis. The gel composition (molar ratio) of the obtained raw material mixture for hydrothermal synthesis 1 was $SiO_2/Al_2O_3$/NaOH/CsOH/$H_2O$/18-crown-6-ether=1/0.033/0.36/0.18/50/0.18.
(Support)

As a porous support, an alumina tube (outer diameter 6 mm, inner diameter 4 mm, pore diameter 0.15 μm, manufactured by Noritake Company Limited) cut into a length of 80 mm, washed with water, and then dried was used.
(Seed Crystal Dispersion 1)

23 g of 18-crown-6-ether (manufactured by Tokyo Chemical Industry Co., Ltd.), 6 g of NaOH (manufactured by Kishida Chemical Co., Ltd.), and 5 g of CsOH·$H_2O$ (manufactured by Mitsuwa Chemical Co., Ltd.) were dissolved in 84 g of water, and the resulting solution was stirred at 80° C. for 3 hours to obtain a crown ether-alkali aqueous solution.

Next, the above-described crown ether-alkali aqueous solution was added dropwise to 30 g of FAU zeolite (SAR=30, CBV720 manufactured by Zeolyst International), 0.6 g of RHO zeolite synthesized according to WO 2015020014 was further added as a seed crystal, and the mixture was stirred at room temperature for 2 hours to prepare a mixture. The composition (molar ratio) of this mixture was $SiO_2/Al_2O_3/NaOH/CsOH/H_2O/18$-crown-6-ether=1/0.033/0.30/0.06/10/0.18.

The mixture was aged at room temperature for 24 hours, then placed in a pressure vessel and allowed to stand still in an oven at 150° C. for 72 hours for hydrothermal synthesis. After this hydrothermal synthesis reaction, the reaction solution was cooled, and a produced crystal was recovered by filtration. The recovered crystal was dried at 100° C. for 12 hours to obtain a crystal that is RHO zeolite.

The obtained RHO zeolite was pulverized by a ball mill to produce a seed crystal dispersion. Specifically, 10 g of the above-described RHO zeolite, 300 g of p 3 mm HD Alumina Ball (manufactured by Nikkato Corporation), and 90 g of water were placed in 500 mL polyethylene bottle, and ball-milled for 6 hours to obtain a 10% by mass RHO zeolite dispersion. Water was added to the zeolite dispersion in such a manner that the RHO zeolite was 1% by mass to obtain a seed crystal dispersion 1.

(Production of Zeolite Membrane Composite)

Next, a support whose inside was evacuated was immersed in this seed crystal dispersion 1 for 1 minute, and then the seed crystal was deposited on the support by a rubbing method with the inside of the support evacuated.

The support with the seed crystal deposited thereon was immersed in the vertical direction in a Teflon (registered trademark) inner cylinder containing the raw material mixture for hydrothermal synthesis, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0 L/(m²·min). Next, in order to remove a template, the obtained membrane composite was fired to obtain an RHO zeolite membrane composite. The RHO zeolite membrane composite was heated from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours. The weight of the RHO zeolite crystallized on the support determined from the difference between the weight of the zeolite membrane composite and the weight of the support after firing was 62 g/m².

Next, the RHO zeolite membrane composite after removal of the template was placed into a Teflon container (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour.

Treatment with 1M ammonium nitrate aqueous solution was then repeated 5 times, followed by drying at 100° C. for 4 hours or more to obtain an $NH_4^+$-type RHO zeolite membrane composite as an RHO zeolite membrane composite 1.

The $NH_4^+$-type RHO zeolite membrane composite 1 obtained was placed into a Teflon container (registered trademark) inner cylinder (65 ml) containing 45 g of a 1M aluminum nitrate aqueous solution, and an autoclave was sealed and heated at 100° C. for 1 hour in a stationary state under a self-generated pressure.

After elapse of a predetermined time, after cooling, the $NH_4^+$-type RHO zeolite membrane composite 1 subjected to the above-described treatment was taken out from the aqueous solution, washed with ion exchanged water, and then dried at 100° C. for 4 hours or more to obtain an Al-treated $NH_4^+$-type RHO zeolite membrane composite which is an RHO zeolite membrane composite 2. As a result of measuring the zeolite membrane of the zeolite membrane composite by XPS, the nitrogen atom/Al atom molar ratio of the zeolite membrane was 0.42, and the Si atom/Al atom molar ratio was 3.01.

Example B1

<Evaluation of Membrane Separation Performance>

Using the RHO zeolite membrane composite 2 described in Production Example B1, an ammonia separation test from a mixed gas of ammonia gas ($NH_3$)/hydrogen gas ($H_2$)/nitrogen gas ($N_2$) was specifically conducted in accordance with the following method using the apparatus shown in FIG. 1.

In a pre-treatment, a mixed gas of 10% by volume $NH_3$/30% by volume $H_2$/60% by volume $N_2$ was introduced as a supply gas between a pressure vessel and the RHO zeolite membrane composite 2 at 250° C., the pressure was maintained at about 0.3 MPa, and the inside of a cylinder of the RHO zeolite membrane composite 2 was set at 0.098 MPa (atmospheric pressure) and dried for about 120 minutes.

A mixed gas of 12% by volume $NH_3$/51% by volume $N_2$/37% by volume $H_2$ was then allowed to pass as a supply gas at 100 SCCM, and the back pressure was set to 0.4 MPa. At this time, the differential pressure between the supply gas side and the permeated gas side of the RHO zeolite membrane composite 2 was 0.3 MPa. 3.9 SCCM of argon was supplied from the supply gas 9 as a sweep gas.

The mixed gas was allowed to pass while changing the temperature of the RHO zeolite membrane composite 2 to 250° C., 300° C., and 325° C., and the ammonia concentration in the obtained permeated gas and the permeance ratio of ammonia/hydrogen and ammonia/nitrogen were shown in Table 12. From the results of Table 12, it can be seen that ammonia can be efficiently separated by using an $NH_4^+$-type RHO zeolite membrane having a nitrogen atom/Al atom molar ratio of 0.42 in XPS measurement. It was confirmed that the $NH_4^+$-type RHO zeolite membrane having a nitrogen atom/Al atom molar ratio of 0.42 in XPS measurement can separate ammonia with high selectivity under a high temperature condition. The ammonia permeance at 250° C. was $1.0 \times 10^{-8}$ [mol/(m²·s·Pa)], and the ammonia permeance at 325° C. was $2.0 \times 10^{-8}$ [mol/(m²·s·Pa)].

TABLE 12

| | 250° C. | 300° C. | 325° C. |
|---|---|---|---|
| $NH_3$ concentration in permeated gas | 71% | 70% | 71% |
| $NH_3/N_2$ permeance ratio | 43 | 59 | 63 |
| $NH_3/H_2$ permeance ratio | 15 | 13 | 13 |

Production Example B2: Production of RHO Zeolite Membrane Composite 3

An RHO zeolite membrane composite 3 was produced by the following method. The support used was the same support as in Production Example B1, and the seed crystal dispersion used was the same as the seed crystal dispersion 1 in Production Example B1.
(Mixture for Hydrothermal Synthesis 2)

The following raw material mixture for hydrothermal synthesis 2 was prepared. 6.8 g of 18-crown-6-ether (manufactured by Tokyo Chemical Industry Co., Ltd.), 2.1 g of NaOH (manufactured by Kishida Chemical Co., Ltd.), and 4.2 g of CsOH·H$_2$O (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was then added dropwise to 8.9 g of Y-type (FAU) zeolite (SAR=30, CBV720 manufactured by Zeolyst International) and 0.2 g of aluminum hydroxide (Al$_2$O$_3$, 53.5% by mass, manufactured by Aldrich Co., Ltd.) to prepare a raw material mixture for hydrothermal synthesis. The gel composition (molar ratio) of the obtained raw material mixture for hydrothermal synthesis 2 was SiO$_2$/Al$_2$O$_3$/NaOH/CsOH/H$_2$O/18-crown-6-ether=1/0.040/0.36/0.18/50/0.18.

(Production of Membrane Composite)

A support whose inside was evacuated was immersed in this seed crystal dispersion 1 for 1 minute, and then the seed crystal was deposited on the support by a rubbing method with the inside of the support evacuated.

Next, the support with the seed crystal deposited thereon was immersed in the vertical direction in a Teflon (registered trademark) inner cylinder containing the raw material mixture for hydrothermal synthesis 2, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0 L/(m$^2$·min). Next, in order to remove a template, the obtained membrane composite was fired to obtain an RHO zeolite membrane composite. The RHO zeolite membrane composite was heated from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours. The weight of the RHO zeolite crystallized on the support determined from the difference between the weight of the zeolite membrane composite and the weight of the support after firing was 56 g/m$^2$.

Next, the RHO zeolite membrane composite after removal of the template was placed into a Teflon container (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour.

Next, treatment with 1M ammonium nitrate aqueous solution was repeated 5 times, followed by drying at 100° C. for 4 hours or more to obtain an NH$_4^+$-type RHO zeolite membrane composite.

The NH$_4^+$-type RHO zeolite membrane composite 1 was placed into a Teflon container (registered trademark) inner cylinder (65 ml) containing 50 g of a 1M aluminum nitrate aqueous solution. An autoclave was sealed and heated at 100° C. for 1 hour in a stationary state under a self-generated pressure.

After elapse of a predetermined time, after cooling, the NH$_4^+$-type RHO zeolite membrane composite subjected to the above-described treatment was taken out from the aqueous solution, washed with ion exchanged water, and then dried at 100° C. for 4 hours or more to obtain an Al-treated NH$_4^+$-type RHO zeolite membrane composite which was the RHO zeolite membrane composite 3. The nitrogen atom/Al atom molar ratio of the zeolite membrane measured by XPS was 0.76, and the Si atom/Al atom molar ratio was 6.65.

Example B2

<Evaluation of Membrane Separation Performance>

A separation test of a mixed gas of 12% by volume NH$_3$/51% by volume N$_2$/37% by volume H$_2$ was conducted under the conditions of 250° C. and 325° C. in the same manner as in Example B1 except that the RHO zeolite membrane composite 3 described in Production Example B2 was used in place of the RHO zeolite membrane composite 2 described in Production Example B1, and that the supply amount of argon which was a sweep gas was changed to 8.3 SCCM.

The ammonia concentration in the obtained permeated gas and the permeance ratio of ammonia/hydrogen and ammonia/nitrogen were shown in Table 13. From the results of Table 13, it can be seen that by using this NH$_4^+$-type RHO zeolite membrane having a nitrogen atom/Al atom molar ratio of 0.76 as measured by XPS, ammonia can be separated efficiently. It was also confirmed that an RHO membrane produced using a gel composition with an increased Al atom content could separate ammonia with higher selectivity even under high temperature conditions. The ammonia permeance at 250° C. was 1.3×10$^{-8}$ [mol/(m$^2$·s·Pa)], and the ammonia permeance at 325° C. was 2.8×10$^{-8}$ [mol/(m$^2$·s·Pa)].

TABLE 13

|  | 250° C. | 325° C. |
| --- | --- | --- |
| NH$_3$ concentration in permeated gas | 85% | 81% |
| NH$_3$/N$_2$ permeance ratio | 408 | 368 |
| NH$_3$/H$_2$ permeance ratio | 132 | 69 |

Production Example B3: Production of RHO Zeolite Membrane Composite 4

An RHO zeolite membrane composite 4 was produced by the following method. A raw material mixture for hydrothermal synthesis and a support were the same as the raw material mixture for hydrothermal synthesis 1 and the support of Production Example B1, respectively.
(Seed Crystal Dispersion 2)

A seed crystal dispersion 2 was produced in the same manner as the seed crystal dispersion 1 in Production Example B1 except that water was added in such a manner that the RHO type zeolite was 3% by mass after producing 10% by mass RHO zeolite dispersion.
(Production of Membrane Composite)

The seed crystal dispersion 2 was dropped onto the support, and the seed crystal was deposited on the support by a rubbing method.

Next, the support with the seed crystal deposited thereon was immersed in the vertical direction in a Teflon (registered trademark) inner cylinder containing the raw material mixture for hydrothermal synthesis 1, an autoclave was sealed, and heated at 150° C. for 72 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 1.5/(m²·min). Next, in order to remove a template, the obtained membrane composite was fired to obtain an RHO zeolite membrane composite. The RHO zeolite membrane composite was heated from room temperature to 150° C. in 2 hours, and from 150° C. to 400° C. in 20 hours, and after firing at 400° C. for 5 hours, the membrane composite was cooled to 150° C. in 20 hours, and from 150° C. to room temperature in 2 hours. The weight of the RHO zeolite crystallized on the support determined from the difference between the weight of the zeolite membrane composite and the weight of the support after firing was 78 g/m².

Next, the RHO zeolite membrane composite after removal of the template was placed into a Teflon container (registered trademark) inner cylinder (65 ml) containing 45 g of a 3M ammonium nitrate aqueous solution, and an autoclave was sealed and heated at 110° C. for 1 hour in a stationary state under a self-generated pressure.

After elapse of a predetermined time, after cooling, the RHO membrane was taken out from the aqueous solution, washed with ion-exchanged water, and then dried at 100° C. for 4 hours or more to obtain an $NH_4^+$-type RHO zeolite membrane composite.

In order to convert the obtained $NH_4^+$-type RHO zeolite membrane composite into $H^+$-type, this RHO zeolite membrane composite was fired in an electric furnace at 400° C. for 2 hours. At this time, the temperature rise rate and the temperature drop rate up to 150° C. were both set at 2.5° C./min, and the temperature rise rate and the temperature drop rate from 150° C. to 400° C. were set to 0.5° C./min to obtain an $H^+$-type RHO zeolite membrane composite which is an RHO zeolite membrane composite 4. The nitrogen atom/Al atom molar ratio of the zeolite membrane measured by XPS was 0.23, and the Si atom/Al atom molar ratio was 2.92.

Example B3

<Evaluation of Membrane Separation Performance>

Using the RHO zeolite membrane composite 4 described in Production Example B3, an ammonia separation test from a mixed gas of ammonia/hydrogen/nitrogen was performed using the apparatus shown in FIG. 1.

In a pre-treatment, a mixed gas of 50% by volume $H_2$/50% by volume $N_2$ was introduced as a supply gas between a pressure vessel and an RHO zeolite membrane composite 4 at 250° C., the pressure was maintained at about 0.3 MPa, and the inside of a cylinder of the RHO zeolite membrane composite 4 was set at 0.098 MPa (atmospheric pressure) and dried for about 120 minutes.

A mixed gas of 12% by volume $NH_3$/51% by volume $N_2$/37% by volume $H_2$ was then allowed to pass at 100 SCCM, and the back pressure was set to 0.4 MPa. At this time, the differential pressure between the supply gas side and the permeated gas side of the RHO zeolite membrane composite 4 was 0.3 MPa. 2.4 SCCM of argon was supplied from the supply gas 9 as a sweep gas.

The mixed gas was allowed to pass while changing the temperature of the RHO zeolite membrane composite 4 to 150° C., 250° C., and 300° C., and the ammonia concentration in the obtained permeated gas and the permeance ratio of ammonia/hydrogen and ammonia/nitrogen were calculated. The results obtained are shown in Table 14. From this result, it was confirmed that although the ammonia separation performance of this $H^+$-type RHO zeolite membrane composite having a nitrogen atom/Al atom molar ratio of 0.23 as measured by XPS slightly decreased compared with the separation results of $NH_4^+$-type RHO zeolite membrane composites of Examples B1 and 2, the separation performance was still high. The ammonia permeance at 250° C. was $1.0\times10^{-8}$ [mol/(m²·s·Pa)].

TABLE 14

|  | 150° C. | 250° C. | 300° C. |
|---|---|---|---|
| $NH_3$ concentration in permeated gas | 52% | 54% | 52% |
| 5$NH_3/N_2$ permeance ratio | 20 | 25 | 24 |
| $NH_3/H_2$ permeance ratio | 5 | 6 | 5 |

Production Example B4: Production of RHO Zeolite Membrane Composite 5

The RHO zeolite membrane composite 5 was produced by the following method. As the raw material mixture for hydrothermal synthesis, the same mixture as the raw material mixture for hydrothermal synthesis 2 of Production Example B2 was used, and the same support and seed crystal dispersion as the support and seed crystal dispersion 1 of Production Example B1, respectively were used.

(Production of Membrane Composite)

A support whose inside was evacuated was immersed in this seed crystal dispersion 1 for 1 minute, and then the seed crystal was deposited on the support by a rubbing method with the inside of the support evacuated.

Next, the support with the seed crystal deposited thereon was immersed in the vertical direction in a Teflon (registered trademark) inner cylinder containing the raw material mixture for hydrothermal synthesis 2, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0 L/(m²·min). Next, in order to remove a template, the obtained membrane composite was fired by heating from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours to obtain an $Cs^+$-type RHO zeolite membrane composite 5. This RHO zeolite membrane composite 5 did not use any raw material containing nitrogen atoms in the preparation step, and the content thereof was less than 0.01 in terms of the molar ratio of nitrogen atoms to Al atoms. The weight of the RHO zeolite crystallized on the support determined from the difference between the weight of the zeolite membrane composite and the weight of the support after firing was 58 g/m².

Reference Example B1

<Evaluation of Membrane Separation Performance>

Using the RHO zeolite membrane composite 5 described in Production Example B4, an ammonia separation test from a mixed gas of ammonia/hydrogen/nitrogen was performed using the apparatus shown in FIG. 1 in accordance with the above-described method.

In a pre-treatment, a mixed gas of 10% by volume $NH_3$/30% by volume $H_2$/60% by volume $N_2$ was introduced as a supply gas between a pressure vessel and an RHO zeolite membrane composite 5 at 250° C., the pressure was maintained at about 0.3 MPa, and the inside of a cylinder of the RHO zeolite membrane composite 2 was set at 0.098 MPa (atmospheric pressure) and dried for about 120 minutes.

A mixed gas of 12% by volume $NH_3$/51% by volume $N_2$/37% by volume $H_2$ was then allowed to pass at 100 SCCM, and the back pressure was set to 0.4 MPa. At this time, the differential pressure between the supply gas side and the permeated gas side of the RHO zeolite membrane composite 5 was 0.3 MPa. 3.9 SCCM of argon was supplied from the supply gas 9 as a sweep gas.

The mixed gas was allowed to pass while changing the temperature of the RHO zeolite membrane composite 5 to 250° C. and 300° C., and the ammonia concentration in the obtained permeated gas and the permeance ratio of ammonia/hydrogen and ammonia/nitrogen were shown in Table 15. The ammonia permeance at 250° C. was $1.9 \times 10^{-8}$ [mol/(m²·s·Pa)], and the ammonia permeance at 300° C. was $2.0 \times 10^{-8}$ [mol/(m²·s·Pa)]. From the results of Table 15, it was found that this $Cs^+$-type RHO zeolite membrane essentially free of nitrogen atoms had a lower ammonia separation ability than the RHO zeolite membrane of any of Examples B1 to 3 containing a specific amount of nitrogen atoms with respect to Al atoms determined by X-ray photoelectron spectroscopy, and had a tendency that the separation performance greatly deteriorated when the temperature was further raised. Accordingly, from this result, it was found that, when a zeolite membrane containing a specific amount of nitrogen atoms with respect to Al atoms determined by X-ray photoelectron spectroscopy was used, the affinity between the membrane and ammonia was increased, the ammonia was preferentially permeated, and high stability with respect to temperature can be achieved.

TABLE 15

|  | 250° C. | 300° C. |
| --- | --- | --- |
| $NH_3$ concentration in permeated gas | 49% | 42% |
| $NH_3/N_2$ permeance ratio | 30 | 22 |
| $NH_3/H_2$ permeance ratio | 7 | 5 |

Example C

[Measurement of Physical Properties and Separation Performance]

In the following, the physical properties and separation performance of zeolite or a zeolite membrane composite were measured in the same manner as in Example B.

Production Example C1: Production of RHO Zeolite Membrane Composite 1, 2

RHO zeolite membrane composites 1 and 2 were produced by the following method. Prior to the production of the RHO zeolite membrane composites 1 and 2, a raw material mixture for hydrothermal synthesis 1, a support, and a seed crystal dispersion 1 were prepared as follows.

(Raw Material Mixture for Hydrothermal Synthesis 1)

6.8 g of 18-crown-6-ether (manufactured by Tokyo Chemical Industry Co., Ltd.), 2.1 g of NaOH (manufactured by Kishida Chemical Co., Ltd.), and 4.2 g of CsOH·$H_2O$ (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was added dropwise to 8.9 g of Y (FAU) zeolite (SAR=30, CBV720, manufactured by Zeolyst International) to prepare a raw material mixture for hydrothermal synthesis. The gel composition (molar ratio) of the obtained raw material mixture for hydrothermal synthesis 1 was $SiO_2/Al_2O_3$/NaOH/CsOH/$H_2O$/18-crown-6-ether=1/0.033/0.36/0.18/50/0.18.

(Support)

As a porous support, an alumina tube (outer diameter 6 mm, inner diameter 4 mm, pore diameter 0.15 μm, manufactured by Noritake Company Limited) cut into a length of 80 mm, washed with water, and then dried was used.

(Seed Crystal Dispersion 1)

23 g of 18-crown-6-ether (manufactured by Tokyo Chemical Industry Co., Ltd.), 6 g of NaOH (manufactured by Kishida Chemical Co., Ltd.), and 5 g of CsOH·$H_2O$ (manufactured by Mitsuwa Chemical Co., Ltd.) were dissolved in 84 g of water, and the resulting solution was stirred at 80° C. for 3 hours to obtain a crown ether-alkali aqueous solution.

Next, the above-described crown ether-alkali aqueous solution was added dropwise to 30 g of FAU zeolite (SAR=30, CBV720 manufactured by Zeolyst International), 0.6 g of RHO zeolite synthesized according to WO 2015020014 was further added as a seed crystal, and the mixture was stirred at room temperature for 2 hours to prepare a mixture. The composition (molar ratio) of this mixture was $SiO_2/Al_2O_3$/NaOH/CsOH/$H_2O$/18-crown-6-ether=1/0.033/0.30/0.06/10/0.18.

The mixture was aged at room temperature for 24 hours, then placed in a pressure vessel and allowed to stand still in an oven at 150° C. for 72 hours for hydrothermal synthesis. After this hydrothermal synthesis reaction, the reaction solution was cooled, and a produced crystal was recovered by filtration. The recovered crystal was dried at 100° C. for 12 hours to obtain a crystal that is RHO zeolite.

The obtained RHO zeolite was pulverized by a ball mill to produce a seed crystal dispersion. Specifically, 10 g of the above-described RHO zeolite, 300 g of φ3 mm HD Alumina Ball (manufactured by Nikkato Corporation), and 90 g of water were placed in 500 mL polyethylene bottle, and ball-milled for 6 hours to obtain a 10% by mass RHO zeolite dispersion. Water was added to the zeolite dispersion in such a manner that the RHO zeolite was 1% by mass to obtain a seed crystal dispersion 1.

(Production of Zeolite Membrane Composite)

Next, a support whose inside was evacuated was immersed in this seed crystal dispersion 1 for 1 minute, and then the seed crystal was deposited on the support by a rubbing method with the inside of the support evacuated.

The support with the seed crystal deposited thereon was immersed in the vertical direction in a Teflon (registered trademark) inner cylinder containing the raw material mixture for hydrothermal synthesis, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0/L(m²·min).

Next, in order to remove a template, the obtained membrane composite was fired to obtain an RHO zeolite membrane composite. The RHO zeolite membrane composite was heated from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours. The weight of the RHO zeolite crystallized on the support determined from the difference between the weight of the zeolite membrane composite and the weight of the support after firing was 62 g/m².

Next, the RHO zeolite membrane composite after removal of the template was placed into a Teflon container (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour.

Treatment with 1M ammonium nitrate aqueous solution was then repeated 5 times, followed by drying at 100° C. for 4 hours or more to obtain an $NH_4^+$-type RHO zeolite membrane composite as an RHO zeolite membrane composite 1.

The $NH_4^+$-type RHO zeolite membrane composite 1 obtained was placed into a Teflon container (registered trademark) inner cylinder (65 ml) containing 45 g of a 1M aluminum nitrate aqueous solution, and an autoclave was sealed and heated at 100° C. for 1 hour in a stationary state under a self-generated pressure.

After elapse of a predetermined time, after cooling, the $NH_4^+$-type RHO zeolite membrane composite 1 subjected to the above-described treatment was taken out from the aqueous solution, washed with ion exchanged water, and then dried at 100° C. for 4 hours or more to obtain an Al-treated $NH_4^+$-type RHO zeolite membrane composite which is an RHO zeolite membrane composite 2. The nitrogen atom/Al atom molar ratio of the zeolite membrane measured by XPS was 0.42, and the Si atom/Al atom molar ratio was 3.01.

Example C1

<Evaluation of Membrane Separation Performance>

Using the RHO zeolite membrane composite 2 described in Production Example C1, an ammonia separation test from a mixed gas of ammonia/hydrogen/nitrogen was specifically conducted in accordance with the following method using the apparatus shown in FIG. 1.

In a pre-treatment, a mixed gas of 10% by volume $NH_3$/30% by volume 112/60% by volume $N_2$ was introduced as a supply gas between a pressure vessel and the RHO zeolite membrane composite 2 at 250° C., the pressure was maintained at about 0.3 MPa, and the inside of a cylinder of the RHO zeolite membrane composite 2 was set at 0.098 MPa (atmospheric pressure) and dried for about 120 minutes.

A mixed gas of 12% by volume $NH_3$/51% by volume $N_2$/37% by volume $H_2$ was then allowed to pass as a supply gas at 100 SCCM, and the back pressure was set to 0.4 MPa. At this time, the differential pressure between the supply gas side and the permeated gas side of the RHO zeolite membrane composite 2 was 0.3 MPa. 3.9 SCCM of argon was supplied from the supply gas 9 as a sweep gas.

The mixed gas was allowed to pass while changing the temperature of the RHO zeolite membrane composite 2 to 250° C., 300° C., and 325° C., and the ammonia concentration in the obtained permeated gas and the permeance ratio of ammonia/hydrogen and ammonia/nitrogen were shown in Table 16. The ammonia permeance at 250° C. was $1.0 \times 10^{-8}$ [mol/(m²·s·Pa)], and the ammonia permeance at 325° C. was $2.0 \times 10^{-8}$ [mol/(m²·s·Pa)]. From the results of Table 16, it can be seen that ammonia can be efficiently separated by using an $NH_4^+$-type RHO zeolite membrane having a Si atom/Al atom molar ratio of 3.01 in XPS measurement. It was found that, in the case of this $NH_4^+$-type RHO zeolite membrane having a Si atom/Al atom molar ratio of 3.01 as measured by XPS, when the ammonia concentrations of the obtained permeated gas at 250° C. and 325° C. were compared, the change rate was almost 0%, and this zeolite membrane was a separation membrane having excellent separation heat stability.

TABLE 16

|  | 250° C. | 300° C. | 325° C. |
| --- | --- | --- | --- |
| $NH_3$ concentration in permeated gas | 71% | 70% | 71% |
| $NH_3/N_2$ permeance ratio | 43 | 59 | 63 |
| $NH_3/H_2$ permeance ratio | 15 | 13 | 13 |

Production Example C2: Production of RHO Zeolite Membrane Composite 3

An RHO zeolite membrane composite 3 was produced by the following method. The support used was the same support as in Production Example C1, and the seed crystal dispersion used was the same as the seed crystal dispersion 1 in Production Example C1.

(Mixture for Hydrothermal Synthesis 2)

The following raw material mixture for hydrothermal synthesis 2 was prepared. 6.8 g of 18-crown-6-ether (manufactured by Tokyo Chemical Industry Co., Ltd.), 2.1 g of NaOH (manufactured by Kishida Chemical Co., Ltd.), and 4.2 g of $CsOH \cdot H_2O$ (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was then added dropwise to 8.9 g of Y-type (FAU) zeolite (SAR=30, CBV720 manufactured by Zeolyst International) and 0.2 g of aluminum hydroxide ($Al_2O_3$, 53.5% by mass, manufactured by Aldrich Co., Ltd.) to prepare a raw material mixture for hydrothermal synthesis. The gel composition (molar ratio) of the obtained raw material mixture for hydrothermal synthesis 2 was $SiO_2/Al_2O_3$/NaOH/CsOH/$H_2O$/18-crown-6-ether=1/0.040/0.36/0.18/50/0.18.

(Production of Membrane Composite)

A seed crystal dispersion 1 and a support were prepared by the same method as in Production Example C1, and the support whose inside was evacuated was immersed in this seed crystal dispersion 1 for 1 minute, and then the seed crystal was deposited on the support by a rubbing method with the inside of the support evacuated.

Next, the support with the seed crystal deposited thereon was immersed in the vertical direction in a Teflon (registered trademark) inner cylinder containing the raw material mixture for hydrothermal synthesis, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0/L(m²·min). Next, in order to remove a template, the obtained membrane composite was fired to obtain an RHO zeolite membrane composite. The RHO zeolite membrane composite was heated from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours. The weight of the RHO zeolite crystallized on the support determined from the difference between the weight of the zeolite membrane composite and the weight of the support after firing was 56 g/m².

Next, the RHO zeolite membrane composite after removal of the template was placed into a Teflon container (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour.

Next, treatment with 1M ammonium nitrate aqueous solution was repeated 5 times, followed by drying at 100° C. for 4 hours or more to obtain an $NH_4^+$-type RHO zeolite membrane composite.

The $NH_4^+$-type RHO zeolite membrane composite 1 was placed into a Teflon container (registered trademark) inner cylinder (65 ml) containing 50 g of a 1M aluminum nitrate aqueous solution. An autoclave was sealed and heated at 100° C. for 1 hour in a stationary state under a self-generated pressure.

After elapse of a predetermined time, after cooling, the RHO type membrane was taken out from the aqueous solution, washed with ion exchanged water, and then dried at 100° C. for 4 hours or more to obtain an Al-treated $NH_4^+$-type RHO zeolite membrane composite which was an RHO zeolite membrane composite 3. The nitrogen atom/Al atom molar ratio of the zeolite membrane measured by XPS was 0.76, and the Si atom/Al atom molar ratio was 6.65.

Example C2

<Evaluation of Membrane Separation Performance>

A separation test of a mixed gas of 12% by volume $NH_3$/51% by volume $N_2$/37% by volume $H_2$ was conducted under the conditions of 250° C. and 325° C. in the same manner as in Example C1 except that the RHO zeolite membrane composite 3 described in Production Example C2 was used in place of the RHO zeolite membrane composite 2 described in Production Example C1, and that 8.3 SCCM of argon was supplied as a sweep gas.

The ammonia concentration in the obtained permeated gas and the permeance ratio of ammonia/hydrogen and ammonia/nitrogen were shown in Table 17. The ammonia permeance at 250° C. was $1.3 \times 10^{-8}$ [mol/(m²·s·Pa)], and the ammonia permeance at 325° C. was $2.8 \times 10^{-8}$ [mol/(m²·s·Pa)]. From the results of Table 17, it can be seen that, by using this $NH_4^+$-type RHO zeolite membrane having a Si atom/Al atom molar ratio of 6.65, ammonia can be separated efficiently. It was found that, in the case of this $NH_4^+$-type RHO zeolite membrane having a Si atom/Al atom molar ratio of 6.65 as measured by XPS, when the ammonia concentrations of the obtained permeated gas at 250° C. and 325° C. were compared, the change rate was about 5%, and this zeolite membrane was a separation membrane having excellent separation heat stability.

TABLE 17

|  | 250° C. | 325° C. |
|---|---|---|
| $NH_3$ concentration in permeated gas | 85% | 81% |
| $NH_3/N_2$ permeance ratio | 408 | 368 |
| $NH_3/H_2$ permeance ratio | 132 | 69 |

Production Example C3: Production of RHO Zeolite Membrane Composite 4

An RHO zeolite membrane composite 4 was produced by the following method.

An $NH_4^+$-type RHO zeolite membrane composite obtained by the same method as the RHO zeolite membrane composite 1 of Production Example C1 was placed in a Teflon container (registered trademark) inner cylinder (65 ml) containing 50 g of 1M sodium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour, followed by drying at 100° C. for 4 hours or more to obtain an RHO zeolite membrane composite ion-exchanged to $Na^+$-type. Next, the $Na^+$-type RHO zeolite membrane obtained was placed into a Teflon container (registered trademark) inner cylinder (65 ml) containing 50 g of a 1M aluminum nitrate aqueous solution, and an autoclave was sealed and heated at 100° C. for 1 hour in a stationary state under a self-generated pressure.

After elapse of a predetermined time, after cooling, the RHO type membrane was taken out from the aqueous solution, washed with ion exchanged water, and then dried at 100° C. for 4 hours or more to obtain an Al-treated $Na^+$-type RHO zeolite membrane composite which was an RHO zeolite membrane composite 4. The zeolite membrane had an Na/Al atom molar ratio of 0.05, an N atom/Al atom molar ratio of 1.21, and a Si atom/Al atom molar ratio of 7.46, as measured by XPS.

Example C3

<Evaluation of Membrane Separation Performance>

Using the RHO zeolite membrane composite 4 described in Production Example C3, an ammonia separation test from a mixed gas of ammonia/hydrogen/nitrogen was performed by the above-described method using the apparatus shown in FIG. 1.

In a pre-treatment, a mixed gas of 10% by volume $NH_3$/30% by volume $H_2$/60% by volume $N_2$ was introduced as a supply gas between a pressure vessel and an RHO zeolite membrane composite 4 under a condition of 250° C., the pressure was maintained at about 0.3 MPa, and the inside of a cylinder of the RHO zeolite membrane composite 4 was set at 0.098 MPa (atmospheric pressure) and dried for about 120 minutes.

A mixed gas of 12% by volume $NH_3$/51% by volume $N_2$/37% by volume $H_2$ was then allowed to pass at 100 SCCM, and the back pressure was set to 0.4 MPa. At this time, the differential pressure between the supply gas side and the permeated gas side of the RHO zeolite membrane composite was 0.3 MPa. 8.3 SCCM of argon was supplied from the supply gas 9 as a sweep gas.

The concentration of ammonia in the permeated gas and the permeance ratio of ammonia/hydrogen and ammonia/ nitrogen A are shown in Table 18. The ammonia permeance at 250° C. was $4.4\times10^{-8}$ [mol/(m$^2$·s·Pa)], and the ammonia permeance at 325° C. was $1.1\times10^{-7}$ [mol/(m$^2$·s·Pa)]. From the results of Table 18, it can be seen that ammonia can be efficiently separated by using an Na$^+$-type RHO zeolite membrane having a Si atom/Al atom molar ratio of 7.46 in XPS measurement. It was found that, in the case of this Na$^+$-type RHO zeolite membrane having a Si atom/Al atom molar ratio of 7.46 as measured by XPS, when the ammonia concentrations of the obtained permeated gas at 250° C. and 325° C. were compared, the change rate was about 20%, and this zeolite membrane was a separation membrane having slightly inferior separation heat stability, but yet exhibits high separation heat stability.

TABLE 18

|  | 250° C. | 300° C. | 325° C. |
|---|---|---|---|
| NH$_3$ concentration in permeated gas | 82% | 77% | 66% |
| NH$_3$/N$_2$ permeance ratio | 259 | 237 | 230 |
| NH$_3$/H$_2$ permeance ratio | 44 | 35 | 34 |

Production Example C4: Production of RHO Zeolite Membrane Composite 5

The RHO zeolite membrane composite 5 was produced by the following method. A mixture for hydrothermal synthesis was the same as the raw material mixture for hydrothermal synthesis 1 of Production Example C1, and a seed crystal dispersion was the same as the seed crystal dispersion 1.

(Support)

As a porous support, an alumina tube (outer diameter 6 mm, inner diameter 4 mm, pore diameter 0.15 μm, manufactured by Noritake Company Limited) cut into a length of 40 mm, washed with water, and then dried was used.

(Production of Membrane Composite)

A support whose inside was evacuated was immersed in this seed crystal dispersion 1 for 1 minute, and then the seed crystal was deposited on the support by a rubbing method with the inside of the support evacuated.

Next, the support with the seed crystal deposited thereon was immersed in the vertical direction in a Teflon (registered trademark) inner cylinder containing the raw material mixture for hydrothermal synthesis 1, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0/L(m$^2$·min). Next, in order to remove a template, the obtained membrane composite was fired to obtain an RHO zeolite membrane F composite. This RHO zeolite membrane composite was heated from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours. The weight of the RHO zeolite crystallized on the support determined from the difference between the weight of the zeolite membrane composite and the weight of the support after firing was 52 g/m$^2$.

Next, the RHO zeolite membrane composite after removal of the template was placed into a Teflon container (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour.

Next, treatment with 1M ammonium nitrate aqueous solution was repeated 5 times, followed by drying at 100° C. for 4 hours or more to obtain an NH$_4^+$-type RHO zeolite membrane composite as an RHO zeolite membrane composite 5.

Reference Example C1

<Evaluation of Membrane Separation Performance>

Using the RHO zeolite membrane composite 5 described in Production Example C4, an ammonia separation test from a mixed gas of ammonia (NH$_3$)/hydrogen (H$_2$)/nitrogen (N$_2$) was performed using the apparatus shown in FIG. 1 in accordance with the above-described method.

In a pre-treatment, a mixed gas of 10% by volume NH$_3$/30% by volume H$_2$/60% by volume N$_2$ was introduced as a supply gas between a pressure vessel and an RHO zeolite membrane composite 5 under a condition of 250° C., the pressure was maintained at about 0.3 MPa, and the inside of a cylinder of the RHO zeolite membrane composite 5 was set at 0.098 MPa (atmospheric pressure) and dried for about 120 minutes.

A mixed gas of 12% by volume NH$_3$/51% by volume N$_2$/37% by volume H$_2$ was then allowed to pass at 100 SCCM, and the back pressure was set to 0.4 MPa. At this time, the differential pressure between the supply gas side and the permeated gas side of the RHO zeolite membrane composite was 0.3 MPa. 3.9 SCCM of argon was supplied from the supply gas 9 as a sweep gas.

The ammonia concentration in the obtained permeated gas and the permeance ratio of ammonia/hydrogen and ammonia/nitrogen were shown in Table 19. From this result, it was found that the separation performance of the NH$_4^+$-type RHO zeolite membrane not treated with Al is lower than that of the NH$_4^+$-type RHO zeolite membrane treated with Al. In other words, it was found from this result that a zeolite membrane for highly selective separation of ammonia from a mixed gas composed of a plurality of components including ammonia and hydrogen and/or nitrogen can be designed by appropriately controlling the Al atoms with respect to the Si atoms in the zeolite membrane by treating the NH$_4^+$-type RHO zeolite membrane with Al.

The ammonia permeance at 250° C. was $3.0\times10^{-8}$ [mol/(m$^2$·s·Pa)], and the ammonia permeance at 300° C. was $2.9\times10^{-8}$ [mol/(m$^2$·s·Pa)].

TABLE 19

|  | 250° C. | 300° C. |
|---|---|---|
| NH$_3$ concentration in permeated gas | 41% | 41% |
| NH$_3$/N$_2$ permeance ratio | 15 | 18 |
| NH$_3$/H$_2$ permeance ratio | 4 | 4 |

Example D

[Measurement of Physical Properties and Separation Performance]

In the following, the physical properties and separation performance of zeolite or a zeolite membrane composite were measured in the same manner as in Example B.

Production Example D1: Production of RHO Zeolite Membrane Composite 1, 2

RHO zeolite membrane composites 1 and 2 were produced by the following method. Prior to the production of the RHO zeolite membrane composites 1 and 2, a raw material mixture for hydrothermal synthesis 1, a support, and a seed crystal dispersion 1 were prepared as follows.
(Raw Material Mixture for Hydrothermal Synthesis 1)

6.8 g of 18-crown-6-ether (manufactured by Tokyo Chemical Industry Co., Ltd.), 2.1 g of NaOH (manufactured by Kishida Chemical Co., Ltd.), and 4.2 g of CsOH·$H_2O$ (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was added dropwise to 8.9 g of Y (FAU) zeolite (SAR=30, CBV720, manufactured by Zeolyst International) to prepare a raw material mixture for hydrothermal synthesis. The gel composition (molar ratio) of the obtained raw material mixture for hydrothermal synthesis 1 was $SiO_2/Al_2O_3$/NaOH/CsOH/$H_2O$/18-crown-6-ether=1/0.033/0.36/0.18/50/0.18.
(Support)

As a porous support, an alumina tube (outer diameter 6 mm, inner diameter 4 mm, pore diameter 0.15 μm, manufactured by Noritake Company Limited) cut into a length of 80 mm, washed with water, and then dried was used.
(Seed Crystal Dispersion 1)

23 g of 18-crown-6-ether (manufactured by Tokyo Chemical Industry Co., Ltd.), 6 g of NaOH (manufactured by Kishida Chemical Co., Ltd.), and 5 g of CsOH·$H_2O$ (manufactured by Mitsuwa Chemical Co., Ltd.) were dissolved in 84 g of water, and the resulting solution was stirred at 80° C. for 3 hours to obtain a crown ether-alkali aqueous solution.

Next, the above-described crown ether-alkali aqueous solution was added dropwise to 30 g of FAU zeolite (SAR=30, CBV720 manufactured by Zeolyst International), 0.6 g of RHO zeolite synthesized according to WO 2015020014 was further added as a seed crystal, and the mixture was stirred at room temperature for 2 hours to prepare a mixture. The composition (molar ratio) of this mixture was $SiO_2/Al_2O_3$/NaOH/CsOH/$H_2O$/18-crown-6-ether=1/0.033/0.30/0.06/10/0.18.

The mixture was aged at room temperature for 24 hours, then placed in a pressure vessel and allowed to stand still in an oven at 150° C. for 72 hours for hydrothermal synthesis. After this hydrothermal synthesis reaction, the reaction solution was cooled, and a produced crystal was recovered by filtration. The recovered crystal was dried at 100° C. for 12 hours to obtain a crystal that is RHO zeolite.

The obtained RHO zeolite was pulverized by a ball mill to produce a seed crystal dispersion. Specifically, 10 g of the above-described RHO zeolite, 300 g of p 3 mm HD Alumina Ball (manufactured by Nikkato Corporation), and 90 g of water were placed in 500 mL polyethylene bottle, and ball-milled for 6 hours to obtain a 10% by mass RHO zeolite dispersion. Water was added to the zeolite dispersion in such a manner that the RHO zeolite was 1% by mass to obtain a seed crystal dispersion 1.
(Production of Zeolite Membrane Composite)

Next, a support whose inside was evacuated was immersed in this seed crystal dispersion 1 for 1 minute, and then the seed crystal was deposited on the support by a rubbing method with the inside of the support evacuated.

The support with the seed crystal deposited thereon was immersed in the vertical direction in a Teflon (registered trademark) inner cylinder containing the raw material mixture for hydrothermal synthesis, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0/L($m^2$·min). Next, in order to remove a template, the obtained membrane composite was fired to obtain an RHO zeolite membrane composite. The RHO zeolite membrane composite was heated from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours. The weight of the RHO zeolite crystallized on the support determined from the difference between the weight of the zeolite membrane composite and the weight of the support after firing was 62 g/$m^2$.

Next, the RHO zeolite membrane composite after removal of the template was placed into a Teflon container (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the above-described treatment was performed, and the RHO zeolite membrane composite subjected to the above-described treatment was taken out from the aqueous solution and washed with 100° C. ion exchange hot water for 1 hour.

Treatment with 1M ammonium nitrate aqueous solution was then repeated 5 times, followed by drying at 100° C. for 4 hours or more to obtain an $NH_4^+$-type RHO zeolite membrane composite as an RHO zeolite membrane composite 1.

The $NH_4^+$-type RHO zeolite membrane composite 1 obtained was placed into a Teflon container (registered trademark) inner cylinder (65 ml) containing 50 g of a 1M sodium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour, followed by drying at 100° C. for 4 hours or more to obtain an RHO zeolite membrane composite ion-exchanged to $Na^+$-type. Next, the $Na^+$-type RHO zeolite membrane obtained was placed into a Teflon container (registered trademark) inner cylinder (65 ml) containing 50 g of a 1M aluminum nitrate aqueous solution, and an autoclave was sealed and heated at 100° C. for 1 hour in a stationary state under a self-generated pressure.

After elapse of a predetermined time, after cooling, the RHO type membrane was taken out from the aqueous solution, washed with ion exchanged water, and then dried at 100° C. for 4 hours or more to obtain an Al-treated Na+-type RHO zeolite membrane composite which was an RHO zeolite membrane composite 2. The alkali metal/Al atom molar ratio of the zeolite membrane of the zeolite membrane composite measured by XPS was 0.05, the N atom/Al atom molar ratio was 1.21, and the Si atom/Al atom molar ratio was 7.46.

Example D1

<Evaluation of Membrane Separation Performance>

Using the RHO zeolite membrane composite 2 described in Production Example D1, an ammonia separation test from a mixed gas of ammonia/hydrogen/nitrogen was specifically conducted in accordance with the following method using the apparatus shown in FIG. 1.

In a pre-treatment, a mixed gas of 10% by volume $NH_3$/30% by volume $H_2$/60% by volume $N_2$ was introduced as a supply gas between a pressure vessel and the RHO zeolite membrane composite 2 under a condition of 250° C., the pressure was maintained at about 0.3 MPa, and the inside of a cylinder of the RHO zeolite membrane composite 2 was set at 0.098 MPa (atmospheric pressure) and dried for about 120 minutes.

A mixed gas of 12% by volume $NH_3$/51% by volume $N_2$/37% by volume $H_2$ was then allowed to pass as a supply gas at 100 SCCM, and the back pressure was set to 0.4 MPa. At this time, the differential pressure between the supply gas side and the permeated gas side of the RHO zeolite membrane composite was 0.3 MPa. 8.3 SCCM of argon was supplied from the supply gas 9 as a sweep gas.

The ammonia concentration in the obtained permeated gas and the permeance ratio of ammonia/hydrogen and ammonia/nitrogen are shown in Table 20. From the results of Table 20, it can be seen that ammonia can be efficiently separated by using an Na+-type RHO zeolite membrane. It was confirmed that the Na+-type RHO zeolite membrane treated with Al under a high temperature condition can separate ammonia with high selectivity. The ammonia permeance at 250° C. was $4.4 \times 10^{-8}$ [mol/($m^2 \cdot s \cdot Pa$)], and from the comparison with the RHO zeolite membrane composite 3 containing no alkali metal and having an equivalent N atom/Al atom molar ratio and Si atom/Al atom molar ratio of the present Reference Example D1, it was found that when an alkali metal atom was contained, an equivalent high concentration of ammonia can be recovered with high permeability.

TABLE 20

|  | 250° C. |
| --- | --- |
| $NH_3$ concentration in permeated gas | 82% |
| $NH_3/N_2$ permeance ratio | 259 |
| $NH_3/H_2$ permeance ratio | 44 |

Production Example D2: Production of RHO Zeolite Membrane Composite 3

An RHO zeolite membrane composite 3 was produced by the following method. The support used was the same support as in Production Example D1, and the seed crystal dispersion used was the same as the seed crystal dispersion 1 in Production Example D1.

(Mixture for Hydrothermal Synthesis 2)

The following raw material mixture for hydrothermal synthesis 2 was prepared.

6.8 g of 18-crown-6-ether (manufactured by Tokyo Chemical Industry Co., Ltd.), 2.1 g of NaOH (manufactured by Kishida Chemical Co., Ltd.), and 4.2 g of $CsOH \cdot H_2O$ (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was then added dropwise to 8.9 g of Y-type (FAU) zeolite (SAR=30, CBV720 manufactured by Zeolyst International) and 0.2 g of aluminum hydroxide ($Al_2O_3$, 53.5% by mass, manufactured by Aldrich Co., Ltd.) to prepare a raw material mixture for hydrothermal synthesis. The gel composition (molar ratio) of the obtained raw material mixture for hydrothermal synthesis 2 was $SiO_2/Al_2O_3/NaOH/CsOH/H_2O$/18-crown-6-ether=1/0.040/0.36/0.18/50/0.18.

(Production of Membrane Composite)

A seed crystal and a support were prepared by the same method as in Production Example D1, and the support whose inside was evacuated was immersed in this seed crystal dispersion 1 for 1 minute, and then the seed crystal was deposited on the support by a rubbing method with the inside of the support evacuated.

Next, the support with the seed crystal deposited thereon was immersed in the vertical direction in a Teflon (registered trademark) inner cylinder containing the raw material mixture for hydrothermal synthesis 2, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0/L($m^2 \cdot min$). Next, in order to remove a template, the obtained membrane composite was fired to obtain an RHO zeolite membrane composite. The RHO zeolite membrane composite was heated from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours. The weight of the RHO zeolite crystallized on the support determined from the difference between the weight of the zeolite membrane composite and the weight of the support after firing was 56 g/$m^2$.

Next, the RHO zeolite membrane composite after removal of the template was placed into a Teflon container (registered trademark) inner cylinder (65 ml) containing 50 g of a 1M ammonium nitrate aqueous solution. An autoclave was sealed and heated at 100° C. for 1 hour in a stationary state under a self-generated pressure.

After elapse of a predetermined time, after cooling, the RHO membrane was taken out from the aqueous solution and washed with 100° C. ion exchanged hot water for 1 hour.

Next, treatment with 1M ammonium nitrate aqueous solution was repeated 5 times, followed by drying at 100° C. for 4 hours or more to obtain an $NH_4^+$-type RHO zeolite membrane composite.

The $NH_4^+$-type RHO zeolite membrane composite 1 was placed into a Teflon container (registered trademark) inner cylinder (65 ml) containing 50 g of a 1M aluminum nitrate aqueous solution. An autoclave was sealed and heated at 100° C. for 1 hour in a stationary state under a self-generated pressure.

After elapse of a predetermined time, after cooling, the $NH_4^+$-type RHO zeolite membrane composite subjected to the above-described treatment was taken out from the aqueous solution, washed with ion exchanged water, and then dried at 100° C. for 4 hours or more to obtain an Al-treated $NH_4^+$-type RHO zeolite membrane composite which was an RHO zeolite membrane composite 3. The N atom/Al atom molar ratio of the zeolite membrane measured by XPS was 0.76, and the Si atom/Al atom molar ratio was 6.65. Alkali metal was not detected.

Reference Example D1

<Evaluation of Membrane Separation Performance>

A separation test of a mixed gas of 12% by volume $NH_3$/51% by volume $N_2$/37% by volume $H_2$ was conducted under the conditions where the temperature of the RHO zeolite membrane composite 3 was 250° C. in the same manner as in Example D1 except that the RHO zeolite membrane composite 3 described in Production Example D2 was used in place of the RHO zeolite membrane composite 2 described in Production Example D1.

The ammonia concentration in the obtained permeated gas and the permeance ratio of ammonia/hydrogen and ammonia/nitrogen were shown in Table 21. From the results in Table 21, it can be seen that ammonia can be efficiently separated by using an $NH_4^+$-type RHO zeolite membrane. It was also confirmed that an RHO membrane produced using a gel composition with an increased Al content could separate ammonia with higher selectivity even under high temperature conditions. However, the ammonia permeance at 250° C. was $1.3 \times 10^{-8}$ [mol/($m^2 \cdot s \cdot Pa$)], and it was found that the permeability was lower than that of the RHO zeolite membrane composite 2 containing an alkali metal.

TABLE 21

| | 250° C. |
|---|---|
| $NH_3$ concentration in permeated gas | 85% |
| $NH_3/N_2$ permeance ratio | 408 |
| $NH_3/H_2$ permeance ratio | 132 |

Production Example D3: Production of RHO Zeolite Membrane Composite 4

An RHO zeolite membrane composite 4 was produced by the following method.
(Mixture for Hydrothermal Synthesis 2)

The following raw material mixture for hydrothermal synthesis 2 was prepared. 6.8 g of 18-crown-6-ether (manufactured by Tokyo Chemical Industry Co., Ltd.), 2.1 g of NaOH (manufactured by Kishida Chemical Co., Ltd.), and 4.2 g of $CsOH \cdot H_2O$ (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was then added dropwise to 8.9 g of Y-type (FAU) zeolite (SAR=30, CBV720 manufactured by Zeolyst International) and 0.2 g of aluminum hydroxide ($Al_2O_3$, 53.5% by mass, manufactured by Aldrich Co., Ltd.) to prepare a raw material mixture for hydrothermal synthesis. The gel composition (molar ratio) of the obtained raw material mixture for hydrothermal synthesis 2 was $SiO_2/Al_2O_3$/NaOH/CsOH/$H_2O$/18-crown-6-ether=1/0.040/0.36/0.18/50/0.18.
(Production of Membrane Composite)

A seed crystal dispersion 1 and a support were prepared by the same method as in Production Example D1, and the support whose inside was evacuated was immersed in this seed crystal dispersion 1 for 1 minute, and then the seed crystal was deposited on the support by a rubbing method with the inside of the support evacuated.

Next, the support with the seed crystal deposited thereon was immersed in the vertical direction in a Teflon (registered trademark) inner cylinder containing the raw material mixture for hydrothermal synthesis 2, an autoclave was sealed, and heated at 160° C. for 24 hours under a self-generated pressure.

After elapse of a predetermined time, after cooling, a support-zeolite membrane composite was taken out from an autoclave, and after washing with ion exchanged water, dried at 100° C. for 5 hours or more. After drying, the air permeation amount in an as-made state was 0.0/L($m^2 \cdot min$). Next, in order to remove a template, the obtained membrane composite was fired by heating from room temperature to 100° C. in 2 hours, and from 100° C. to 300° C. in 20 hours, and after firing at 300° C. for 5 hours, the membrane composite was cooled to 100° C. in 20 hours, and from 100° C. to room temperature in 2 hours to obtain an $Cs^+$-type RHO zeolite membrane composite 4. As described above, since the $Cs^+$-type RHO zeolite membrane composite 4 was not subjected to an ion exchange treatment step after forming the zeolite membrane, the ion pair at an Al site of the zeolite was essentially an alkali metal (Cs and Na) cation. The weight of the RHO zeolite crystallized on the support determined from the difference between the weight of the zeolite membrane composite and the weight of the support after firing was 58 g/$m^2$. The alkali metal/Al atom molar ratio of the zeolite membrane of the zeolite membrane composite measured by XPS was 0.073.

Reference Example D2

<Evaluation of Membrane Separation Performance>

Using the RHO zeolite membrane composite 4 described in Production Example D3, an ammonia separation test from a mixed gas of ammonia/hydrogen/nitrogen was performed by the above-described method using the apparatus shown in FIG. 1.

In a pre-treatment, a mixed gas of 10% by volume $NH_3$/30% by volume $H_2$/60% by volume $N_2$ was introduced as a supply gas between a pressure vessel and an RHO zeolite membrane composite 4 at 250° C., the pressure was maintained at about 0.3 MPa, and the inside of a cylinder of the RHO zeolite membrane composite 4 was set at 0.098 MPa (atmospheric pressure) and dried for about 120 minutes.

A mixed gas of 12% by volume $NH_3$/51% by volume $N_2$/37% by volume $H_2$ was then allowed to pass at 100 SCCM, and the back pressure was set to 0.4 MPa. At this time, the differential pressure between the supply gas side and the permeated gas side of the RHO zeolite membrane composite 4 was 0.3 MPa.

Table 22 shows the ammonia concentration in the obtained permeated gas and the permeance ratio of ammonia/hydrogen and ammonia/nitrogen, by setting the temperature of the RHO zeolite membrane composite 4 to 250° C. and circulating a mixed gas. The ammonia permeance at 250° C. was $1.9 \times 10^{-8}$ [mol/($m^2 \cdot s \cdot Pa$)]. From these results, it was found that the present $Cs^+$-type RHO zeolite membrane in which the ion pair at an Al site of the zeolite essentially was an alkali metal cation because no ion exchange treatment step was performed after the formation of the zeolite membrane had a slightly lowered ammonia separation performance than the RHO zeolite membrane composites 2 and 3, although the ammonia permeability is slightly improved as compared with the RHO zeolite membrane composite 3.

Specifically, from this result, it was found that a zeolite membrane that can not only highly selectively separate ammonia from a mixed gas composed of a plurality of components including ammonia and hydrogen and/or nitrogen, but also improve the ammonia permeability can be designed by appropriately controlling the molar ratio of alkali metal atoms to Al atoms in the zeolite.

TABLE 22

|  | 250° C. |
| --- | --- |
| $NH_3$ concentration in permeated gas | 49% |
| $NH_3/N_2$ permeance ratio | 30 |
| $NH_3/H_2$ permeance ratio | 7 |

Example E

[Measurement of Physical Properties and Separation Performance]

In the following, among measurements of physical properties of zeolite or a zeolite membrane composite, XRD measurement was carried out under the same conditions as in Example B, and the separation performance and the like were measured in the same manner as in Example B.

(1) Measurement of Thermal Expansion Coefficient

The thermal expansion coefficient of zeolite was determined by a high temperature XRD measurement method under the following conditions.

(Specifications of High Temperature XRD Measurement Apparatus)

TABLE 23

| Apparatus name | | New D8 ADVANCE manufactured by Bruker Corporation |
| --- | --- | --- |
| Optical system | | Bragg-Brentano optical system |
| Optical system specifications | Incident side | Enclosed X-ray tube (CuKα) Sober Slit (2.5°) Divergence Slit (Variable Slit) |
|  | Sample stage | High-temperature sample stage HTK1200 |
|  | Light-receiving side | Semiconductor array detector (Lynx Eye) Ni-filter Soller Slit (2.5°) |
|  | Goniometer radius | 280 mm |

(Measurement Conditions)

TABLE 24

| X-ray output (CuKα) | 40 kV 40 mA |
| --- | --- |
| Scanning axis | θ/2θ |
| Scanning range (2θ) | 5.0-70.0° |
| Measurement mode | Continuous |
| Read width | 0.02° |
| Counting time | 19.2 sec (0.1 sec × 192 ch) |
| Automatic variable slit * | 6 mm (irradiation width) |

Measurement atmosphere: Air

Temperature rise condition: 20° C./min

Measurement method: XRD measurement was carried out after holding at the measurement temperature for 5 minutes.

Measurement data was subjected to fixed slit correction using a variable slit.

Calculation method of change rate of thermal expansion coefficient:

Change rate of thermal expansion coefficient=(crystal lattice constant measured at predetermined temperature)÷(crystal lattice constant measured at 30° C.)−1     (1)

Example E1

(Production of RHO Zeolite)

RHO zeolite was synthesized as follows.

23 g of 18-crown-6-ether (manufactured by Tokyo Chemical Industry Co., Ltd.), 6 g of NaOH (manufactured by Kishida Chemical Co., Ltd.), and 5 g of CsOH H₂O (manufactured by Mitsuwa Chemical Co., Ltd.) were dissolved in 84 g of water, and the obtained solution was stirred at 80° C. for 3 hours to obtain a crown ether-alkali aqueous solution.

The above-described crown ether-alkali aqueous solution was added dropwise to 30 g of FAU zeolite (SAR=30, CBV720 manufactured by Zeolyst International), and further, 0.6 g of RHO zeolite synthesized according to WO 2015020014 was added as a seed crystal and stirred at room temperature for 2 hours to prepare a raw material mixture for hydrothermal synthesis. The gel composition (molar ratio) of this mixture was as follows. $SiO_2/Al_2O_3/NaOH/CsOH/H_2O$/18-crown-6-ether=1/0.033/0.30/0.06/10/0.18.

This raw material mixture for hydrothermal synthesis was aged at room temperature for 24 hours, then placed in a pressure vessel and allowed to stand still in an oven at 150° C. for 72 hours for hydrothermal synthesis. After this hydrothermal synthesis reaction, a reaction solution was cooled, and a produced crystal was recovered by filtration. The recovered crystal was dried at 100° C. for 12 hours. As a result of measuring the thermal expansion coefficient of the obtained RHO zeolite, the change rate of the thermal expansion coefficient at 200° C. with respect to 30° C. was −1.55%, the change rate of the thermal expansion coefficient at 300° C. with respect to 30° C. was 0.02%, and the change rate of the thermal expansion coefficient at 400° C. with respect to 30° C. was −0.01%, and it was confirmed that there was almost no thermal expansion or contraction compared to the thermal expansion coefficient at 30° C.

Example E2

<Preparation of RHO Zeolite Membrane Composite 1>

A porous support-RHO zeolite membrane composite was prepared by hydrothermal synthesis of RHO zeolite directly on a porous support. As a porous support, an alumina tube (outer diameter 6 mm, pore diameter 0.15 μm, manufactured by Noritake Company Limited) cut into a length of 40 mm, washed with water, and then dried was used.

RHO zeolite synthesized by the method described in Example E1 pulverized with a ball mill was used as a seed crystal on the porous support.

Ball milling was carried out as follows. 10 g of the above-described RHO zeolite for seed crystal, 300 g of φ3 mm HD Alumina Ball (manufactured by Nikkato Corporation), and 90 g of water were placed in 500 mL polyethylene bottle, and ball-milled for 6 hours to obtain a 10% by mass RHO zeolite dispersion. Water was added to the zeolite dispersion in such a manner that the RHO zeolite was 3% by mass to obtain a seed crystal dispersion.

This seed crystal dispersion was dropped onto the support, and the seed crystal was deposited on the support by a rubbing method.

Next, the following raw material mixture for hydrothermal synthesis was prepared.

6.8 g of 18-crown-6-ether (manufactured by Tokyo Chemical Industry Co., Ltd.), 2.1 g of NaOH (manufactured by Kishida Chemical Co., Ltd.), and 4.2 g of CsOH·H$_2$O (manufactured by Mitsuwa Chemical Co., Ltd.) 6.8 g of 18-crown-6-ether (manufactured by Tokyo Chemical Industry Co., Ltd.), 2.1 g of NaOH (manufactured by Kishida Chemical Co., Ltd.), and 4.2 g of CsOH·H$_2$O (manufactured by Mitsuwa Chemical Co., Ltd.) were dissolved in 125.9 g of water and stirred at 80° C. for 3 hours to obtain a crown ether-alkali aqueous solution. The above-described crown ether-alkali aqueous solution was then added dropwise to 8.9 g of Y-type (FAU) zeolite (SAR=30, CBV720 manufactured by Zeolyst International) to prepare a raw material mixture for hydrothermal synthesis. The gel composition (molar ratio) of the obtained raw material mixture for hydrothermal synthesis was SiO$_2$/Al$_2$O$_3$/NaOH/CsOH/H$_2$O/18-crown-6-ether=1/0.033/0.36/0.18/50/0.18.

The support with the seed crystal deposited thereon was immersed in the vertical direction in a Teflon (registered trademark) inner cylinder containing the raw material mixture for hydrothermal synthesis, an autoclave was sealed, and heated at 150° C. for 72 hours under a self-generated pressure.

After elapse of a predetermined time, after cooling, a support-zeolite membrane composite was taken out from an autoclave, and after washing, dried at 100° C. for 5 hours or more. After drying, the air permeation amount in an as-made state was 1.5 L/(m$^2$·min). Next, in order to remove a template, the obtained membrane composite was fired to obtain an RHO zeolite membrane composite. The weight of the RHO zeolite crystallized on the support determined from the difference between the weight of the zeolite membrane composite and the weight of the support after firing was 78 g/m$^2$.

Next, the RHO zeolite membrane composite after removal of the template was placed into a Teflon container (registered trademark) inner cylinder (65 ml) containing 45 g of a 3M ammonium nitrate aqueous solution. An autoclave was sealed and heated at 110° C. for 1 hour in a stationary state under a self-generated pressure.

After elapse of a predetermined time, after cooling, the RHO membrane was taken out from the aqueous solution, washed with water, and then dried at 100° C. for 4 hours or more to obtain an NH$_4^+$-type RHO zeolite membrane composite.

In order to convert the NH$_4^+$-type RHO zeolite membrane composite into H$^+$-type, this RHO zeolite membrane composite was fired in an electric furnace at 400° C. for 2 hours. At this time, the temperature rise rate and the temperature drop rate up to 150° C. were both set at 2.5° C./min, and the temperature rise rate and the temperature drop rate from 150° C. to 400° C. were set to 0.5° C./min to obtain an H$^+$-type RHO zeolite membrane composite. Hereinafter, the produced RHO zeolite membrane composite is referred to as "RHO zeolite membrane composite 1".

Example E3

(Evaluation of Membrane Separation Performance)

Using the RHO zeolite membrane composite 1 described in Example E2, an ammonia separation test from a mixed gas of ammonia/hydrogen/nitrogen was performed using the apparatus shown in FIG. 1.

In a pre-treatment, a mixed gas of 50% H$_2$/50% N$_2$ was introduced as a supply gas 7 between a pressure vessel 2 and a zeolite membrane composite 1 at 250° C., the pressure was maintained at about 0.3 MPa, and the inside of a cylinder of the zeolite membrane composite 1 was set at 0.098 MPa (atmospheric pressure) and dried for about 120 minutes.

A mixed gas of 12% ammonia/51% nitrogen/37% hydrogen was then allowed to pass at 100 SCCM, and the back pressure was set to 0.4 MPa. At this time, the differential pressure between the supply gas 7 side and the permeated gas 8 side of the RHO zeolite membrane composite 1 was 0.3 MPa.

Table 25 shows the ammonia concentration in the obtained permeated gas and the permeance ratio of ammonia/hydrogen and ammonia/nitrogen, by changing the temperature of the RHO zeolite membrane composite 1 to from 150° C. to 300° C. and circulating the mixed gas. From these results, it was confirmed that ammonia could be separated with high selectivity without causing any gaps or defects between zeolite particles due to the small thermal expansion or contraction of the RHO zeolite under high temperature conditions. The ammonia permeance at 250° C. was 1.0× 10$^{-8}$ [mol/(m$^2$·s·Pa)].

Accordingly, the zeolite membrane composite of the present invention shows that ammonia can be stably and highly selectively separated even under high temperature conditions by carrying out synthesis using zeolite whose change rate of thermal expansion is within a specific range as a seed crystal.

TABLE 25

|  | 150° C. | 250° C. | 300° C. |
|---|---|---|---|
| NH$_3$ concentration in permeated gas | 52% | 54% | 52% |
| NH$_3$/N$_2$ permeance ratio | 20 | 25 | 24 |
| NH$_3$/H$_2$ permeance ratio | 5 | 6 | 5 |

Example E4

<Na$^+$-Type RHO Synthesis>

Figure 2:
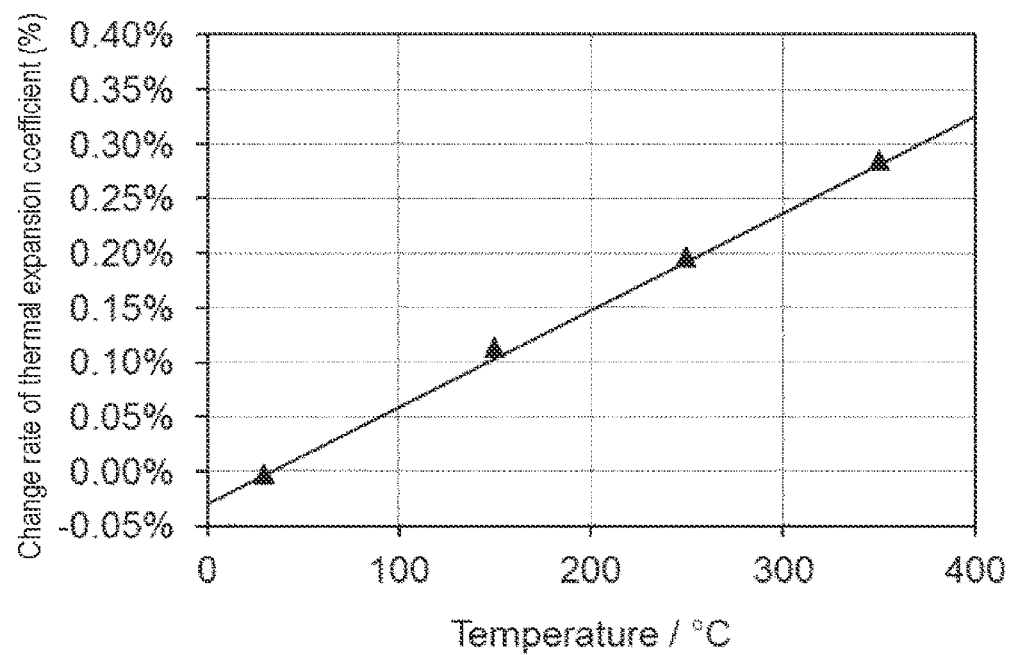
FIG. 2 is a measurement result of thermal expansion coefficients of the zeolite according to Example E4 for respective temperatures.

For the Na$^+$-type RHO zeolite, hydrothermal synthesis was carried out by the method described in "*Microporous and Mesoporous Materials* 132 (2010) 352-356)". After the hydrothermal synthesis reaction, a reaction solution was cooled and a produced crystal was recovered by filtration. The recovered crystal was dried at 100° C. for 12 hours. The results of measuring the thermal expansion coefficient of the obtained RHO zeolite are shown in FIG. 2. It was confirmed that the thermal expansion coefficient of the Na$^+$-type RHO can be approximated to a linear line with respect to temperature. From this approximate expression, the change rate of thermal expansion coefficient at 300° C. with respect to 30° C. was estimated to be 0.23%, and the change rate of thermal expansion coefficient at 400° C. with respect to 30° C. was estimated to be 0.33%.

Example E5

<Synthesis of RHO Zeolite Membrane Composite 2>

An NH$_4^+$-type RHO zeolite membrane composite was obtained in the same manner as in Example E2 except that a support with a seed crystal deposited was immersed in the vertical direction in a Teflon (registered trademark) inner cylinder containing a raw material mixture for hydrothermal synthesis, an autoclave was sealed, and heated at 150° C. for 72 hours under a self-generated pressure.

The NH$_4^+$-type RHO zeolite membrane composite after removal of the template was placed into a Teflon container (registered trademark) inner cylinder (65 ml) containing 45 g of a 1M aluminum nitrate aqueous solution. An autoclave was sealed and heated at 100° C. for 1 hour in a stationary state under a self-generated pressure.

After elapse of a predetermined time, after cooling, the RHO membrane was taken out from the aqueous solution, washed with water, and then dried at 100° C. for 4 hours or more to obtain an Al-treated $NH_4^+$-type RHO zeolite membrane composite.

The obtained composite was again placed in a Teflon container (registered trademark) inner cylinder (65 ml) containing 45 g of a 1M sodium nitrate aqueous solution. An autoclave was sealed and heated at 100° C. for 1 hour in a stationary state under a self-generated pressure.

After elapse of a predetermined time, after cooling, the RHO zeolite membrane was taken out from the aqueous solution, washed with water, and then dried at 100° C. for 4 hours or more to obtain an RHO zeolite membrane composite ion-exchanged to $Na^+$-type after an Al treatment.

Hereinafter, a produced RHO zeolite membrane composite which is ion-exchanged to $Na^+$-type after an Al treatment is referred to as "RHO zeolite membrane composite 2".

Example E6

<Evaluation of Membrane Separation Performance>

Using the RHO zeolite membrane composite 2 described in Example E5, an ammonia separation test from a mixed gas of ammonia/hydrogen/nitrogen was performed using the apparatus shown in FIG. 1.

In a pre-treatment, a mixed gas of 50% $H_2$/50% $N_2$ was introduced as a supply gas 7 between a pressure vessel 2 and a zeolite membrane composite 1 at 250° C., the pressure was maintained at about 0.3 MPa, and the inside of a cylinder of the zeolite membrane composite was set at 0.098 MPa (atmospheric pressure) and dried for about 120 minutes.

A mixed gas of 12% ammonia/51% nitrogen/37% hydrogen was then allowed to pass at 100 SCCM, and the back pressure was set to 0.4 MPa. At this time, the differential pressure between the supply gas 7 side and the permeated gas 8 side of the RHO zeolite membrane composite 2 was 0.3 MPa.

Table 26 shows the ammonia concentration in the obtained permeated gas and the permeance ratio of ammonia/hydrogen and ammonia/nitrogen, by changing the temperature of the RHO zeolite membrane composite 2 to 50° C. and 250° C. and circulating the mixed gas. From these results, it was confirmed that ammonia could be separated with high selectivity without causing any gaps or defects between zeolite particles due to the small thermal expansion or contraction of the RHO zeolite under high temperature conditions. The ammonia permeance at 250° C. was 2.0× $10^{-8}$ [mol/(m²·s·Pa)].

Accordingly, it was confirmed that an RHO membrane composite stably separated ammonia under high temperature conditions when the change rate of thermal expansion coefficient of zeolite constituting the zeolite membrane composite was in a specific range.

TABLE 26

|  | 100° C. | 250° C. |
| --- | --- | --- |
| $NH_3$ concentration in permeated gas | 60% | 56% |
| $5NH_3/N_2$ permeance ratio | 29 | 31 |
| $NH_3/H_2$ permeance ratio | 7 | 6 |

Example E7

<Production of MFI Zeolite>

MFI zeolite was synthesized as follows.

To a mixture of 13.65 g of a 50% by weight NaOH aqueous solution and 101 g of water, 0.15 g of sodium aluminate (containing $Al_2O_3$-62.2% by mass) was added and stirred at room temperature for 10 minutes. To this, 32.3 g of colloidal silica (Snowtech-40, manufactured by Nissan Chemical Co., Ltd.) was added and stirred for 5 hours at 50 degrees to obtain a raw material mixture for hydrothermal reaction. The composition (molar ratio) of this raw material mixture for hydrothermal reaction is $SiO_2/Al_2O_3$/NaOH/ $H_2O$=3.05/0.013/0.193/100, $SiO_2/Al_2O_3$=239.

This raw material mixture for hydrothermal synthesis was placed in a pressure vessel, and hydrothermal synthesis was carried out in an oven at 180° C. for 30 hours while stirring at 15 rpm. After this hydrothermal synthesis reaction, a reaction solution was cooled and a produced crystal was recovered by filtration. The recovered crystal was dried at 100° C. for 12 hours. As a result of measuring the thermal expansion coefficient in the c-axis direction of the obtained MFI zeolite, the change rate of the thermal expansion coefficient at 200° C. with respect to 30° C. was 0.13%, the change rate of the thermal expansion coefficient at 300° C. with respect to 30° C. was 0.15%, and the change rate of the thermal expansion coefficient at 400° C. with respect to 30° C. was 0.13% (each in the c-axis direction), and it was confirmed that zeolite was expanded as compared with the case of 30° C.

Example E8

<Preparation of MFI Zeolite Membrane Composite>

First, a raw material mixture for hydrothermal synthesis was prepared by the following method.

To a mixture of 13.65 g of a 50% by weight NaOH aqueous solution and 101 g of water, 0.15 g of sodium aluminate (containing $Al_2O_3$-62.2% by mass) was added and stirred at room temperature for 10 minutes. To this, 32.3 g of colloidal silica (Snowtech-40, manufactured by Nissan Chemical Co., Ltd.) was added and stirred for 5 hours at 50 degrees to obtain a raw material mixture for hydrothermal reaction. The composition (molar ratio) of this raw material mixture for hydrothermal reaction is $SiO_2/Al_2O_3$/NaOH/ $H_2O$=3.05/0.013/0.193/100, $SiO_2/Al_2O_3$=239.

ZSM5 zeolite (manufactured by Tosoh Corporation, HSZ-800 series 822H0A) ground in a mortar was prepared as a seed crystal, a porous support was immersed in an aqueous solution (ZSM5 seed crystal aqueous solution) in which the concentration of the seed crystal was about 0.4% by mass, and the support was dried at 70° C. for 1 hour, immersed again in the ZSM5 seed crystal solution for 1 minute, and then dried at 70° C. for 1 hour to deposit the seed crystal. The mass of the deposited seed crystal was about 0.0016 g. As the porous support, an alumina tube BN1 (outer diameter 6 mm, inner diameter 4 mm) manufactured by Noritake Company Limited cut into a length of 80 mm, washed with an ultrasonic cleaner, and then dried was used. Three porous supports having a seed crystal deposited thereon were prepared by the above-described method.

Three supports with the seed crystal deposited thereon were each immersed in the vertical direction in the above-described Teflon (registered trademark) inner cylinder (200 ml) containing the above-described aqueous reaction mixture, an autoclave was sealed, and heated at 180° C. for 30 hours in a stationary state under a self-generated pressure.

After elapse of a predetermined time, after cooling, the support-zeolite membrane composite was taken out from the reaction mixture, washed, and dried at 100° C. for 3 hours to obtain an MFI zeolite membrane composite 2. The mass of MFI zeolite crystallized on the support was from 0.26 to 0.28 g. The air permeation amount of the membrane composite after firing was from 0.0 to 0.1 cm³/min.

Example E9

<Evaluation of Membrane Separation Performance>

The temperature of the MFI zeolite membrane composite 2 described in Example E8 was changed from 100° C. to 250° C. and a mixed gas of 12% ammonia/51% nitrogen/37% hydrogen was allowed to pass at a flow rate of 100 SCCM, and the concentration of ammonia and the permeance ratio of ammonia/hydrogen and ammonia/nitrogen of the obtained permeated gas are shown in Table 27. Even when the temperature was changed from 150° C. to 250° C., it was confirmed that ammonia permeated through the membrane with high selectivity. Accordingly, since it was confirmed that ammonia could be separated with high selectivity without any gaps or defects between zeolite particles even under high temperature conditions, the thermal expansion coefficient of zeolite is considered to be comparable to that of the RHO zeolite membrane composite. The ammonia permeance at 250° C. was $7.5 \times 10^{-8}$ [mol/(m²·s·Pa)].

TABLE 27

|  | 100° C. | 150° C. | 200° C. | 250° C. |
|---|---|---|---|---|
| NH₃ concentration in permeated gas | 46% | 44% | 46% | 45% |
| NH₃/N₂ permeance ratio | 18 | 18 | 23 | 23 |
| NH₃/H₂ permeance ratio | 5 | 4 | 5 | 5 |

Reference Example E1

<Production of CHA Zeolite>

CHA zeolite was synthesized as follows.

To a mixture of 0.6 g of NaOH (manufactured by Kishida Chemical Co., Ltd.), 1.1 g of KOH (manufactured by Kishida Chemical Co., Ltd.), and 10 g of water, 0.5 g of aluminum hydroxide (containing $Al_2O_3$-53.5% by mass, manufactured by Aldrich Co., Ltd.) was added and dissolved by stirring to obtain a transparent solution. To this, 5.4 g of a 25% by mass aqueous solution of N,N,N-trimethyl-1-adamantanammonium hydroxide (hereinafter, referred to as "TMADAOH") was added as an organic template, and then 12 g of colloidal silica (Snowtech-40, manufactured by Nissan Chemical Co., Ltd.) was added and stirred for 2 hours to obtain a raw material mixture for hydrothermal synthesis. The composition (molar ratio) of this mixture is $SiO_2/Al_2O_3/NaOH/KOH/H_2O/TMADAOH=1/0.033/0.2/0.2/15/0.08$, $SiO_2/Al_2O_3=30$.

This raw material mixture for hydrothermal synthesis was placed in a pressure vessel and in an oven at 190° C. for 15 hours while stirring at 15 rpm for hydrothermal synthesis. After this hydrothermal synthesis reaction, the reaction solution was cooled, and a produced crystal was recovered by filtration. The recovered crystal was dried at 100° C. for 12 hours. As a result of measuring the thermal expansion coefficient of the obtained CHA zeolite, The change rate of thermal expansion coefficient at 200° C. with respect to 30° C. was −0.13%, the change rate of thermal expansion coefficient at 300° C. with respect to 30° C. was −0.30%, and the change rate of thermal expansion coefficient at 400° C. with respect to 30° C. was −0.40% (both in the c-axis direction), and it was confirmed that the zeolite contracted compared to 30° C.

Reference Example E2

<Production of CHA Zeolite Membrane Composite>

First, a raw material mixture for hydrothermal synthesis was prepared as follows.

To a mixture of 1.45 g of 1 mol/L-NaOH aqueous solution, 5.78 g of 1 mol/L-KOH aqueous solution, and 114.6 g of water, 0.19 g of aluminum hydroxide (containing $Al_2O_3$-53.5% by mass, manufactured by Aldrich Co., Ltd.) was added and dissolved by stirring to obtain a transparent solution. To this, 2.43 g of a 25% by mass aqueous solution of TMADAOH was added as an organic template, and then 10.85 g of colloidal silica (Snowtech-40, manufactured by Nissan Chemical Co., Ltd.) was added and stirred for 2 hours to obtain a raw material mixture for hydrothermal synthesis. The composition (molar ratio) of this mixture was $SiO_2/Al_2O_3/NaOH/KOH/H_2O/TMADAOH=1/0.018/0.02/0.08/100/0.04$, $SiO_2/Al_2O_3=58$.

As a porous support, an alumina tube BN1 (outer diameter 6 mm, inner diameter 4 mm) manufactured by Noritake Company Limited cut into a length of 80 mm, washed with an ultrasonic cleaner, and then dried was used.

As a seed crystal, CHA zeolite obtained by filtering, washing with water, and drying a crystal having a gel composition (molar ratio) of $SiO_2/Al_2O_3/NaOH/KOH/H_2O/TMADAOH=1/0.033/0.1/0.06/20/0.07$ obtained by hydrothermal synthesis at 160° C. for 2 days was used. The seed crystal grain size was about from 0.3 to 3 μm.

The support was immersed in a solution in which the seed crystal was dispersed in water to a concentration of about 1% by mass (CHA seed crystal aqueous solution) for 1 minute, and then dried at 100° C. for 1 hour to deposit the seed crystal. The mass of the deposited seed crystal was about 0.001 g.

Three supports with the seed crystal deposited thereon was immersed in the vertical direction in a Teflon (registered trademark) inner cylinder (200 ml) containing the above-described aqueous reaction mixture, an autoclave was sealed, and heated at 180° C. for 72 hours in a stationary state under a self-generated pressure. After elapse of a predetermined time, after cooling, the support-zeolite membrane composite was taken out from the reaction mixture, washed, and dried at 100° C. for 3 hours.

The dried membrane composite was fired in air in an electric furnace at 450° C. for 10 hours and at 500° C. for 5 hours. At this time, the temperature rise rate and the temperature drop rate from room temperature to 450° C. were both 0.5° C./min, and the temperature rise rate and the temperature drop rate from 450° C. to 500° C. were both 0.1° C./min. The mass of the CHA zeolite crystallized on the support, which was determined from the difference between the mass of the membrane composite and the mass of the support after firing, was about from 0.279 to 0.289 g. The air permeation amount of the membrane composite after firing was from 2.4 to 2.9 cm³/min.

Hereinafter, the produced CHA zeolite membrane composite is referred to as "CHA zeolite membrane composite 3".

Reference Example E3

<Evaluation of Membrane Separation Performance>

The temperature of the CHA zeolite membrane composite 3 described in Reference Example E2 was changed from 100° C. to 250° C. and a mixed gas of 12% ammonia/51% nitrogen/37% hydrogen was allowed to pass at a flow rate of 100 SCCM, and the concentration of ammonia and the permeance ratio of ammonia/hydrogen and ammonia/nitrogen of the obtained permeated gas are shown in Table 28. It was found that when the temperature was changed from 150° C. to 250° C., the ammonia gas concentration in the gas permeated through the membrane decreased as the temperature increased. The ammonia permeance at 250° C. was $7.2 \times 10^7$ [mol/(m²·s·Pa)]. This is a higher permeance than RHO and MFI zeolite membrane composites, and this is considered to be because the permeance ratio of ammonia/nitrogen or ammonia/hydrogen is small, and the ammonia permeation selectivity is low, and the gas permeates through gaps and defects between zeolite particles.

TABLE 28

|  | 100° C. | 150° C. | 200° C. | 250° C. |
|---|---|---|---|---|
| $NH_3$ concentration in permeated gas | 26% | 25% | 22% | 20% |
| $NH_3/N_2$ permeance ratio | 11 | 10 | 8 | 7 |
| $NH_3/H_2$ permeance ratio | 3 | 3 | 2 | 1 |

From the above results, it was found that the zeolite membrane composite of the present invention obtained by Examples E2 and E5 was able to stably and efficiently separate ammonia from a gas mixture composed of a plurality of components including ammonia and hydrogen and/or nitrogen to the permeation side with high permeability even under high temperature conditions exceeding 200° C. On the other hand, in the case of the zeolite membrane composite obtained by Reference Example E2, it is considered that the ammonia permeation selectivity was deteriorated due to formation of gaps and defects between zeolite particles due to thermal contraction of zeolite at a temperature higher than 200° C. Specifically, it is considered that, since the change rate of thermal expansion coefficient at 300° C. with respect to the thermal contraction coefficient at 30° C. of the CHA zeolite obtained in Reference Example E2 was as large as −0.30%, a crack generated at a zeolite grain boundary due to thermal contraction of zeolite in a high temperature range higher than 200° C., and the ammonia separation performance deteriorated due to gas permeation through the crack. In other words, it was found that, in order to maintain the high denseness of a zeolite membrane composite in a temperature range higher than 200° C. and to separate ammonia from a gas mixture composed of a plurality of components including ammonia and hydrogen and/or nitrogen with high selectivity and high permeability, the film performance deteriorated when the change rate of thermal expansion coefficient at 300° C. with respect to the thermal expansion coefficient at 30° C. was changed as small as 0.30%. In contrast, it was found that, although, when the change rate of thermal contraction coefficient at 300° C. with respect to thermal expansion coefficient at 30° C. was 0.02% as in the zeolite described in Example E2, the thermal contraction coefficient at 200° C. was 1.55%, which was a considerable thermal contraction, surprisingly, ammonia permeated with high selectivity in a temperature range higher than 200° C. It was found that, as in the zeolites described in Examples E5 and E8, when the absolute value of the change rate of thermal expansion coefficient at 300° C. with respect to thermal expansion coefficient at 30° C. was within 0.25%, ammonia permeated with high selectivity in a temperature range higher than 200° C.

REFERENCE SIGNS LIST

1 Zeolite membrane composite
2 Pressure vessel
3 Sealing portion at tip of support
4 Joint between zeolite membrane composite and permeate gas recovery pipe
5 Pressure gauge
6 Back pressure valve
7 Supply gas (sample gas)
8 Permeated gas
9 Sweep gas
10 Non-permeated gas
11 Permeated gas recovery pipe
12 Sweep gas supply pipe

The invention claimed is:

1. A method for separating ammonia from a mixed gas comprising ammonia gas, hydrogen gas, and nitrogen gas, the method comprising:
    contacting the mixed gas with a zeolite membrane thereby allowing the ammonia gas to selectively permeate the zeolite membrane and separate from the mixed gas,
    wherein a concentration of the ammonia gas in the mixed gas is 1.0% by volume or more relative to a total volume of the mixed gas, and
    the zeolite membrane has an $SiO_2/Al_2O_3$ molar ratio of from 6 to 500.
2. The method according to claim 1, wherein a volume ratio of hydrogen gas/nitrogen gas in the mixed gas is from 0.2 to 3.
3. The method according to claim 1, wherein the temperature at which the ammonia gas is separated from the mixed gas is from 50° C. to 500° C.
4. The method according to claim 1, wherein the zeolite membrane comprises RHO zeolite or MFI zeolite.
5. The method according to claim 1, wherein at least a portion of the ammonia gas in the mixed gas is produced from hydrogen gas and nitrogen gas in the mixed gas.
6. The method according to claim 1, wherein the concentration of the ammonia gas in the mixed gas is from 2.0% by volume to 60% by volume relative to the total volume of the mixed gas.
7. The method according to claim 1, wherein the pressure of the mixed gas is from 0.1 MPa to 20 MPa.
8. The method according to claim 1, wherein a differential pressure between the mixed gas and the gas that has permeated the zeolite membrane is from 0.01 MPa to 10 MPa.
9. The method according to claim 1, wherein the zeolite membrane is formed by crystallizing zeolite on a surface of a porous support.
10. The method according to claim 1, wherein the zeolite membrane is formed on a tubular support.
11. The method according to claim 10, wherein the mixed gas is supplied to the outside of the tubular support on which the zeolite membrane is formed.

* * * * *